(12) United States Patent
Tomioka et al.

(10) Patent No.: US 8,591,389 B2
(45) Date of Patent: Nov. 26, 2013

(54) TOOL TRANSFER SYSTEM

(75) Inventors: Mitsuhiko Tomioka, Anjo (JP); Akihiro Fujii, Toyota (JP); Akinori Tsujino, Nagoya (JP); Tomoyasu Ota, Ichinomiya (JP); Toshiyuki Nishi, Nishikamo-gun (JP)

(73) Assignees: Fuji Seiko Limited, Toyota (JP); Toyota Jidosha Kabushiki Kaisha, Toyota (JP)

( * ) Notice: Subject to any disclaimer, the term of this patent is extended or adjusted under 35 U.S.C. 154(b) by 1069 days.

(21) Appl. No.: 12/588,684

(22) Filed: Oct. 23, 2009

(65) Prior Publication Data
US 2011/0098165 A1   Apr. 28, 2011

(51) Int. Cl.
*B23Q 3/157*   (2006.01)

(52) U.S. Cl.
USPC .................................. 483/55; 483/57; 483/61

(58) Field of Classification Search
USPC ..................... 483/55–57, 60–62, 16, 27, 13
See application file for complete search history.

(56) References Cited

U.S. PATENT DOCUMENTS

| | | | | |
|---|---|---|---|---|
| 4,658,494 A | * | 4/1987 | Ohtani et al. | 483/10 |
| 5,111,573 A | * | 5/1992 | Ito et al. | 483/57 |
| 5,752,904 A | * | 5/1998 | Irri | 483/13 |
| 5,993,364 A | * | 11/1999 | Matsuura et al. | 483/16 |
| 8,366,592 B2 | * | 2/2013 | Hathaway et al. | 483/55 |

FOREIGN PATENT DOCUMENTS

| | | |
|---|---|---|
| JP | A-49-80682 | 8/1974 |
| JP | U-63-60532 | 4/1988 |
| JP | A-2005-14143 | 1/2005 |
| JP | 2009-023082 A * | 2/2009 |

OTHER PUBLICATIONS

May 11, 2012 Notification of Reason for Refusal issued in Japanese Patent Application No. 2008-030798 (with translation).

* cited by examiner

*Primary Examiner* — Erica E Cadugan
(74) *Attorney, Agent, or Firm* — Oliff & Berridge, PLC

(57) ABSTRACT

A tool transfer system configured to transfer a tool between first and second tool holding devices by causing the first and second tool holding devices to be moved relative to each other. The first tool holding device includes a clamp sleeve forced in a direction toward the second tool holding device so as to be positioned in a clamping position. The second tool holding device includes: a hole defining member defining a receiving hole that is to receive the tool; and a movable engaging member that is movable between a working position and a non-working position depending on movement of the hole defining member. The movable engaging member is engageable with the clamp sleeve, while being positioned in the working position, such that the clamp sleeve can be moved, by engagement of the movable engaging member with the clamp sleeve, so as to be positioned in an unclamping position, during relative axial movement of the first and second tool holding devices toward each other.

19 Claims, 27 Drawing Sheets

TOOL TRANSFER SYSTEM

This application is based on Japanese Patent Application No. 2008-030798 filed on Feb. 12, 2008, the content of which is incorporated hereinto by reference.

BACKGROUND OF THE INVENTION

1. Field of the Invention

The present invention relates to a tool transfer system for transferring a tool between two tool holding devices, and more particularly to techniques for facilitating the transfer of a tool between the two tool holding devices.

2. Discussion of Related Art

There is known a tool transfer system for transferring a tool such as a machining tool (e.g., cutting tool, grinding tool) and a plastic working tool (e.g., burnishing tool), between a tool holding shaft and a tool storage device such as a tool magazine, for example, through an automatic tool changer (ATC). JP-2005-14143A (publication of unexamined Japanese Patent Application laid open in 2005) discloses an example of such a tool transfer system in which a tool is held by a tool holding shaft when the tool has been transferred to the tool holding shaft, and is stored in the tool storage device when the tool has been transferred to the tool storage device. In this system, the tool is transferred between the tool holding shaft and the tool storage device while being held by a tool holder. However, there is a case where the tool is transferred while not being held by a tool holder. In this sense, in the following description, a term "tool" will be used as a term generic to a tool held by a tool holder and a tool not held by a tool holder. That is, the term "tool" will be used, without distinguishing a tool held by a tool holder and a tool not held by a tool holder, from each other. Where the term "tool" is used to refer to a tool held by a tool holder, the tool holder may be interpreted as a part of the tool.

A tool disclosed in JP-2005-14143A is equipped with a ball clamping device having a particular arrangement that enables a radially outward flange of a tool holding shaft to be firmly gripped (clamped) from its axially opposite sides by a radially outward flange and a radially inward engaging protrusion of the tool. The radially outward flange extends radially outwardly from a main body (hereinafter referred to as "tool holder body") of a tool holder of the tool, while the radially inward engaging protrusion protrudes radially inwardly from a tubular-shaped engaging member of the tool, which is fitted on the main body of the tool holder body and which is axially movable relative to the tool holder body and unrotatable relative to the tool holder body. Thus, the tool is fixed to the tool holding shaft by the radially outward flange and the radially inward engaging protrusion of the tool, which cooperate with each other to grip the radially outward flange of the tool holding shaft. A clamp sleeve having a tapered inner circumferential surface is fitted on the tool holder body, and is axially slidable relative to the tool holder body. The tubular-shaped engaging member has a ball retaining hole extending in a radial direction of the tubular-shaped engaging member. The radially outward flange has a tapered surface that is inclined with respect to a plane perpendicular to an axis of the tool holder body. A ball is disposed in the ball retaining hole of the tubular-shaped engaging member, and is movable in the radial direction. A spring is disposed between the clamp sleeve and the tool holder body, and forces the clamp sleeve in a backward direction, i.e., a direction away from an axially distal end of the tool holder body toward an axially proximal end of the tool holder body.

In this clamping device, as a result of the backward movement of the clamp sleeve owing to force of the spring, the ball is forced by the tapered inner circumferential surface of the clamp sleeve, inwardly in the radial direction. The ball, which is thus forced inwardly in the radial direction, is forced into a wedge-shaped gap that is defined by an inner circumferential surface of the ball retaining hole of the tubular-shaped engaging member and the tapered surface of the radially outward flange, whereby the tubular-shaped engaging member is moved relative to the tool holder body in a forward direction, i.e., a direction away from the axially proximal end of the tool holder body toward the axially distal end of the tool holder body. As a result of the forward movement of the tubular-shaped engaging member relative to the tool holder body, the radially outward flange of the tool holding shaft is firmly gripped by the radially outward flange of the tool holder body and the radially inward engaging protrusion of the tubular-shaped engaging member. It should be noted that, for enabling the radially outward flange of the tool holding shaft to be positioned between the radially outward flange of the tool holder body and the radially inward engaging protrusion of the tubular-shaped engaging member, there is required means for permitting the radially outward flange of the tool holding shaft to pass through the radially inward engaging protrusion of the tubular-shaped engaging member, namely, permitting the radially inward engaging protrusion of the tubular-shaped engaging member to pass through the radially outward flange of the tool holding shaft. To this end, the radially outward flange of the tool holding shaft has a cutout extending over an entire axial length of the radially outward flange. In this arrangement, the tool holding shaft has to be positioned relative to the tool in a predetermined angular position that permits the radially inward engaging protrusion of the tubular-shaped engaging member to pass through the cutout of the radially outward flange of the tool holding shaft so as to be moved from an axially distal side of the radially outward flange to an axially proximal side of the radially outward flange. After the radially inward engaging protrusion of the tubular-shaped engaging member having passed through the cutout of the radially outward flange of the tool holding shaft, namely, after the tool has been introduced into the tool holding shaft, the tool holding shaft is rotated relative to the tool by a predetermined angle, whereby the tubular-shaped engaging member is moved relative to the tool holder body in the forward direction. As a result of the forward movement of the tubular-shaped engaging member relative to the tool holder body, the radially outward flange of the tool holding shaft is firmly gripped by the radially outward flange of the tool holder body and the radially inward engaging protrusion of the tubular-shaped engaging member. This clamping device requires a device for rotating the tool holding shaft relative to the tool and also a device for controlling an angular position of the tool holding shaft relative to the tool, although redundant description of these devices is not provided herein.

In the above arrangement disclosed in JP-2005-14143A, when the tool is to transferred from the tool storage device to the tool holding shaft, the tool holding shaft is first positioned in a coaxial position in which a tool receiving hole of the tool holding shaft is axially opposed to and coaxial with a tool receiving hole of the tool storage device. Then, the tool holding shaft is moved toward the tool storage device with the tool holding shaft being positioned in the above-described predetermined angular position relative to the tool, whereby the tool is received into the tool receiving hole of the tool holding shaft, while the clamp sleeve is moved in the forward direction against force of the spring. Then, with the tool holding shaft being rotated by the above-described predetermined angle relative to the tool, the clamp sleeve is moved in the backward direction owing to the force of the spring, so as to be positioned in a clamping position, whereby the radially outward flange of the tool holding shaft is gripped by the radially outward flange of the tool holder body and the radially inward engaging protrusion of the tubular-shaped engaging member. Thus, the tool is firmly held by the tool holding shaft. When the tool is to be transferred from the tool holding shaft to the tool storage device, too, the tool holding shaft and the tool storage device are moved toward and away from each other and rotated relative to each other.

As described above, in the tool transfer system disclosed in JP-2005-14143A, the tool can be automatically transferred between the tool holding shaft and the tool storage device. However, for the transference of the tool between the tool holding shaft and the tool storage device, the tool holding shaft has be to axially moved and also rotated about an axis of the tool receiving hole of the tool holding shaft, thereby complicating control of movement of the tool holding shaft and also construction of the tool (more precisely, construction of the tool holder body).

SUMMARY OF THE INVENTION

The present invention was made in view of the background prior art discussed above. It is therefore a first object of the invention to provide a tool transfer system is capable of transferring a tool between two tool holding devices, without necessity of complicating control for relative movement of the two tool holding devices and construction of the tool. It is a second object of the invention to provide a clamp-controller-equipped tool holding device is capable of receiving a tool from a clamp-equipped tool holding device and handing over the tool to the clamp-equipped tool holding device, without necessity of complicating control for relative movement of the two tool holding devices and without necessity of complicating construction of the tool.

The above-described first object of the invention may be achieved by a first aspect of the invention, which provides a tool transfer system including (a) a first tool holding device and (b) a second tool holding device and configured to transfer a tool between the two tool holding devices by causing the first and second tool holding devices to be moved relative to each other. The first tool holding device includes: (a-1) a first-receiving-hole defining member defining a first receiving hole; and (a-2) a clamping device including (a-2-i) an axially movable member movable relative to the first-receiving-hole defining member in first opposite directions, so as to be positioned in a clamping position as a result of movement of the axially movable member in a forward direction as one of the first opposite directions, and so as to be positioned in an unclamping position as a result of movement of the axially movable member in a backward direction as the other of the first opposite directions, and (a-2-ii) a movable-member forcing device forcing the axially movable member in the forward direction. The second tool holding device includes: (b-1) a main body; (b-2) a second-receiving-hole defining member defining a second receiving hole and movable relative to the main body in second opposite directions; and (b-3) a hole-defining-member forcing device forcing the second-receiving-hole defining member in a forcing direction as one of the second opposite directions. The tool transfer system further including: (c) a clamping-device controlling device which is configured to cause the axially movable member to be moved against force of the movable-member forcing device in the backward direction so as to be positioned in the unclamping position, during relative movement of the first and second tool holding devices toward each other, in absence of opposite movement of the second-receiving-hole defining member against force of the hole-defining-member forcing device in an opposite direction opposite to the forcing direction, and which is configured to allow the axially movable member to be moved owing to the force of the movable-member forcing device in the forward direction so as to be positioned in the clamping position, in presence of the opposite movement of the second-receiving-hole defining member.

The above-described first object of the invention may be achieved also by a second aspect of the invention, which provides a tool transfer system including (a) a first tool holding device and (b) a second tool holding device and configured to transfer a tool between the two tool holding devices by causing the first and second tool holding devices to be moved relative to each other. The first tool holding device includes: (a-1) a first-receiving-hole defining member defining a first receiving hole; and (a-2) a ball clamping device including a clamp sleeve which is axially movable relative to the first-receiving-hole defining member, and which is forced in a direction toward the second tool holding device so as to be positioned in a clamping position for clamping the tool that is received in the first receiving hole. The second tool holding device includes: (b-1) a main body; (b-2) a second-receiving-hole defining member defining a second receiving hole and axially movable relative to the main body; (b-3) a hole-defining-member forcing device forcing the second-receiving-hole defining member in a direction toward the first tool holding device; (b-4) a movable engaging member which is movable between a working position and a non-working position, and which is positioned in the working position in absence of opposite movement of the second receiving-hole defining member against force of the hole-defining-member forcing device in an opposite direction opposite to the direction toward the first tool holding device, the movable engaging member being engageable with the clamp sleeve while being positioned in the working position, such that the clamp sleeve can be moved, by engagement of the movable engaging member with the clamp sleeve, so as to be positioned in an unclamping position, during relative axial movement of the second tool holding device and the first tool holding device toward each other; and (b-5) a movement converting device which is, in presence of the opposite movement of the second receiving-hole defining member, configured to covert the opposite movement of the second-receiving-hole defining member relative to the main body, into withdrawal movement of the movable engaging member from the working position to the non-working position against force of the engaging-member forcing device.

In each of the above-described tool transfer systems according to the first and second aspects of the invention, as long as each one of the first and second tool holding devices is configured to hold a tool, one of the first and second tool holding devices may be provided in a machine having a rotatable spindle, while the other of the first and second tool holding devices may be provided in a tool storage device configured to store a tool. It is noted that the above-described one of the first and second tool holding devices may be provided in a machine tool or other machine such as a robot having a spindle. Further, as long as each one of the two tool holding devices is configured to hold a tool, one of the two tool holding devices may be provided in a tool changer that is configured to change a tool held by a spindle, to another tool stored in a tool storage device, while the other of the two tool holding devices may be provided in each of at least one of the spindle and the tool storage device. It is noted that the above-described term "causing the first and second tool holding devices to be moved relative to each other" may be interpreted to mean not only "causing both of the first and second tool holding devices to be moved relative to each other" but also "causing one of the first and second tool holding devices to be moved relative to the other of the first and second tool holding devices".

The above-described second object of the invention may be achieved by a third aspect of the invention, which provides a clamp-controller-equipped tool holding device (second tool holding device) configured to receive a tool from a clamp-equipped tool holding device (first tool holding device) and hand over the tool to the clamp-equipped tool holding device, by relative movement of the clamp-controller-equipped tool holding device and the clamp-equipped tool holding device. The clamp-equipped tool holding device includes (a-1) a first-receiving-hole defining member defining a first receiving hole and (a-2) a ball clamping device including a clamp sleeve which is axially movable relative to the first-receiving-hole defining member, and which is forced in a direction toward the clamp-controller-equipped tool holding device so as to be positioned in a clamping position for clamping the tool that is received in the first receiving hole. The clamp-controller-equipped tool holding device includes: (b-1) a main body; (b-2) a second-receiving-hole defining member defining a second receiving hole and axially movable relative to the main body; (b-3) a hole-defining-member forcing device forcing the second-receiving-hole defining member in a direction toward the clamp-equipped tool holding device; (b-4) a movable engaging member which is movable between a working position and a non-working position, and which is positioned in the working position in absence of opposite movement of the second receiving-hole defining member against force of the hole-defining-member forcing device in an opposite direction opposite to the direction toward the clamp-equipped tool holding device, the movable engaging member being engageable with the clamp sleeve while being positioned in the working position, such that the clamp sleeve can be moved, by engagement of the movable engaging member with the clamp sleeve, so as to be positioned in an unclamping position, during relative axial movement of the clamp-controller-equipped tool holding device and the clamp-equipped tool holding device toward each other; and (b-5) a movement converting device which is, in presence of the opposite movement of the second receiving-hole defining member, configured to covert the opposite movement of the second-receiving-hole defining member relative to the main body, into withdrawal movement of the movable engaging member from the working position to the non-working position against force of the engaging-member forcing device.

In the tool transfer system according to the first aspect of the invention, when the tool held by the first tool holding device is to be transferred to the second tool holding device, the first and second tool holding devices are caused to be axially moved toward each other, while the first receiving hole and second receiving hole are held coaxial with each other, whereby a second-tool-holding-device-side portion of the tool (which is opposite to a first-tool-holding-device-side portion of the tool) is received by the second tool holding device. In this instance, the clamping-device controlling device acts on the axially movable member whereby the axially movable member is moved in the backward direction relative to the first-receiving-hole defining member. As a result of the backward movement of the axially movable member relative to the first-receiving-hole defining member, the axially movable member is positioned in the unclamping position. Then, the tool is removed out of the first receiving hole of the first tool holding device, by relative movement of the first and second tool holding devices away from each other. Further, when the tool held by the second tool holding device is to be transferred to the first tool holding device, the first and second tool holding devices are caused to be axially moved toward each other, while the first receiving hole and second receiving hole are held coaxial with each other, whereby the first-tool-holding-device-side portion of the tool is received by the first tool holding device. In this instance, the clamping-device controlling device acts on the axially movable member whereby the axially movable member is moved in the backward direction relative to the first-receiving-hole defining member, and the second-receiving-hole defining member is moved in the above-described opposite direction relative to the main body of the second tool holding device. As a result of the opposite movement of the second-receiving-hole defining member relative to the main body, the axially movable member is moved by the force of the movable-member forcing device in the forward direction relative to the first-receiving-hole defining member, so as to be positioned in the clamping position. Then, the tool is removed out of the second receiving hole of the second tool holding device, by relative movement of the first and second tool holding devices away from each other.

In the tool transfer system according to the second aspect of the invention, when the tool held by the first tool holding device is to be transferred to the second tool holding device, the first and second tool holding devices are caused to be axially moved toward each other, while the first receiving hole and second receiving hole are held coaxial with each other, whereby a second-tool-holding-device-side portion of the tool is received by the second tool holding device. In this instance, the movable engaging member is positioned in the working position so as to act on the clamp sleeve whereby the clamp sleeve is positioned in the unclamping position. Then, the tool is removed out of the first receiving hole of the first tool holding device, by relative movement of the first and second tool holding devices away from each other. Further, when the tool held by the second tool holding device is to be transferred to the first tool holding device, the first and second tool holding devices are caused to be axially moved toward each other, while the first receiving hole and second receiving hole are held coaxial with each other, whereby the first-tool-holding-device-side portion of the tool is received by the first tool holding device. In this instance, the movable engaging member is positioned in the working position so as to act on the clamp sleeve whereby the clamp sleeve is positioned in the unclamping position, and the second-receiving-hole defining member is moved in the above-described opposite direction relative to the main body of the second tool holding device. The opposite movement of the second-receiving-hole defining member relative to the main body is converted into the withdrawal movement of the movable engaging member from the working position to the non-working position whereby the clamp sleeve is positioned in the clamping position. Then, the tool is removed out of the second receiving hole of the second tool holding device, by relative movement of the first and second tool holding devices away from each other.

In the clamp-controller-equipped tool holding device according to the third aspect of the invention, when receiving the tool from the clamp-equipped tool holding device, the clamp-equipped tool holding device and the clamp-controller-equipped tool holding device are caused to be axially moved toward each other, while the first receiving hole and second receiving hole are held coaxial with each other, whereby a portion of the tool is received by the clamp-controller-equipped tool holding device. In this instance, the movable engaging member is positioned in the working position so as to act on the clamp sleeve whereby the clamp sleeve is positioned in the unclamping position. Then, the tool is removed out of the first receiving hole of the clamp-equipped tool holding device, by relative movement of the two tool holding devices away from each other. Further, when the tool held by the clamp-controller-equipped tool holding device is to be transferred to the clamp-equipped tool holding device, the two tool holding devices are caused to be axially moved toward each other, while the first receiving hole and second receiving hole are held coaxial with each other, whereby the clamp-equipped-tool-holding-device-side portion of the tool is received by the clamp-equipped tool holding device. In this instance, the movable engaging member is positioned in the working position so as to act on the clamp sleeve whereby the clamp sleeve is positioned in the unclamping position, and the second-receiving-hole defining member is moved in the above-described opposite direction relative to the main body of the clamp-controller-equipped tool holding device. The opposite movement of the second-receiving-hole defining member relative to the main body is converted into the withdrawal movement of the movable engaging member from the working position to the non-working position whereby the clamp sleeve is positioned in the clamping position. Then, the tool is removed out of the second receiving hole of the clamp-controller-equipped tool holding device, by relative movement of the two tool holding devices away from each other.

According to any one of the first through third aspects of the invention, the tool can be transferred from each one of the two tool holding devices to the other of the two tool holding devices, by causing the two tool holding devices to be moved relative to each other, without necessity of causing the two tool holding devices to be rotated relative to each other about axes of the first and second receiving holes. It is therefore possible to simplify control required for causing the tool to be automatically transferred between the two tool holding devices. Further, since the two tool holding devices are not required to be rotated relative to each other, it is possible to reduce a length of time required for causing the tool to be transferred between the two tool holding devices. The reduction of the length of time required for the tool transference is significant, particularly, in a machining system with a multi-spindle machining machine in which a plurality of tools are transferred one after another between the two tool holding device. Further, any one of the first through third aspects of the invention, there is no necessity of providing a clamping device in the tool, thereby making it possible to simplify construction of the tool. The simplification of the construction of the tool leads to reduction of tooling cost, particularly, in a machining system in which a larger number of tools are employed.

VARIOUS MODES OF THE INVENTION

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) A tool transfer system including (a) a first tool holding device and (b) a second tool holding device, and configured to transfer a tool between the first and second tool holding devices by causing the first and second tool holding devices to be moved relative to each other;

wherein the first tool holding device includes:
(a-1) a first-receiving-hole defining member defining a first receiving hole that is to receive therein a first-tool-holding-device-side portion of the tool; and
(a-2) a clamping device including (a-2-i) an axially movable member movable relative to the first-receiving-hole defining member in first opposite directions that are parallel to an axis of the first receiving hole, so as to be positioned in a clamping position as a result of movement of the axially movable member in a forward direction as one of the first opposite directions that corresponds to a direction toward a front side of the first tool holding device, and so as to be positioned in an unclamping position as a result of movement of the axially movable member in a backward direction as the other of the first opposite directions, and (a-2-ii) a movable-member forcing device forcing the axially movable member in the forward direction, such that the clamping device is configured to establish a clamping state for clamping the tool that is received in the first receiving hole while the axially movable member is being positioned in the clamping position, and to establish an unclamping state for unclamping the tool that is received in the first receiving hole while the axially movable member is being positioned in the unclamping position, wherein the second tool holding device includes:
(b-1) a main body;
(b-2) a second-receiving-hole defining member defining a second receiving hole which is to receive therein a second-tool-holding-device-side portion of the tool, the second-receiving-hole defining member being movable relative to the main body in second opposite directions that are parallel to an axis of the second receiving hole, the second opposite directions being parallel to the first opposite directions at least in a coaxial state in which the second tool holding device is positioned on the front side of the first tool holding device with the second receiving hole being coaxial with the first receiving hole; and
(b-3) a hole-defining-member forcing device forcing the second-receiving-hole defining member in a forcing direction as one of the second opposite directions, the forcing direction corresponding to the backward direction as the other of the first opposite directions at least in the coaxial state, the tool transfer system further including:
(c) a clamping-device controlling device which is configured to cause the axially movable member to be moved against force of the movable-member forcing device in the backward direction so as to be positioned in the unclamping position, during relative movement of the first and second tool holding devices toward each other in the coaxial state, in absence of opposite movement of the second-receiving-hole defining member against force of the hole-defining-member forcing device in an opposite direction opposite to the forcing direction relative to the main body, and which is configured to allow the axially movable member to be moved owing to the force of the movable-member forcing device in the forward direction so as to be positioned in the clamping position, in presence of the opposite movement of the second-receiving-hole defining member.

(2) The tool transfer system according to mode (1),
wherein the clamping-device controlling device is, during the relative movement of the first and second tool holding devices toward each other in the coaxial state, configured to cause the axially movable member of the clamping device to be positioned in one of the clamping position and the unclamping position which is selected depending on an axial distance between the main body of the second tool holding device and the first-receiving-hole defining member of the first tool holding device, wherein the clamping-device controlling device is, when the axial distance is reduced to a first amount as a result of the relative movement in a process for transferring the tool from the first tool holding device to the second tool holding device, configured to cause the axially movable member to be moved against force of the movable-member forcing device in the backward direction so as to be positioned in the unclamping position, and wherein the clamping-device controlling device is, when the axial distance is reduced to a second amount that is smaller than the first amount as a result of the relative movement in a process for transferring the tool from the second tool holding device to the first tool holding device, configured to cause the opposite movement of the second-receiving-hole defining member against the force of the hole-defining-member forcing device relative to the main body, and to allow, as a result of the opposite movement of the second-receiving-hole defining member, the axially movable member to be moved owing to the force of the movable-member forcing device in the forward direction so as to be positioned in the clamping position.

In the tool transfer system according to this mode (2), during the relative movement of the first and second tool holding devices toward each other in the coaxial state (in which the second tool holding device is positioned on the front side of the first tool holding device with the second receiving hole being coaxial with the first receiving hole), the clamping device establishes one of the clamping state and the unclamping state, which is selected depending on an axial distance between the main body of the second tool holding device and the first-receiving-hole defining member of the first tool holding device. When the tool held at its first-tool-holding-device-side portion by the first tool holding device is to be transferred to the second tool holding device, the two tool holding devices are caused to be axially moved toward each other with the coaxial state being maintained, whereby the clamping state is switched to the unclamping state, and the second-tool-holding-device-side portion (that is opposite to the first-tool-holding-device-side portion) of the tool is received by the second receiving hole of the second-receiving-hole defining member of the second tool holding device. Then, the two tool holding devices are caused to be axially moved away from each other with the coaxial state being maintained, whereby the tool is removed out of the first receiving hole of the first-receiving-hole defining member of the first tool holding device. Further, when the tool held at its second-tool-holding-device-side portion by the second tool holding device is to be transferred to the first tool holding device, the two tool holding devices are caused to be axially moved toward each other with the coaxial state being maintained, whereby the first-tool-holding-device-side portion of the tool is received by the first receiving hole of the first-receiving-hole defining member of the first tool holding device, and the unclamping state is switched to the clamping state. Then, the two tool holding devices are caused to be axially moved away from each other with the coaxial state being maintained, whereby the tool is removed out of the second receiving hole of the second-receiving-hole defining member of the second tool holding device. Thus, in the tool transfer system according to this mode (2), the clamping state and the unclamping state can be selectively established simply by the relative axial movement of the first and second tool holding devices. This arrangement advantageously eliminates necessity of means exclusively serving for switching an operational state of the clamping state, namely, selectively establishing the clamping state and the unclamping state.

(3) The tool transfer system according to mode (2), wherein the clamping-device controlling device is, during relative movement of the first and second tool holding devices away from each other in the coaxial state in the process for transferring the tool from the second tool holding device to the first tool holding device, configured to keep the axially movable member to be positioned in the clamping position, irrespective of change of the axial distance.

(4) The tool transfer system according to any one of modes (1) to (3), being configured to transfer the tool from each one of the first tool holding device and the second tool holding device to the other of the first tool holding device and the second tool holding device, by causing the first and second tool holding devices to be moved relative to each other while maintaining a predetermined angular position of one of the first and second tool holding devices relative to the other of the first and second tool holding devices.

In the tool transfer system according to this mode (4), the transfer of the tool between the two tool holding devices is made by causing the two tool holding devices to be moved relative to each other while maintaining a predetermined angular position of one of the two tool holding devices relative to the other of the two tool holding devices, or maintaining a predetermined angular position of the receiving-hole defining member of one of the two tool holding devices relative to the receiving-hole defining member of the other of the two tool holding devices. The tool transfer system may include a device which is configured to inhibit relative rotation of the two tool holding devices so as to maintain the predetermined angular position of the above-described one of the two tool holding devices relative to the other of the two tool holding devices, or which is configured to inhibit relative rotation of the two receiving-hole defining members of the respective two tool holding devices so as to maintain the predetermined angular position of the receiving-hole defining member of one of the two tool holding devices relative to the receiving-hole defining member of the other of the two tool holding devices.

(5) The tool transfer system according to any one of modes (1) to (4),
wherein the second-receiving-hole defining member has (b-2-i) a circumferential wall surrounding the second receiving hole and (b-2-ii) an axially extending passage or opening provided in the circumferential wall and extending from one of axially opposite ends of the circumferential wall toward the other of the axially opposite ends of the circumferential wall such that the second receiving hole is held in communication with an exterior of the second-receiving-hole defining member via the axially extending opening, the tool transfer system being configured to transfer the tool from each one of the first tool holding device and the second tool holding device to the other of the first tool holding device and the second tool holding device, by causing the first and second tool holding devices to be moved relative to each other for introducing and removing the tool into and from the second receiving hole via the axially extending opening, and causing the first and second tool holding devices to be axially moved relative to each other in the coaxial state.

In the tool transfer system according to this mode (5), the tool held at its first-tool-holding-device-side portion by the first tool holding device can be transferred to the second tool holding device, for example, by carrying out a procedure including: (i) a step of positioning the first and second tool holding devices relative to each other such that the second-tool-holding-device-side portion of the tool is positioned in substantially the same position as the second receiving hole in an axial direction parallel to the axis of the second receiving hole; (ii) a step of causing the two tool holding devices to be moved toward each other in a radial direction of the second receiving hole, so as to introduce the tool into the second receiving hole via the axially extending passage or opening provided in the circumferential wall of the second-receiving-hole defining member, while the second-tool-holding-device-side portion of the tool is held positioned in substantially the same position as the second receiving hole in the axial direction; (iii) a step of causing, after an axis of the tool has become aligned with the axis of the second receiving hole, the two tool holding devices to be axially moved toward each other, whereby the operational state of the clamping device is switched from the clamping state to the unclamping state, so that the tool is held at its second-tool-holding-device-side portion by the second tool holding device; and (iv) a step of causing the two tool holding devices to be axially moved away from each other, whereby the tool is removed out of the first receiving hole. The tool held at its second-tool-holding-device-side portion by the second tool holding device can be transferred to the second tool holding device, for example, by carrying out a procedure including: (i) a step of positioning the first and second tool holding devices relative to each other such that the axes of the first and second receiving holes are coaxial with each other; (ii) a step of causing the two tool holding devices to be axially moved toward each other, whereby the tool is held at its first-tool-holding-device-side portion by the first tool holding device, and the operational state of the clamping device is switched from the unclamping state to the clamping state; and (iii) a step of causing the two tool holding devices to be moved away from each other in the radial direction, whereby the tool is removed out of the first receiving hole via the axially extending passage or opening. Thus, in the tool transfer system according to this mode (5), the tool transfer between the two tool holding devices can be made by relative movement of the two tool holding devices, even where the tool is a face mill cutter, a deburring brush or any other tool having a machining portion whose diameter is larger than its shank portion.

The axially extending passage or opening opens in the above-described one of the axially opposite ends of the circumferential wall of second-receiving-hole defining member, which one is closer to the first tool holding device than the other of the axially opposite ends of the circumferential wall. The axially extending opening may extend from this one of the axially opposite ends of the circumferential wall, up to the other of the axially opposite ends of the circumferential wall, so as to extend over an entire axial length of the second-receiving-hole defining member, namely, so as to open not only in the one of the axially opposite ends of the circumferential wall but also in the other of the axially opposite ends of the circumferential wall. Alternately, the axially extending opening may extend from the axially opposite ends of the circumferential wall by a distance smaller than the axial length of the second-receiving-hole defining member, so as not to open in the other of the axially opposite ends of the circumferential wall. The axially extending opening can be formed easier where the axially extending opening extends over the entire axial length of the second-receiving-hole defining member.

Further, in the tool transfer system according to this mode (5), the main body of the second tool holding device may have an opening that allows the tool to be moved in a radial direction of the second receiving hole without the tool being interfered by the second tool holding device. In this arrangement, the opening of the main body of the second tool holding device may extend over an axial length of the main body of the second tool holding device, so as to open both in axially opposite ends of the main body, or alternatively, may extend from one of the axially opposite ends of the main body (which one is closer to the first tool holding device than the other of the axially opposite ends of the main body) by a distance smaller than the axial length of the main body, so as not to open in the other of the axially opposite ends of the main body. This arrangement permits the tool transfer between the two tool holding devices to be made by relative movement of the two tool holding devices, without the tool being interfered by the second tool holding device, even where the tool has a machining portion whose diameter is larger than its shank portion.

(6) The tool transfer system according to any one of modes (1) to (5), wherein the clamping-device controlling device includes (c-1) a movable engaging member that is movable between a working position and a non-working position, wherein the movable engaging member is engageable with the axially movable member of the clamping device of the first tool holding device while being positioned in the working position, such that the axially movable member can be moved by the movable engaging member positioned in the working position, against force of the movable-member forcing device in the backward direction so as to be positioned in the unclamping position, during the relative movement of the first and second tool holding devices toward each other in the coaxial state, wherein the movable engaging member is not engageable with the axially movable member while being positioned in the non-working position, and wherein the clamping-device controlling device further includes (c-2) an engaging-member controlling device that is configured to cause the movable engaging member to be positioned in the non-working position in presence of the opposite movement of the second-receiving-hole defining member against force of the hole-defining-member forcing device in the opposite direction relative to the main body, and to cause the movable engaging member to be positioned in the working position in absence of the opposite movement of the second-receiving-hole defining member.

In the tool transfer system according to this mode (6), while being positioned in the non-working position, the movable engaging member is not engageable with the axially movable member, whereby the axially movable member, which is forced in the forward direction by the movable-member forcing device, is allowed to be moved in the forward direction relative to the first-receiving-hole defining member, so as to be positioned in the clamping position.

(7) The tool transfer system according to mode (6), wherein the engaging-member controlling device of the clamping-device controlling device includes: (c-2-i) an engaging-member forcing device that forces the movable engaging member to be positioned in the working position; and (c-2-ii) a movement converting device that is configured to covert the opposite movement of the second-receiving-hole defining member relative to the main body, into withdrawal movement of the movable engaging member from the working position to the non-working position against force of the engaging-member forcing device.

(8) The tool transfer system according to mode (7), wherein the movement converting device of the engaging-member controlling device is configured such that the withdrawal movement of the movable engaging member, into which the opposite movement of the second-receiving-hole defining member is converted, is made in a direction containing a component parallel to a radial direction of the second receiving hole.

(9) The tool transfer system according to mode (8),
wherein the movable engaging member is held by the second-receiving-hole defining member of the second tool holding device,
wherein the movement converting device of the engaging-member controlling device includes an actuating portion and an actuated portion that are held in contact with each other, such that the actuating portion is provided in the main body of the second tool holding device while the actuated portion is provided in the movable engaging member that is held by the second-receiving-hole defining member of the second tool holding device,
and wherein each of at least one of the actuating portion and the actuated portion includes an inclined surface that is not parallel to a plane perpendicular to second opposite directions in which the second-receiving-hole defining member is movable relative to the main body.

(10) The tool transfer system according to mode (9),
wherein the movable engaging member is pivotable relative to the second-receiving-hole defining member, about a pivot axis which is not parallel to the axis of the second receiving hole and which is distant from the axis of the second receiving hole,
wherein the movable engaging member includes two arm portions that extend from the pivot axis in respective directions that are different from each other,
and wherein one of the two arm portions includes an engaged portion that is to be engaged with the axially movable member of the clamping device of the first tool holding device, while the other of the two arm portions includes the actuated portion.

The movable engaging member may be a linearly movable engaging member that is to be linearly moved between the working position and the non-working position exclusively in directions parallel to the radial direction of the second receiving hole. However, where the movable engaging member is a pivotable engaging member as in this mode (10), the movement of the movable engaging member between the working position and the non-working position can be made by a simple construction.

(11) The tool transfer system according to any one of modes (1) to (7),
wherein the clamping-device controlling device includes (c-1) a movable engaging member that is movable between a working position and a non-working position in the second opposite directions,
wherein the movable engaging member is engageable with the axially movable member of the clamping device of the first tool holding device while being positioned in the working position, such that the axially movable member can be moved by the movable engaging member positioned in the working position, against force of the movable-member forcing device in the backward direction so as to be positioned in the unclamping position, during the relative movement of the first and second tool holding devices toward each other in the coaxial state,
wherein the movable engaging member is not engageable with the axially movable member while being positioned in the non-working position,
wherein the clamping-device controlling device further includes (c-2) an engaging-member controlling device,
wherein the engaging-member controlling device of the clamping-device controlling device includes: (c-2-i) an engaging-member forcing device that forces the movable engaging member to be positioned in the working position; and (c-2-ii) a movement converting device that is configured to covert the opposite movement of the second-receiving-hole defining member relative to the main body, into withdrawal movement of the movable engaging member from the working position to the non-working position against force of the engaging-member forcing device,
wherein the engaging-member controlling device is configured to cause the movable engaging member to be positioned in the non-working position in presence of the opposite movement of the second-receiving-hole defining member against force of the hole-defining-member forcing device in the opposite direction relative to the main body, and to cause the movable engaging member to be positioned in the working position in absence of the opposite movement of the second-receiving-hole defining member,
and wherein the movement converting device is configured to covert the opposite movement of the second-receiving-hole defining member relative to the main body, into withdrawal movement of the movable engaging member in the opposite direction relative to the second-receiving-hole defining member.

In the tool transfer system according to this mode (11), the movement converting device may include a lever that is pivotably held by the main body of the second tool holding device. In this arrangement of with the lever, a distance between a fulcrum portion and an effort portion of the lever is smaller than a distance between the fulcrum portion and a load portion of the lever, wherein the lever is pivotable about the fulcrum portion thereof relative to the main body, wherein the lever is engaged at the effort portion thereof with the second-receiving-hole defining member, and wherein the lever is engaged at the load portion thereof with the movable engaging member. In this arrangement, since the distance between the fulcrum portion and the effort portion of the lever is smaller than the distance between the fulcrum portion and the load portion, the movable engaging member is moved in the above-described opposite direction by a distance larger than a distance by which the second-receiving-hole defining member is moved in the opposite direction, thereby allowing the axially movable member to be moved in the forward direction.

(12) The tool transfer system according to any one of modes (1) to (11),
  wherein the first-receiving-hole defining member of the first tool holding device has (a-1-i) a circumferential wall surrounding the first receiving hole, (a-1-ii) a ball retaining hole extending through the circumferential wall in a radial direction of the first receiving hole, and (a-1-iii) a ball having a diameter larger than a thickness of the circumferential wall and disposed in the ball retaining hole such that the ball is movable relative to the circumferential wall in the radial direction,
  wherein the axially movable member of the clamping device of the first tool holding device is a clamp sleeve which is mounted on an outer circumferential surface of the circumferential wall and which is slidably movable relative to the first-receiving-hole defining member in the first opposite directions,
  wherein the clamp sleeve has an inner circumferential surface including a tapered portion such that a radial distance between the tapered portion of the inner circumferential surface and the outer circumferential surface of the circumferential wall is reduced in the backward direction,
  and wherein the clamping device is configured to establish the clamping state, by causing the ball to be forced inwardly in the radial direction by the tapered portion of the inner circumferential surface of the clamp sleeve that is forced in the forward direction by the movable-member forcing device, and causing the ball to protrude inwardly in the radial direction from an inner circumferential surface of the circumferential wall.

In the tool transfer system according to this mode (12), the clamping device is a ball clamping device that is capable of firmly clamping the tool while assuring a high degree of coaxial alignment between the axis of the tool and the axis of the first receiving hole.

(13) The tool transfer system according to mode (12), wherein the first tool holding device further includes:
  (a-3) a pushing member disposed in the first receiving hole of the first-receiving-hole defining member and movable in the first opposite directions; and
  (a-4) a pushing-member forcing device forcing the pushing member in the forward direction, such that the tool received in the first receiving hole is pushed by the pushing member in the forward direction, and such that the tool is removed from the first receiving hole by the pushing member when the unclamping state is established by the clamping device,
  wherein the pushing member is, in absence of the tool in the first receiving hole, positioned in a position that enables the pushing member to be in contact with the ball disposed in the ball retaining hole, for preventing the ball from protruding inwardly in the radial direction from the inner circumferential surface of the circumferential wall by a distance that is larger than a predetermined distance.

The above-described predetermined distance (i.e., a maximum allowable distance by which the ball is allowed to protrude radially inwardly from the inner circumferential surface of the circumferential wall of the first-receiving-hole defining member) may be zero or a positive value. As a result of relative movement of the first and second tool holding devices toward each other, the axially movable member is moved in the backward direction whereby clamping of the tool by the ball is released. Upon release of clamping of the tool, the tool is removed out of the first receiving hole, by the pushing member that is forced by the pushing-member forcing device, and the ball is radially outwardly forced by a tapered surface of the tool. In this instance, the pushing member is moved in the forward direction to be positioned in a position corresponding to the ball retaining hole, so as to prevent the ball from protruding inwardly in the radial direction from the inner circumferential surface of the circumferential wall by the distance that is larger than the predetermined distance. Where the predetermined distance is set to be relatively large, the pushing member prevents the ball from dropping from the ball retaining hole into the first receiving hole. Where the predetermined distance is set to be considerably small, even when the forward movement of the axially movable member is allowed upon relative movement of the first and second tool holding devices away from each other (which follows relative movement of the two tool holding devices toward each other), the axially movable member cannot push the ball into the first receiving hole, so that the axially movable member cannot be moved to the clamping position (i.e., forward movement end position). In this case, the ball clamping device is held in the unclamping state by the pushing member. Where the above-described predetermined distance is set to a positive value for the purpose of maintain the unclamping state of the ball clamping device, the positive value as the predetermined distance has to be smaller than a value that impedes reception of the tool into the first receiving hole. Where the above-described predetermined distance is set to a positive value for the purpose of preventing the ball from dropping from the ball retaining hole into the first receiving hole, the positive value as the predetermined distance may be larger than where the predetermined distance is set to a positive value for the purpose of maintain the unclamping state of the ball clamping device.

In an arrangement in which the above-described predetermined distance is set to the positive value that enables the ball clamping device to be held in the unclamping state, when the tool is transferred from the second tool holding device to the first tool holding device, the tool forces the pushing member against force of the pushing-member forcing device, without reception of the tool into the first receiving hole being impeded by the ball and the axially movable member, and the ball is not allowed to be moved into the first receiving hole until the tapered surface of the tool reaches the position corresponding to the ball retaining hole. That is, when the tool has reached the position corresponding to the ball retaining hole, the ball is allowed to be moved into the first receiving hole whereby the tool is clamped by the ball. In this arrangement with the predetermined distance being set to the positive value for maintaining the unclamping state of the ball clamping device, too, the ball is prevented, by the pushing member, from dropping from the ball retaining hole into the first receiving hole. Thus, owing to the provision of the single pushing member, it is possible to push the tool out of the first receiving hole and to prevent the ball from the ball retaining hole into the first receiving hole. Further, owing to the provision of the single pushing member, it is possible to maintain the unclamping state of the ball clamping device, by setting the predetermined distance to a suitable value. Consequently, the first holding device as a whole can have a simplified construction. It is noted that features recited in this mode (13) can be embodied without combination with features recited in the above modes (1) to (12).

(14) The tool transfer system according to any one of modes (1) to (13), wherein the second tool holding device includes: (b-4) a removal-preventing-force applying device which is provided in the second-receiving-hole defining member and which is configured, in presence of the tool in the second receiving hole, to apply a removal preventing force to the tool such that the removal preventing force applied to the toll acts against removal of the toll from the second receiving hole.

The removal preventing force applied to the toll may be caused to act against only removal of the toll from the second receiving hole without acting against reception of the tool into the second receiving hole. Alternatively, the removal preventing force applied to the toll may be caused to act not only against removal of the tool from the second receiving hole but also against reception of the tool into the second receiving hole. It is preferable that an amount of the removal preventing force is set to a value which prevents removal of the tool from the second receiving hole upon relative movement of the first and second tool holding devices away from each other while the tool is not being clamped by the clamping device, and which allows the removal of the tool from the second receiving hole upon relative movement of the first and second tool holding devices away from each other while the tool is being clamped by the clamping device.

(15) The tool transfer system according to mode (14),
wherein the second-receiving-hole defining member has (b-2-i) a circumferential wall surrounding the second receiving hole,
wherein the removal-preventing-force applying device includes: (b-4-i) an engaging portion and (b-4-ii) an engaging-portion forcing device,
wherein the engaging portion which is movable in a radial direction of the second receiving hole relative to the circumferential wall of the second-receiving-hole defining member and which is immovable in the second opposite directions relative to the circumferential wall of the second-receiving-hole defining member, the engaging portion including one of a radially protruding portion and a radially recessed portion, so as to be engaged with the other of the radially protruding portion and the radially recessed portion which is included in the tool,
and wherein the engaging-portion forcing device forces the engaging portion inwardly in the radial direction of the second receiving hole.

It is not essential that the engaging portion of the removal-preventing-force applying device includes the radially protruding or recessed portion. For example, the engagement of the engaging portion with the tool may be established simply owing to friction acting between the engaging portion and an outer circumferential surface of the tool, so that the removal preventing force is based on the frictional engagement of the engaging portion with the tool. However, where the engaging portion of the removal-preventing-force applying device includes the radially protruding or recessed portion, as in this mode (15), it is easier to set the amount of the removal preventing force to a desired value.

(16) The tool transfer system according to any one of modes (1) to (15), further including:
(d) an angularly positioning device configured to position each of at least one of the first tool holding device and the second tool holding device, in a predetermined angular position relative to the other of the first and second tool holding devices,
the tool transfer system being configured to transfer the tool from each one of the first and second tool holding devices to the other of the first and second tool holding devices, by causing the first and second tool holding devices to be moved relative to each other while maintaining the predetermined angular position of the each of the at least one of the first and second tool holding devices, after the each of the at least one of the first and second tool holding devices has been positioned in the predetermined angular position by the angularly positioning device.

For example, where the first tool holding device is provided in a machine having a rotatable spindle such that the first tool holding device is provided by the rotatable spindle or is coaxially connected to the rotatable spindle, if the machine has a function of positioning the first tool holding device in a predetermined angular position relative to the second tool holding device, the first tool holding device can be positioned in the predetermined angular position by the positioning function of the machine, as needed, upon transfer of the tool from each one of the first and second tool holding devices to the other of the first and second tool holding devices. However, in the tool transfer system according to this mode (16), each of at least one of the first and second tool holding devices can be positioned in a predetermined angular position relative to the other of the first and second tool holding devices, even where the machine is not provided with the positioning function. It is noted that features recited in this mode (16) can be embodied without combination with features recited in the above modes (1) to (15).

(17) The tool transfer system according to mode (16),
wherein each of at least one of the first tool holding device and the second tool holding device is capable of establishing a freely rotatable state in which the each of the at least one of the first and second tool holding devices is freely rotatable relative to the other of the first and second tool holding devices about a corresponding one of the axis of the first receiving hole and the axis of the second receiving hole,
wherein the each of the at least one of the first and second tool holding devices has an outer cylindrical surface which is coaxial with the corresponding one of the axis of the first receiving hole and the axis of the second receiving hole and which includes at least one flat surface portion that is parallel to the corresponding one of the axes of the respective first and second receiving holes,
wherein the angularly positioning device is a mechanically positioning device including: (d-1) a main body; (d-2) an angularly positioning member having a positioning surface that is engageable with the at least one flat surface portion of the outer cylindrical surface of the each of the at least one of the first and second tool holding devices, the angularly positioning member being held by the main body of the angularly positioning device, and movable in perpendicular directions that are perpendicular to the positioning surface; and (d-3) a positioning-member forcing device forcing the angularly positioning member in a direction away from the main body of the angularly positioning device,
the tool transfer system further including:
(e) a relative movement device configured to cause the angularly positioning device and the each of the at least one of the first and second tool holding devices, to be moved relative to each other in the perpendicular directions and also in directions which are parallel to the positioning surface of the angularly positioning member and which are perpendicular to the corresponding one of the axis of the first receiving hole and the axis of the second receiving hole.

In the tool transfer system according to this mode (17), the angularly positioning device and the outer cylindrical surface of the above-described each of the at least one of the first and second tool holding devices are brought into contact with each other, by relative movement of the angularly positioning device and the above-described each of the at least one of the first and second tool holding devices toward other in one of the perpendicular directions that are perpendicular to the positioning surface, and then the angularly positioning device and the above-described each of the at least one of the first and second tool holding devices are caused to be moved relative to each other in the directions which are parallel to the positioning surface of the angularly positioning member and which are perpendicular to the corresponding one of the axis of the first receiving hole and the axis of the second receiving hole, while the angularly positioning member is moved against force of the positioning-member forcing device, whereby the above-described each of the at least one of the first and second tool holding devices is rotated about the corresponding one of the axis of the first receiving hole and the axis of the second receiving hole, owing to friction acting between the positioning surface of the angularly positioning member and the cylindrical surface of the each of the at least one of the first and second tool holding devices. Then, when the each of the at least one of the first and second tool holding devices is positioned in the predetermined angular position in which each of the at least one flat surface portion of the cylindrical surface is in close contact with the positioning surface of the angularly positioning member, rotation of the above-described each of the at least one of the first and second tool holding devices is stopped whereby the predetermined angular position is maintained.

Thus, in the tool transfer system according to this mode (17), the each of at least one of the first tool holding device and the second tool holding device is mechanically positioned in the predetermined angular position relative to the other of the first and second tool holding devices. The outer cylindrical surface of the each of the at least one of the first and second tool holding devices may include two flat surface portions as the at least one flat surface portion, such that the two flat surface portions are spaced apart from each other in a circumferential direction of the outer cylindrical surface, and are parallel to each other. In this arrangement, each of at least one of the first and second tool holding devices can be positioned in the predetermined angular position relative to the other of the first and second tool holding devices, by engagement of either one of the two flat surface portions of the outer cylindrical surface of the each of the at least one of the first and second tool holding devices with the positioning surface of the angularly positioning member, so that the each of at least one of the first and second tool holding devices can be quickly positioned in the predetermined angular position relative to the other of the first and second tool holding devices, without having to cause the each of at least one of the first and second tool holding devices to be rotated by a large amount. The feature of this mode (12) is advantageous particularly where the tool can be transferred between the two tool holding devices while one of the first and second tool holding devices is being positioned in two predetermined angular positions relative to the other wherein the two predetermined angular positions are offset from each other by 180°.

(18) A tool transfer system including (a) a first tool holding device and (b) a second tool holding device, and configured to transfer a tool between the first and second tool holding devices by causing the first and second tool holding devices to be moved relative to each other;

wherein the first tool holding device includes:

(a-1) a first-receiving-hole defining member defining a first receiving hole that is to receive therein a portion of the tool; and (a-2) a ball clamping device including a clamp sleeve which is axially movable relative to the first-receiving-hole defining member, and which is forced in a direction toward the second tool holding device so as to be positioned in a clamping position for clamping the tool that is received in the first receiving hole, wherein the second tool holding device includes:

(b-1) a main body;

(b-2) a second-receiving-hole defining member defining a second receiving hole which is to receive therein another portion of the tool, the second-receiving-hole defining member being axially movable relative to the main body;

(b-3) a hole-defining-member forcing device forcing the second-receiving-hole defining member in a direction toward the first tool holding device;

(b-4) a movable engaging member which is movable between a working position and a non-working position, the movable engaging member being positioned in the working position in absence of opposite movement of the second receiving-hole defining member against force of the hole-defining-member forcing device relative to the main body in an opposite direction opposite to the direction toward the first tool holding device, the movable engaging member being engageable with the clamp sleeve while being positioned in the working position, such that the clamp sleeve can be moved, by engagement of the movable engaging member with the clamp sleeve, so as to be positioned in an unclamping position, during relative axial movement of the first tool holding device and the second tool holding device toward each other; and (b-5) a movement converting device which is, in presence of the opposite movement of the second receiving-hole defining member, configured to covert the opposite movement of the second-receiving-hole defining member relative to the main body, into withdrawal movement of the movable engaging member from the working position to the non-working position against force of the engaging-member forcing device.

It is noted that this mode (18) can be embodied with combination with any features recited in the above modes (1) to (17).

(19) The tool transfer system according to mode (18), wherein the second receiving hole of the second-receiving-hole defining member has an inner circumferential surface including a contactable portion that extends in a direction containing a component parallel to a radial direction of the second receiving hole, such that a radially extending portion of the tool is brought into contact with the contactable portion during the relative axial movement of the first and second tool holding devices toward each other in a process for transferring the tool from the first tool holding device to the second tool holding device, and wherein the opposite movement of the second-receiving-hole defining member relative to the main body is caused by the contact of the radially extending portion of the tool with the contactable portion of the inner circumferential surface of the second-receiving-hole defining member.

(20) A clamp-controller-equipped tool holding device configured to receive a tool from a clamp-equipped tool holding device and hand over the tool to the clamp-equipped tool holding device, by relative movement of the clamp-controller-equipped tool holding device and the clamp-equipped tool holding device, the clamp-equipped tool holding device including (a-1) a first-receiving-hole defining member defining a first receiving hole that is to receive therein a portion of the tool; and (a-2) a ball clamping device including a clamp sleeve which is axially movable relative to the first-receiving-hole defining member, and which is forced in a direction toward the clamp-controller-equipped tool holding device so as to be positioned in a clamping position for clamping the tool that is received in the first receiving hole, the clamp-controller-equipped tool holding device including:

(b-1) a main body;

(b-2) a second-receiving-hole defining member defining a second receiving hole which is to receive therein another portion of the tool, the second-receiving-hole defining member being axially movable relative to the main body;

(b-3) a hole-defining-member forcing device forcing the second-receiving-hole defining member in a direction toward the clamp-equipped tool holding device;

(b-4) a movable engaging member which is movable between a working position and a non-working position, the movable engaging member being positioned in the working position in absence of opposite movement of the second receiving-hole defining member against force of the hole-defining-member forcing device relative to the main body in an opposite direction opposite to the direction toward the clamp-equipped tool holding device, the movable engaging member being engageable with the clamp sleeve while being positioned in the working position, such that the clamp sleeve can be moved, by engagement of the movable engaging member with the clamp sleeve, so as to be positioned in an unclamping position, during relative axial movement of the clamp-controller-equipped tool holding device and the clamp-equipped tool holding device toward each other; and (b-5) a movement converting device which is, in presence of the opposite movement of the second receiving-hole defining member, configured to covert the opposite movement of the second-receiving-hole defining member relative to the main body, into withdrawal movement of the movable engaging member from the working position to the non-working position against force of the engaging-member forcing device.

It is noted that this mode (20) can be embodied with combination with any features recited in the above modes (1) to (19).

(21) A clamp-controller-equipped tool holding device configured to receive a tool from a clamp-equipped tool holding device and hand over the tool to the clamp-equipped tool holding device, by relative movement of the clamp-controller-equipped tool holding device and the clamp-equipped tool holding device, the clamp-equipped tool holding device including (a-1) a first-receiving-hole defining member defining a first receiving hole that is to receive therein a clamp-equipped-tool-holding-device-side portion of the tool; and (a-2) a clamping device including (a-2-i) an axially movable member movable relative to the first-receiving-hole defining member in first opposite directions that are parallel to an axis of the first receiving hole, so as to be positioned in a clamping position as a result of movement of the axially movable member in a forward direction as one of the first opposite directions that corresponds to a direction toward a front side of the clamp-equipped tool holding device, and so as to be positioned in an unclamping position as a result of movement of the axially movable member in a backward direction as the other of the first opposite directions, and (a-2-ii) a movable-member forcing device forcing the axially movable member in the forward direction, such that the clamping device is configured to establish a clamping state for clamping the tool that is received in the first receiving hole while the axially movable member is being positioned in the clamping position, and to establish an unclamping state for unclamping the tool that is received in the first receiving hole while the axially movable member is being positioned in the unclamping position, the clamp-controller-equipped tool holding device including:

(b-1) a main body;

(b-2) a second-receiving-hole defining member defining a second receiving hole which is to receive therein a clamp-controller-equipped-tool-holding-device-side portion of the tool, the second-receiving-hole defining member being movable relative to the main body in second opposite directions that are parallel to an axis of the second receiving hole, the second opposite directions being parallel to the first opposite directions at least in a coaxial state in which the clamp-controller-equipped tool holding device is positioned on the front side of the clamp-equipped tool holding device with the second receiving hole being coaxial with the first receiving hole;

(b-3) a hole-defining-member forcing device forcing the second-receiving-hole defining member in a forcing direction as one of the second opposite directions, the forcing direction corresponding to the backward direction as the other of the first opposite directions at least in the coaxial state; and (b-4) a clamping-device controlling device which is configured to cause the axially movable member to be moved against force of the movable-member forcing device in the backward direction so as to be positioned in the unclamping position, during relative movement of the clamp-controller-equipped tool holding device and the clamp-equipped tool holding device toward each other in the coaxial state, in absence of opposite movement of the second-receiving-hole defining member against force of the hole-defining-member forcing device in an opposite direction opposite to the forcing direction relative to the main body, and which is configured to allow the axially movable member to be moved owing to the force of the movable-member forcing device in the forward direction so as to be positioned in the clamping position, in presence of the opposite movement of the second-receiving-hole defining member.

(22) The clamp-controller-equipped tool holding device according to mode (21), wherein the clamping-device controlling device is, during the relative movement of the clamp-controller-equipped tool holding device and the clamp-equipped tool holding device toward each other in the coaxial state, configured to cause the axially movable member of the clamping device of the clamp-equipped tool holding device to be positioned in one of the clamping position and the unclamping position which is selected depending on an axial distance between the main body of the clamp-controller-equipped tool holding device and the first-receiving-hole defining member of the clamp-equipped tool holding device, wherein the clamping-device controlling device is, when the axial distance is reduced to a first amount as a result of the relative movement in a process for receiving the tool from the clamp-equipped tool holding device, configured to cause the axially movable member to be moved against force of the movable-member forcing device in the backward direction so as to be positioned in the unclamping position, and wherein the clamping-device controlling device is, when the axial distance is reduced to a second amount that is smaller than the first amount as a result of the relative movement in a process for handing over the tool to the clamp-equipped tool holding device, configured to cause the opposite movement of the second-receiving-hole defining member against the force of the hole-defining-member forcing device relative to the main body, and to allow, as a result of the opposite movement of the second-receiving-hole defining member, the axially movable member to be moved owing to the force of the movable-member forcing device in the forward direction so as to be positioned in the clamping position.

(23) The clamp-controller-equipped tool holding device according to mode (21) or (22), wherein the second-receiving-hole defining member has (b-2-i) a circumferential wall surrounding the second receiving hole and (b-2-ii) an axially extending opening extending in a direction parallel to the axis of the second receiving hole and provided in the circumferential wall such that the second receiving hole is held in communication with an exterior of the second-receiving-hole defining member via the axially extending opening, the clamp-controller-equipped tool holding device being configured to receive the tool from the clamp-equipped tool holding device and hand over the tool to the clamp-equipped tool holding device, by relative movement of the clamp-controller-equipped tool holding device and the clamp-equipped tool holding device for introducing and removing the tool into and from the second receiving hole via the axially extending opening, and by relative movement of the clamp-controller-equipped tool holding device and the clamp-equipped tool holding device in the coaxial state.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENTS

There will be described embodiments of the present invention, by reference to the accompanying drawings. It is to be understood that the present invention is not limited to the embodiments, and may be otherwise embodied with various changes and modifications, such as those described in the foregoing "VARIOUS MODES OF THE INVENTION", which may occur to those skilled in the art.

Figure 1:
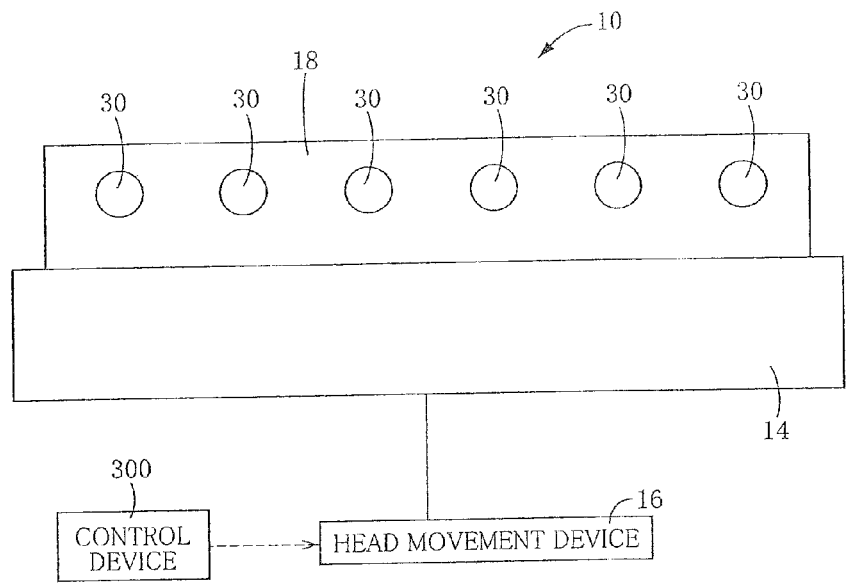
FIG. 1 is a rear view schematically showing a rear view of a machining machine of a machining system equipped with a tool transfer system that is constructed according to an embodiment of the present invention.
Figure 2:
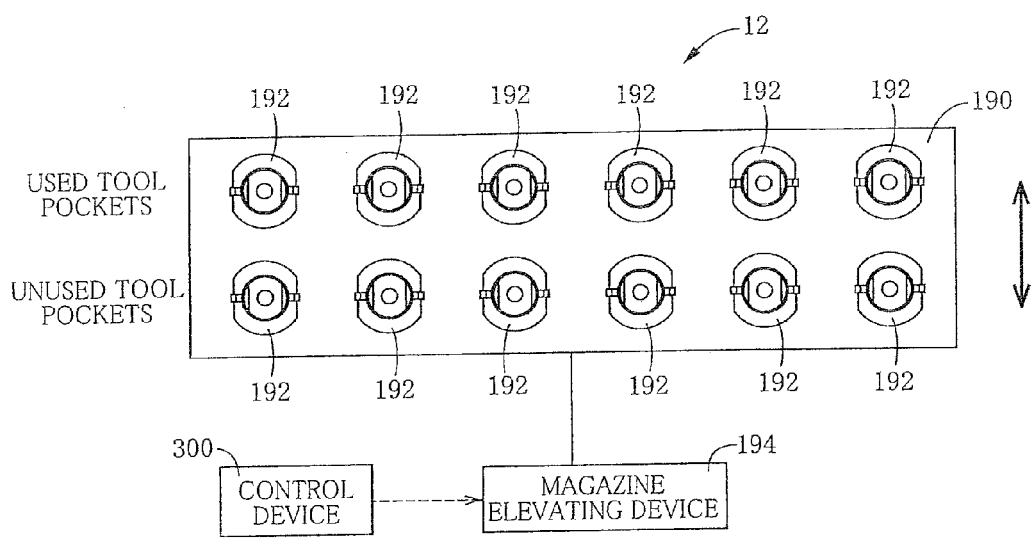
FIG. 2 is a front view of a tool storage device of the machining system.

FIG. 1 shows a machining machine 10, while FIG. 2 shows a tool magazine 12 as an example of a tool storage device. A tool transfer system, which is constructed according to an embodiment of the invention, is to be provided in a machining system that is constituted by the machining machine 10, tool magazine 12 and a work holding device (not shown). The tool transfer system is provided for transferring tools between the machining machine 10 and the tool magazine 12. As shown in FIG. 1, the machining machine 10 is a multi-spindle machining machine having a plurality of spindles 40 (see FIG. 3) and capable of performing different kinds of works onto a single workpiece that is to be held by the work holding device. The machining machine 10 includes a column 14, a head unit 18 that is vertically movably supported by the column 14, and a head movement device 16 that is configured to move the head unit 18. The head movement device 16 includes a longitudinal drive portion configured to move the head unit 18 together with the column 14 in X-axis direction as a horizontal direction, a transversal drive portion configured to move the head unit 18 together with the column 14 in Z-axis direction as another horizontal direction which is perpendicular to the X-axis direction and which is parallel to the spindles 40, and a vertical drive portion configured to move the head unit 18 in Y-axis direction as a vertical direction which is perpendicular to the X-axis direction and Z-axis direction. Each of the drive portions of the head movement device 16 includes a drive source in the form of an electrically-operated rotary motor that is activated to move the head unit 18 to a desired position in a corresponding one of the X-axis direction, Y-axis direction and Z-axis direction. In the present embodiment, the electrically-operated rotary motor is a servo motor quipped with a rotary encoder so that an angular position of a drive shaft of the motor is accurately controllable. However, the electrically-operated rotary motor may be a step motor in place of the servo motor. Further, in the present embodiment, the number of the spindles 40 is six. However, the number of the spindles 40 may be smaller or larger than six. The number of different kinds of works performable onto the workpiece can be increased with increase of the number of the spindles 40. It is noted that the machining system may be referred also to as a so-called machining center.

Figure 3:
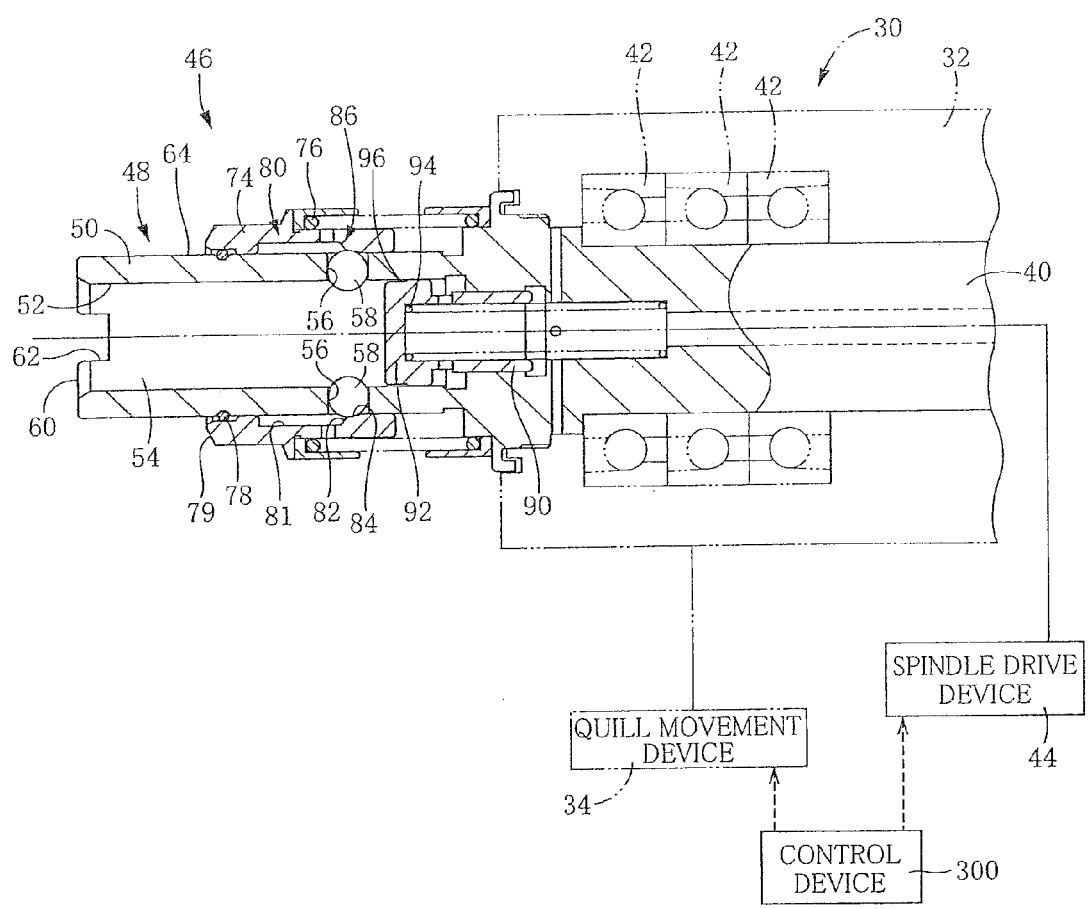
FIG. 3 is a side cross-sectional view of a spindle extension attached to a spindle unit.

As shown in FIG. 1, six quills or spindle units 30 each including the spindle 40 are held in the head unit 18. The six spindle units 30 are arranged in a line that is parallel to the X-axis direction, with a predetermined interval distance between each adjacent two of the spindle units 30. FIG. 3 shows one of the spindle units 30 which have substantially the same construction. Each spindle unit 30 is held at its main body 32 by the head unit 18, and is movable by a quill movement device 34, relative to the head unit 18 in the Z-axis direction. The quill movement device 34 includes a drive source in the form of a hydraulic cylinder that is a kind of hydraulic actuator.

As shown in FIG. 3, the spindle 40 is held by the main body 32 via a plurality of bearings 42, and is rotatable about its axis that is parallel to the Z-axis direction. The spindle 40 is rotated by a spindle drive device 44 that is disposed in the head unit 18. The spindle drive device 44 may be provided for each one of the plurality of spindles 40, or alternatively may be provided as a common drive device that is common to all the plurality of spindles 40 such that rotation is transmitted from the common drive device to each spindle 40 via a transmission provided with a clutch device or the like. In the present embodiment, the spindle drive device 44 includes a drive source in the form of a servo motor quipped with a rotary encoder, and has a spindle orientation function of controlling an angular position in which rotation of the spindle 40 is to be stopped. That is, the spindle drive device 44 includes an angularly positioning device in the form of a spindle orientation device that is configured to electrically position the spindle 40 in a spindle orientation position as an example of a predetermined angular position.

Figure 4:
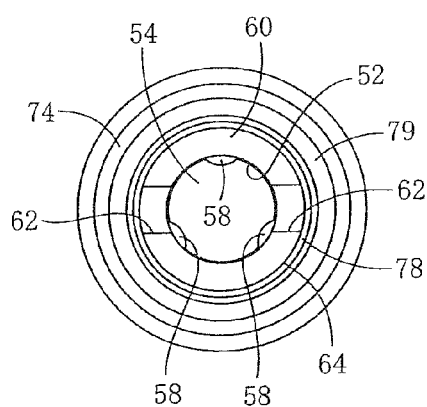
FIG. 4 is a front view of the spindle extension attached to the spindle unit.

A spindle extension 46 as an example of a first tool holding device is coaxially attached to an axially distal end of the spindle 40, and protrudes from the main body 32 of the spindle unit 30. The spindle extension 46 includes a spindle-extension-hole defining member 48 as an example of a first-receiving-hole defining member. The spindle-extension-hole defining member 48 has a tubular-shaped circumferential wall 50, and defines a spindle extension hole 54 as a first receiving hole that is surrounded by an inner circumferential surface 52 of the circumferential wall 50. A plurality of ball retaining holes 56 are provided in a portion of the circumferential wall 50 which is axially distant from a front end surface 60 of the circumferential wall 50 by a predetermined distance. The number of the ball retaining holes 56 is preferably at least three, and is three in the present embodiment. The ball retaining holes 56, each of which is a through-hole extending through the circumferential wall 50 in a radial direction of the spindle extension hole 54, are located on a circle having a center lying at an axis of the spindle extension hole 54, and are equi-angularly spaced apart from each other. A ball 58 having a diameter larger than a thickness of the circumferential wall 50, is movably fitted in each of the ball retaining holes 56, such that the ball 58 is movable relative to the circumferential wall 50 in the radial direction. As shown in FIGS. 3 and 4, two key-receiving cutouts or grooves 62 are provided in the front end surface 60 of the circumferential wall 50, and are located in respective portions of the front end surface 60 which are diametrically opposite to each other. Each of the key-receiving grooves 62 extends through the circumferential wall 50 in the radial direction. Each key-receiving groove 62 serves as an engaging recessed portion as a kind of engaging portion, and constitutes a part of a rotation transmitting portion. It is noted that the number of the key-receiving groove 62 does not necessarily have to be two and may be one.

As shown in FIG. 3, a clamp sleeve 74 as an example of an axially movable member is axially slidably fitted on an outer circumferential surface 64 of the spindle-extension-hole defining member 48, and is forced by a movable-member forcing device in the form of a compression coil spring 76 as an example of an elastic member, in a forward direction (i.e., leftward direction as seen in FIG. 3) that corresponds to one of first opposite directions that is toward a front end of the spindle-extension-hole defining member 48. The compression coil spring 76 is disposed between the clamp sleeve 74 and the spindle-extension-hole defining member 48. The forward movement of the clamp sleeve 74 owing to force of the compression coil spring 76 is limited by contact of the clamp sleeve 74 with a stopper 78 constituted by a stop ring that is fixedly fitted on the outer circumferential surface 64 of the spindle-extension-hole defining member 48. In other words, a forward movement end position of the clamp sleeve 74 is defined by the contact of the clamp sleeve 74 with the stopper 78. Thus, the clamp sleeve 74 is inhibited from being removed from the spindle-extension-hole defining member 48. The clamp sleeve 74 has a front end surface 79 that is tapered such that a radially inner portion of the front end surface 79 is located on a front side of a radially outer portion of the front end surface 79.

As shown in FIG. 3, an annular groove 80 is provided in an inner circumferential surface of the clamp sleeve 74, and has a center lying at an axis of the clamp sleeve 74. The annular groove 80 has a straight portion 81 and a tapered portion 86 which are provided by a front portion and a rear portion of the annular groove 80, respectively. In the straight portion 81, an inner circumferential surface of the annular groove 80 is parallel to the axis of the spindle extension hole 54, namely, parallel to the first opposite directions. In the tapered portion 86, the inner circumferential surface of the annular groove 80 is inclined with respect to the axis of the spindle extension hole 54, such that an inside diameter of the inner circumferential surface of the annular groove 80 is gradually reduced in a backward direction (i.e., rightward direction as seen in FIG. 3) that is opposite to the above-described forward direction. Described more specifically, the tapered portion 86 is sectioned into a steeply tapered portion 82 and a gently tapered portion 84 that is located on a rear side of the steeply tapered portion 82. The inner circumferential surface of the annular groove 80 is inclined with respect to the axis of the spindle extension hole 54 by an angle larger in the steeply tapered portion 82 than in the gently tapered portion 84.

As shown in FIG. 3, a pushing member 90 is axially slidably fitted in the spindle extension hole 54. The pushing member 90 is a tubular-shaped member having a bottom wall 92, and is forced by a pushing-member forcing device in the form of a compression spring as an example of an elastic member, in the forward direction, i.e., the direction toward the front end of the spindle-extension-hole defining member 48. In the present embodiment, the pushing-member forcing device is constituted by a compression coil spring 94 as a kind of the compression spring. The bottom wall 92 of the pushing member 90 constitutes a front end portion of the pushing member 90, and has an outside diameter that is slightly smaller than an inside diameter of the spindle extension hole 54. The pushing member 90 has a fitted portion which is located on a rear side of the bottom wall 92 and which is fitted in the spindle extension hole 54. The pushing member 90 further has an annular-shaped shoulder portion 96 that is located between the bottom wall 92 and the fitted portion, such that the shoulder portion 96 has, in its cross section taken in a plane containing the axis of the pushing member 90, a curved contour whose radius of curvature corresponds to a radius of the ball 58. It is noted that the bottom wall 92 will be hereinafter referred to as a small diameter portion 92.

In the present embodiment, a depth of the straight portion 81 of the annular groove 80 (as measured in the radial direction of the spindle extension hole 54), a depth of the ball retaining hole 56 (corresponding to a thickness of the circumferential wall 50 of the spindle-extension-hole defining member 48 as measured in the radial direction of the spindle extension hole 54), the outside diameter of the small diameter portion 92 of the pushing member 90, the inside diameter of the inner circumferential surface 52 and a diameter of the ball 58 are determined such that the diameter of the ball 58 is equal to a sum of the depth of the straight portion 81 of the annular groove 80, the depth of the ball retaining hole 56 and a difference between the outside diameter of the small diameter portion 92 of the pushing member 90 and the inside diameter of the inner circumferential surface 52, as expressed by the following expression:

(Diameter of ball 58)=(Depth of straight portion 81)+ (Depth of ball retaining hole 56)+|(Outside diameter of small diameter portion 92)−(Inside diameter of inner circumferential surface 52)|

Therefore, while the small diameter portion 92 of the pushing member 90 is being positioned in a position corresponding to the ball retaining hole 56, the ball 58 is prevented from protruding from the inner circumferential surface 52 of the circumferential wall 50 by a distance that is larger than the above-described distance between the outside diameter of the small diameter portion 92 of the pushing member 90 and the inside diameter of the inner circumferential surface 52, namely, by a distance larger than a radial clearance between the small diameter portion 92 of the pushing member 90 and the inner circumferential surface 52 of the circumferential wall 50. Owing to this arrangement, while a tool holder 100 (see FIG. 5) is being separated from the spindle extension 46, it is possible to prevent the ball 58 from being removed from the ball retaining hole 56 and to maintain an unclamping state of a ball clamping device. In the present embodiment, the spindle-extension-hole defining member 48 constitutes the first-receiving-hole defining member that is a main body of the first tool holding device, and the ball 58, clamp sleeve 74 and spring 76 cooperate with one another to constitute the ball clamping device as a kind of clamping device. Further, the spindle-extension-hole defining member 48, ball clamping device, pushing member 90 and spring 94 cooperate with one another to constitute the spindle extension 46 as an example of the first tool holding device that is configured to hold the tool holder 100 so as to hole a tool (held by the tool holder 100). It is noted that the spindle extension 46 may be interpreted also as a part of the spindle 40 so that it is also possible to interpret that the first tool holding device is constituted by the spindle 40.

Figure 5:
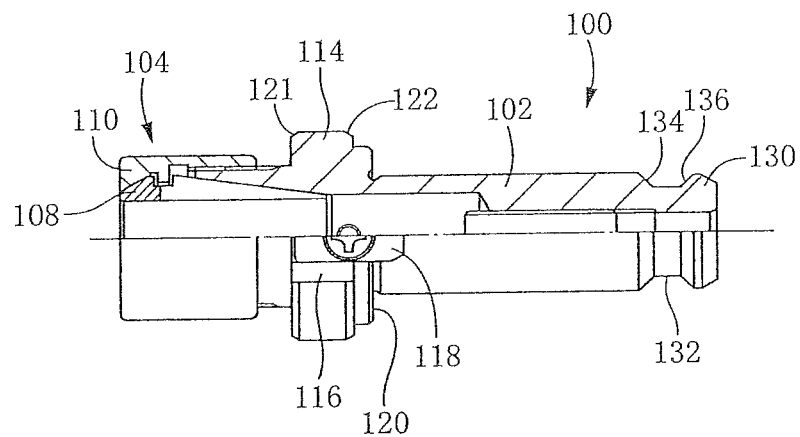
FIG. 5 is a side view, partially in cross section, of a tool holder that is to be held by the spindle extension.
Figure 6:
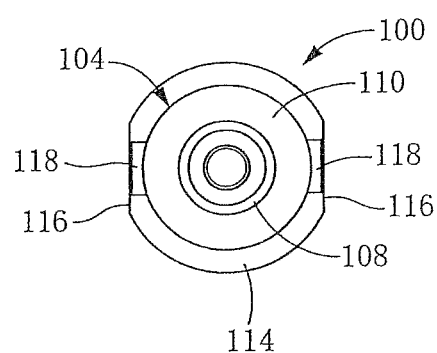
FIG. 6 is a front view of the tool holder.

As shown in FIGS. 5 and 6, the tool holder 100 is principally constituted by a tubular-shaped holder body 102 and a collet chuck 104 that is provided in an axially distal end portion of the holder body 102. The collet chuck 104 includes a collet 108 and a clamp nut 110. The collet 108 is axially movably fitted in a tapered hole of the holder body 102. The clamp nut 110 is screwed onto an externally threaded portion of the holder body 102 which is provided by the axially distal end portion of the holder body 102. By screwing and unscrewing the clamp nut 110 onto and off the externally threaded portion of the holder body 102, it is possible to clamp and unclamp a tool introduced in the collet 108. A radially outwardly extending flange portion 114 is provided on the holder body 102, and is located on a rear side (i.e., right side as seen in FIG. 5) of the collet chuck 104. The flange portion 114 has an outer circumferential surface including a pair of flat surface portions 116 which are formed by removing diametrically opposite portions of the flange portion 114 and which are parallel to an axis of the holder body 102, so that the flange portion 114 has a generally oval shape in its transversal cross section as shown in FIG. 6. A plate-like shaped drive keys 118 are fixedly fitted in respective grooves that are formed in the respective flat surface portions 116 of the outer circumferential surface of the flange portion 114, and protrude from a rear end surface 120 of the flange portion 114 (which is one of opposite end surfaces of the flange portion 114 that is remote from the collet chuck 104) in a direction parallel to the axis of the holder body 102. The drive keys 118 constitute an engaging protruding portion as a kind of engaged portion, and are to fitted into the above-described key-receiving grooves 62 that are provided in the front end surface 60 of the circumferential wall 50 of the spindle-extension-hole defining member 48. Thus, the drive keys 118 cooperate with the key-receiving groove 62 to constitute the rotation transmitting portion. As shown in FIG. 5, the flange portion 114 is a stepped flange portion including a relatively large diameter portion and a relatively small diameter portion. The relatively large diameter portion is provided by a front side portion of the flange portion 114 while the relatively small diameter portion is provided by a rear side portion of the flange portion 114 that includes the above-described rear end surface 120. The relatively large diameter portion of the flange portion 114 is chamfered at its axially opposite end portions so that a front side one of the axially opposite end portions is provided by a tapered portion 121 that has a diameter reduced in a forward direction (i.e., leftward direction as seen in FIG. 5) while a rear side one of the axially opposite end portions is provided by another tapered portion 122 that has a diameter reduced in a backward direction (i.e., rightward direction as seen in FIG. 5).

As shown in FIG. 5, a guide portion 130 and an annular grooved portion 132 are provided in an axially proximal end portion (i.e., right end portion as seen in FIG. 5) of the holder body 102. The guide portion 130 is contiguous to a proximal end surface of the tool holder body 102, and is tapered such that its diameter is linearly reduced in the backward direction. The annular grooved portion 132 is located on a front side of the guide portion 130, and has a front side surface 134 and a rear side surface 136 that are axially spaced apart from each other. The front side surface 134 and the rear side surface 136 are provided by respective tapered surfaces which are inclined with respect of the axis of the holder portion 102 by substantially the same degree in respective directions that are opposite to each other. A radially outer portion of the front side surface 134 is located on a front side of a radially inner portion of the front side surface 134. A radially outer portion of the rear side surface 136 is located on a rear side of a radially inner portion of the rear side surface 136. The holder body 102 has a straight portion that is located between the guide portion 130 and the rear side surface 136 of the annular grooved portion 132. This straight portion has a small axial length and a constant diameter which is substantially the same as a diameter of the small diameter portion 92 of the pushing member 90 and which is smaller than a diameter of the spindle extension hole 54.

As schematically shown in FIG. 2, the tool magazine 12 includes a magazine body 190 and a plurality of tool pockets (tool pots) 192 as examples of second tool holding devices. The plurality of tool pockets 192 are provided in the magazine body 190, and are arranged in a plurality of rows (hereinafter referred to as "tool pocket rows") which extend in a horizontal direction and which are distant from each other in a vertical direction. In the present embodiment, the tool pockets 192 are arranged in two tool pocket rows such that a certain number of the tool pockets 192 are arranged in each one of the two tool pocket rows with a predetermined interval distance between each adjacent two of the tool pockets 192. Each of the tool pockets 192 arranged in an upper row as one of the two tool pocket rows is located in a position aligned with a corresponding one of the tool pockets 192 arranged in a lower row as the other of the two tool pocket rows in the horizontal direction in which the two tool pocket rows extend. The magazine body 190 is located in a position relative to the machining machine 10, such that the above-described horizontal direction in which the two tool pocket rows of the tool pockets 192 extend is coincident with the X-axis direction of the machining machine 10, such that the above-described vertical direction in which the two tool pocket rows are distant from each other is coincident with the Y-axis direction of the machining machine 10, and such that the axis of each tool pocket 192 is parallel to the Z-axis direction of the machining machine 10. The magazine body 190 is vertically movable, by a magazine elevating device 194, between a tool transfer position and a manual operation position. The tool transfer position is located in a machining area in which a machining operation is performed onto a workpiece. While the magazine body 190 is being positioned in the tool transfer position, a tool is transferred between the tool magazine 12 and the machining machine 10. The manual operation position is located in a withdrawal area (working area) that is located on an upper side of the machining area. While the magazine body 190 is being positioned in the manual operation position, a tool held by the tool pocket 192 is replaced with another tool, for example, manually by an operator. In this sense, the manual operation position may be referred also to as a manual tool change position.

Figure 7:
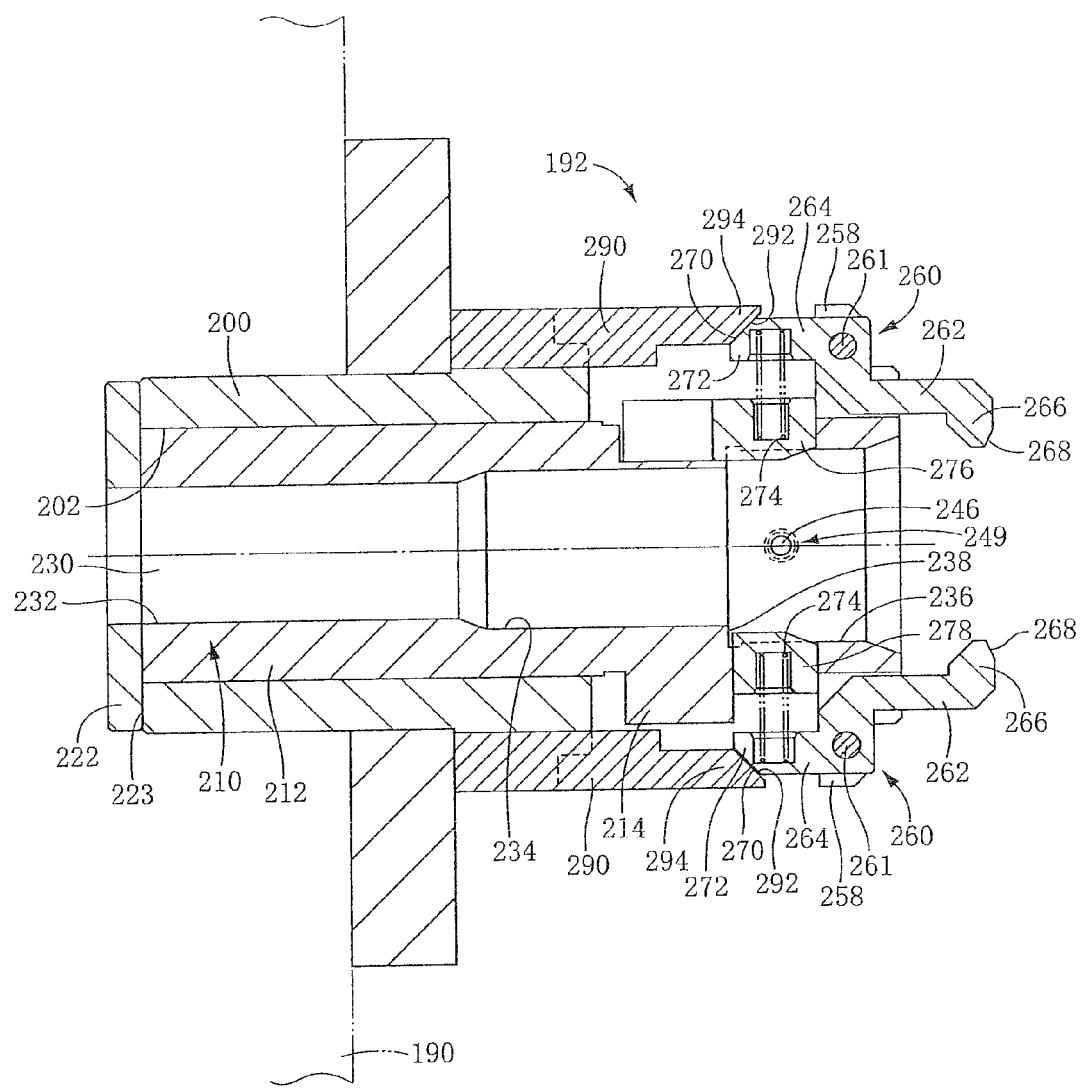
FIG. 7 is a side cross sectional view of a tool pocket of the tool storage device, which is taken in a plane containing an axis of the tool pocket.
Figure 8:
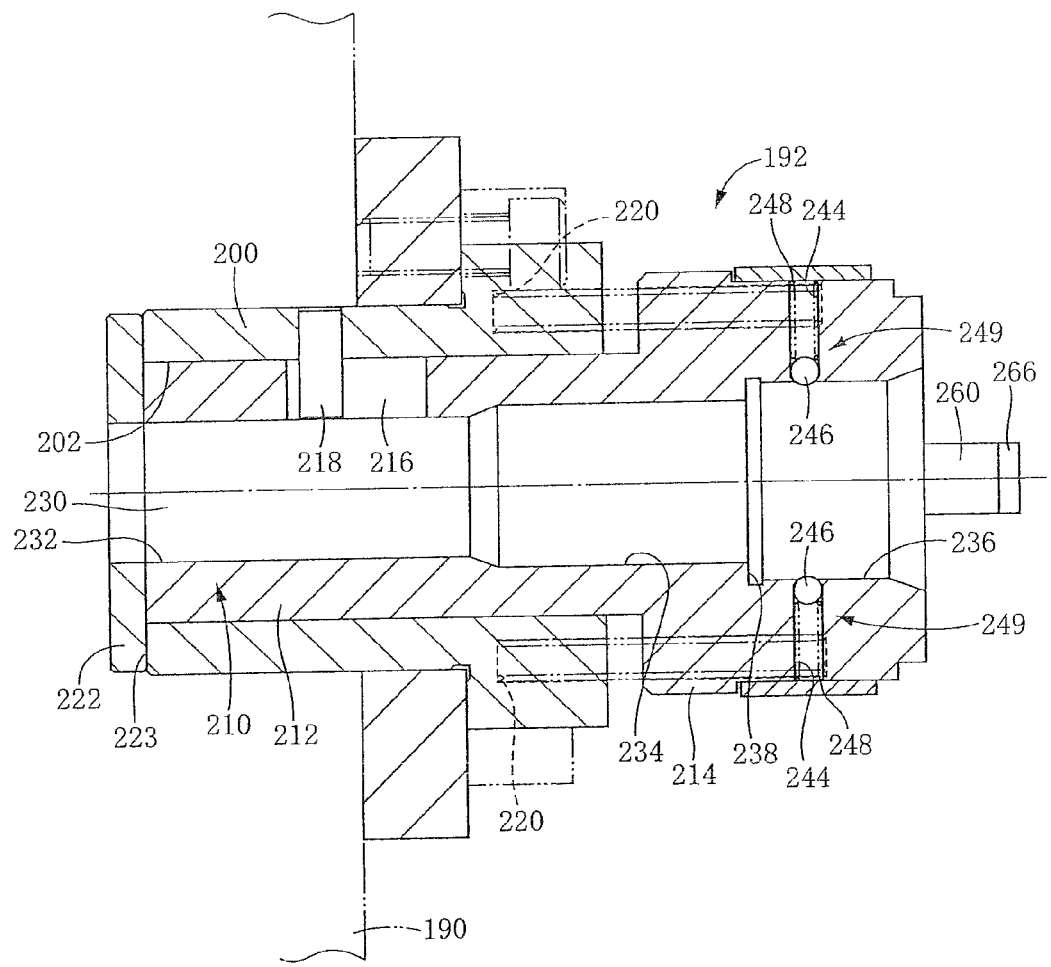
FIG. 8 is another side cross sectional view of the tool pocket, which is taken in another plane containing the axis of the tool pocket and perpendicular to the above-described plane.

Since the plurality of tool pockets 192 have substantially the same construction, one of the tool pockets 192 will be described as a representative one of the tool pockets 192. As shown in FIG. 7, the tool pocket 192 has a pocket body 200 as a main body of the tool pocket 192. The pocket body 200 is removably fixed to the magazine body 190, and has a through-hole 202 which extends in parallel to an axis of the pocket body 200 and which has a circular shape in its transversal cross section. The tool pocket 192 further has a tool-pocket-hole defining member 210 as an example of a second-receiving-hole defining member. The tool-pocket-hole defining member 210 is fitted in the through-hole 202, axially movably and unrotatable relative to the pocket body 200. The tool-pocket-hole defining member 210 has a fitting portion 212 and a holding portion 214 which is located on a front side (i.e., right side as seen in FIG. 7) of the fitting portion 212 and which has an outside diameter larger than an outside diameter of the fitting portion 212, such that the tool-pocket-hole defining member 210 fitted at its fitting portion 212 in the through-hole 202 of the pocket body 200. As shown in FIG. 8, the tool-pocket-hole defining member 210 has an elongated hole 216 which is formed through a circumferential wall of the fitting portion 212 and which extends in parallel to an axis of the tool-pocket-hole defining member 210, while an engaging protrusion 218 is provided to protrude radially inwardly from an inner circumferential surface of the pocket body 200, so that rotation of the tool-pocket-hole defining member 210 relative to the pocket body 200 is inhibited by engagement of the engaging protrusion 218 with the elongated hole 216. Thus, the elongated hole 216 and the engaging protrusion 218 cooperate with each other to constitute a relative rotation inhibiting device. The engaging protrusion 218 is movable relative to the elongated hole 216 in directions parallel to the axis of the tool-pocket-hole defining member 210.

As shown in FIG. 8, the tool-pocket-hole defining member 210 is forced by a hole-defining-member forcing device in the form of at least one compression coil spring 220 as an example of an elastic member. The at least one compression coil spring 220 is disposed between the tool-pocket-hole defining member 210 and the pocket body 200, and consists of a plurality of compression coil springs 220 (for example, four compression coil springs 220) in the present embodiment. The tool-pocket-hole defining member 210 is forced by the compression coil springs 220, in a forward direction (i.e., rightward direction as seen in FIG. 8) corresponding to a direction toward the spindle extension 46 as an example of the first tool holding device. The forward movement of the tool-pocket-hole defining member 210 owing to forces of the springs 220 is limited by contact of a rear end surface 223 of the pocket body 200 with a flange portion 222 of the tool-pocket-hole defining member 210 which is provided by a rear end portion of the tool-pocket-hole defining member 210 and which has a large outside diameter. In other words, a forward movement end position of the tool-pocket-hole defining member 210 is defined by the contact of the rear end surface 223 with the flange portion 222. Thus, the rear end surface 223 constitutes a stopper portion or a forward-movement limiting portion by which the forward movement of the tool-pocket-hole defining member 210 is limited. While the tool-pocket-hole defining member 210 is being positioned in the forward movement end position, the holding portion 214 of the tool-pocket-hole defining member 210 is spaced apart from the pocket body 200.

Figure 9:
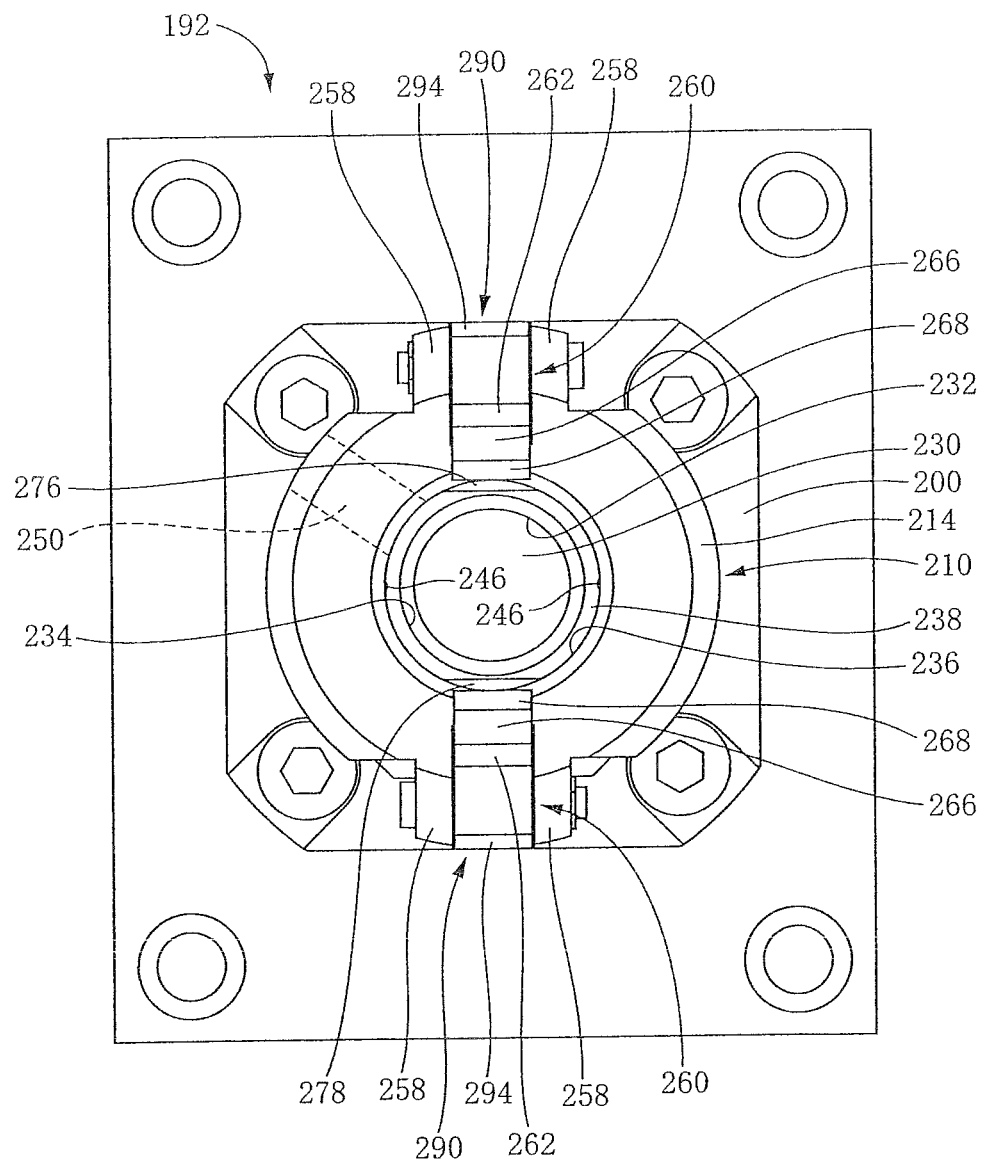
FIG. 9 is a front view of the tool pocket.

As shown in FIGS. 7 and 9, the tool-pocket-hole defining member 210 defines a second receiving hole in the form of a tool pocket hole 230 that extends through an axis of the tool-pocket-hole defining member 210. The tool pocket hole 230 is a stepped hole having a circular shape in its transversal cross section, so as to include a plurality of hole portions having respective diameters different from each other. In the present embodiment, the tool pocket hole 230 includes three hole portions consisting of a tool receiving hole portion 232, a clamp-nut receiving hole portion 234 and a flange receiving hole portion 236 which are arranged in this order of description as viewed in the forward direction (i.e., rightward direction as seen in FIG. 7). The tool receiving hole portion 232 has a diameter larger than a diameter of a tool, so that the tool can be received in the tool receiving hole portion 232 with a radial gap between the tool and the tool receiving hole portion 232. The clamp-nut receiving hole portion 234 has a diameter larger than the diameter of the tool receiving hole portion 232, so that the clamp nut 110 of the tool holder 100 can be fitted into the clamp-nut receiving hole portion 234. The flange receiving hole portion 236 has a diameter larger than the diameter of the clamp-nut receiving hole portion 234, so that the flange portion 114 of the holder body 102 of the tool holder 100 can be fitted into the flange receiving hole portion 236. The tool pocket hole 230 has an inner circumferential surface including a contactable surface portion 238 located between the clamp-nut receiving hole portion 234 and the flange receiving hole portion 236. The contactable surface portion 238 of the inner circumferential surface of the tool pocket hole 230 is perpendicular to an axis of the tool pocket hole 230, namely, perpendicular to second opposite directions, and faces in the forward direction so as to serve as a force receiving surface.

As shown in FIG. 8, two ball retaining holes 244 are provided in the holding portion 214 of the tool-pocket-hole defining member 210, and are located in respective portions of the holding portion 214 which are diametrically opposite to each other. Each of the ball retaining holes 244 radially extends through a circumferential wall surrounding the tool pocket hole 230. A ball 246 is fitted in each of the ball retaining holes 244 such that the ball 246 is movable in the radial direction of the tool pocket hole 230 relative to the tool-pocket-hole defining member 210 and is unmovable in the axial direction of the tool pocket hole 230 relative to the tool-pocket-hole defining member 210. The ball 246 is forced, by an engaging-portion forcing device in the form of a compression coil spring 248 as an example of an elastic member, inwardly in the radial direction, namely, a direction that causes the ball 246 to protrude into the flange receiving hole portion 236 of the tool pocket hole 230. Each of the ball retaining holes 244 has an opening that opens in the inner circumferential surface of the tool pocket body 230. A diameter of this opening of each ball retaining hole 244 is smaller than a diameter of the ball 246, so that radially inward movement of the ball 246 owing to force of the spring 248 is limited by engagement of the ball 246 with the opening of the ball retaining hole 244, and so that removal of the ball 246 from the ball retaining hole 244 is avoided. While the ball 246 is being positioned in a radially inward movement end position, a part of the ball 246 is caused to protrude into the flange receiving hole portion 236 of the tool pocket hole 230, as shown in FIGS. 8 and 9. The radially inward movement end position may be referred also to as engageable position in which the ball 246 is engageable with the tool. In the present embodiment, the ball 246 constitutes a radially protruding portion as an example of an engaging portion. The ball 246 and the spring 248 cooperate with each other to constitute a removal-preventing-force applying device in the form of a set of ball plunger 249 as an example of tool holding means. While two sets of ball plungers 249 are provided in the tool pocket 192 in the present embodiment, the number of sets of ball plungers 249 may be three or more.

As shown in FIG. 9, a holder sensor 250 is provided in the holding portion 214 of the tool-pocket-hole defining member 210, and is located in a portion of the holding portion 214 which is angularly shifted, about the axis of the tool pocket hole 230, from another portion of the holding portion 214 in which one of the two sets of ball plungers 249 is provided, by an angle smaller than 90°. The holder sensor 250 is provided by a proximity switch as a kind of non-contact type sensor, and is configured to output a signal that varies depending on whether the tool holder 100 is being held in the tool pocket 192 or not. Thus, the holder sensor 250 is configured to detect presence of the tool holder 100 in the tool pocket 192, namely, in the tool magazine 12.

As shown in FIGS. 7 and 9, a pair of supporting walls 258 are provided in the holding portion 214 of the tool-pocket-hole defining member 210, and protrude radially outwardly from respective portions of the holding portion 214 which are angularly shifted, about the axis of the tool pocket hole 230, from respective portions of the holding portion 214 in which the two set of ball plungers 249 are provided, by 90°. A movable engaging lever 260 as a kind of pivot engaging member is attached to each one of the supporting walls 258 through a shaft 261, and is pivotable relative to the tool-pocket-hole defining member 210 about a pivot axis which corresponds to an axis of the shaft 261 and which is perpendicular to and distant from the axis of the tool pocket hole 230. The movable engaging lever 260 includes two arm portions 262, 264 that extend from the pivot axis in respective directions that are different from each other. The arm portion 262 extends in a forward direction (i.e., rightward direction as seen in FIG. 7) from the pivot axis to a position that is located on a front side of a front end surface of the tool-pocket-hole defining member 210. An engaging portion 266 is provided to extend from a front end portion of the arm portion 262 inwardly in the radial direction of the tool pocket hole 230. The engaging portion 266 has, in its distal end portion, an inclined surface 268 that is inclined to conform with the tapered front end surface 79 of the clamp sleeve 74. Meanwhile, the arm portion 264 extends in a backward direction (i.e., leftward direction as seen in FIG. 7), and a rear end portion of the arm portion 264 serves as an actuated portion 272. The actuated portion 272 has a cam surface 270 that is inclined with respect to a plane perpendicular to the axis of the tool-pocket-hole defining member 210. The cam surface 270 is inclined, specifically described, such that a radially inner portion of the cam surface 270 is located on a rear side (i.e., left side as seen in FIG. 7) of a radially outer portion of the cam surface 270. Between the arm portion 264 of each of the two movable engaging levers 260 and the tool-pocket-hole defining member 210, a compression coil spring 274 as an example of an engaging-member forcing device is provided so as to force the arm portion 264 of the movable engaging lever 260 outwardly in the radial direction, namely, so as to force the engaging portion 266 (that extends from the front end portion of the arm portion 262) inwardly in the radial direction.

As shown in FIG. 7, the two compression coil springs 274 which force the respective two movable engaging levers 260, are held by respective two spring holders 276, 278. That is, each of the compression coil springs 274 is held at one of its opposite end portions by a corresponding one of the spring holders 276, 278. The spring holders 276, 278 are located in respective positions that are substantially aligned with positions of the respective two sets of ball plungers 249 in the axial direction. Each of the spring holders 276, 278 includes a portion that protrudes into the flange receiving hole portion 236 of the tool pocket hole 230, so that the flange receiving hole portion 236 of the tool pocket hole 230 has, in a transversal cross section taken in a plane passing through the spring holders 276, 278, a generally oval shape (see FIG. 9) that is substantially identical with the generally oval shape of the transversal cross section of the flange portion 114 of the tool holder 100 (see FIG. 6). The two sets of ball plungers 249 are located in respective positions that are distant from each other in a longitudinal direction of the oval shape of the transversal cross section of the flange receiving hole portion 236 of the tool pocket hole 230.

As shown in FIGS. 7 and 9, a pair of actuating members 290 are removably fixed to the pocket body 200, and are located in respective positions which are diametrically opposite to each other and which are aligned with the respective movable engaging levers 260 in a circumferential direction of the tool pocket hole 230. The actuating members 290 extend in parallel to the axis of the tool pocket hole 230, and have respective front end portions (distal end portions) that are located on a front side of the pocket body 200. The front end portion of each of the actuating members 290 serves as an actuating portion 294, and has a cam surface 292 that is to be held in contact with the cam surface 270 of the actuated portion 272 of the movable engaging lever 260. The cam surface 292 is inclined with respect to a plane perpendicular to the axis of the tool-pocket-hole defining member 210. The cam surface 292 is inclined, specifically described, such that a radially inner portion of the cam surface 292 is located on a rear side (i.e., left side as seen in FIG. 7) of a radially outer portion of the cam surface 292. Pivotal movement of the movable engaging lever 260 owing to force of the spring 274 is limited by engagement of the cam surface 270 with the cam surface 292. The movable engaging lever 260 is normally positioned in its working position. While the movable engaging lever 260 is being positioned in the working position, the arm portion 262 of the lever 260 extends in parallel to the axis of the tool pocket hole 230 while the engaging portion 266 of the lever 260 extends perpendicularly to the axial direction of the tool pocket hole 230, so that the movable engaging lever 260 is engageable with the clamp sleeve 74. When the tool-pocket-hole defining member 210 is moved in the backward direction (i.e., leftward direction as seen in FIG. 7) relative to the pocket body 200, the movable engaging lever 260 is pivoted from its working position to its non-working position, owing to effect provided by the cam surfaces 270, 292. With the pivotal movement of the movable engaging lever 260 from the working position to the non-working position against force of the spring 274, the engaging portion 266 of the lever 260 is moved in a direction away from the axis of the tool pocket hole 230. In the present embodiment, the actuated and actuating portions 272, 294 having the cam surfaces 270, 292 cooperate with each other to constitute a movement converting device that is configured to convert the backward movement of the tool-pocket-hole defining member 210 relative to the pocket body 200, into the withdrawal movement of the movable engaging lever 260 from the working position to the non-working position, namely, into the pivotal movement of the lever 260 that is made in a direction containing a component parallel to the radial direction of the tool pocket hole 230 and a component parallel to the axial direction of the tool pocket hole 230. Further, the actuated and actuating portions 272, 294 cooperate with the spring 274 to constitute a pivot engaging-member controlling device, and cooperate with the movable engaging lever 260 to constitute a clamping-device controlling device.

In the present machining system, the machining machine 10 and the tool magazine 12 are controlled by a control device 300, as shown in FIGS. 1 to 3. The control device 300 is principally constituted by a computer, and is configured to cause the machining machine 10 to machine a workpiece and to cause the machining machine 10 and the tool magazine 12 to transfer a tool therebetween, by controlling the head movement device 16, quill movement device 34, spindle drive device 44 and magazine elevating device 194. The signal outputted from the holder sensor 250 (see FIG. 9) is inputted into the computer of the control device 300.

Figure 10:
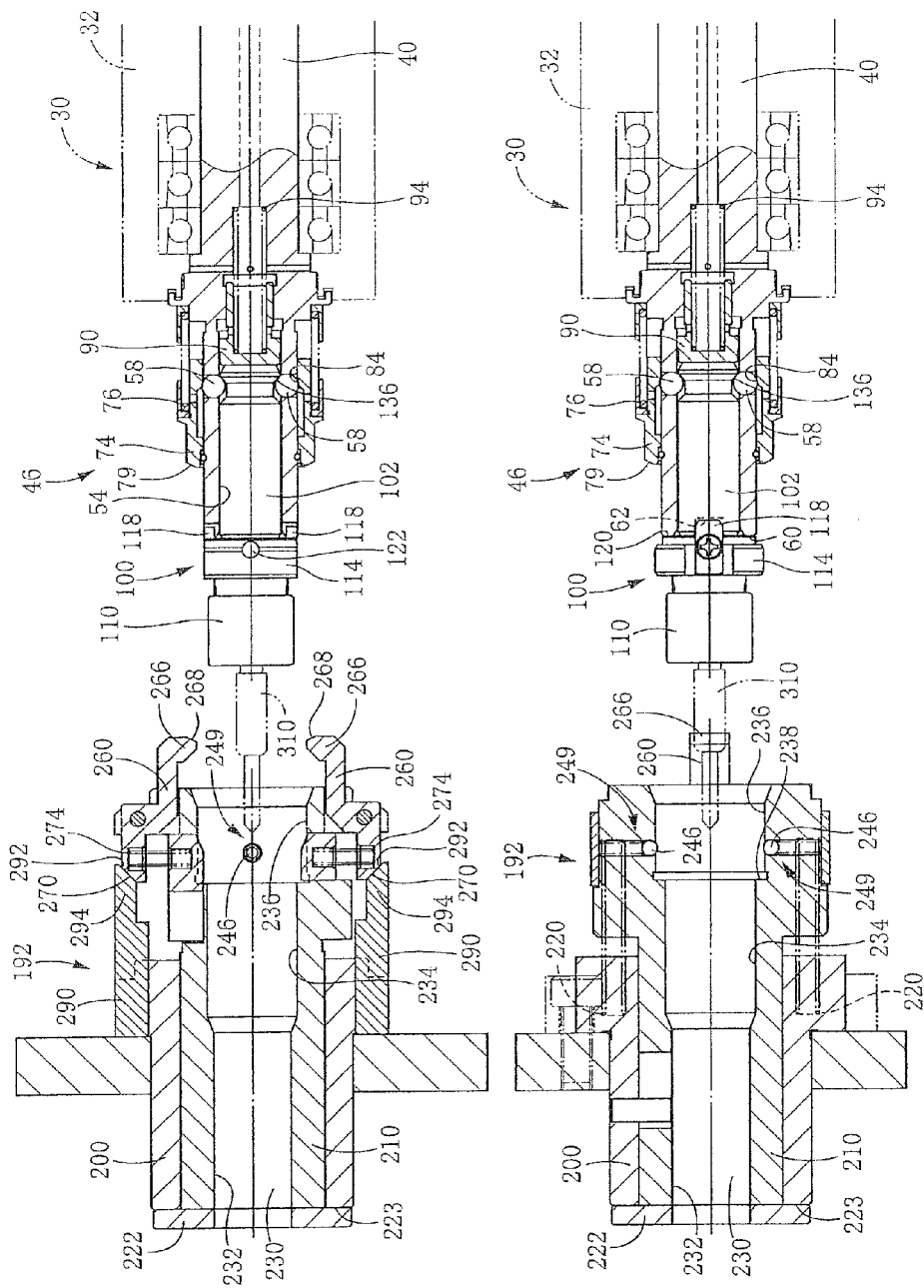
FIG. 10 is a pair of side cross-sectional views showing an initial stage of a tool unloading process for unloading a tool from the spindle extension (as an example of a first tool holding device) to the tool pocket (as an example of a second tool holding device)

There will be described operations performed in the present machining system. The machining machine 10 has the six spindle units 30 for performing various works onto a workpiece. For example, three taps having different diameters may be provided in three of the six spindle units 30, respectively, while three drills each having a diameter suitable for a corresponding one of the three taps may be provided in other three of the six spindle units 30, respectively, so that three kinds of holes having different diameters are prepared and then internal threads are formed in inner circumferential surfaces of the respective prepared holes. Each of the drills and taps is held by the tool holder 100, and is attached to the spindle extension 46 via the tool holder 100. FIG. 10 shows a case in which a drill 310 is attached to the spindle extension 46 that is coaxially fixed to the spindle 40 of the machining machine 10. Described specifically, the drill 310 is clamped by the collet chuck 104 so as to be held by the tool holder 100. The tool holder 100 is clamped by the ball clamping device, while a shank portion of the holder body 102 of the tool holder 100 is fitted in the spindle extension hole 54. The pair of drive keys 118, which are fixed to the flange portion 114 of the tool holder 100, are fitted in the respective key-receiving grooves 62 of the spindle extension 46, so that rotation of the spindle extension 46 is assuredly transmitted to the drill 310 via the tool holder 100.

The clamp sleeve 74 is forced in the forward direction by the spring 76, so that the balls 58 are forced by the gently tapered portion 84 of the clamp sleeve 74, toward the inner circumferential surface 52 of the circumferential wall 50 of the spindle-extension-hole defining member 48, whereby the balls 58 are pressed against the rear side surface 136 of the annular groove portion 132 of the tool holder 100. Since the rear side surface 136 is a tapered surface such that a radially outer portion of the rear side surface 136 is located on a rear side of a radially inner portion of the rear side surface 136, the tool holder 100 is forced into the spindle extension hole 54. By contact of the rear end surface 120 of the flange portion 114 of the tool holder 100 with the front end surface 60 of the spindle extension 46, an axial force acting on the tool is received by the spindle extension 46 and the spindle 40. The pushing member 90 is forced by the spring 94 so as to be in contact with the tool holder 100. However, since the tool holder 100 is forced by the ball clamping device into the spindle extension hole 54 by force whose amount is larger than an amount of force forcing the pushing member 90 in the forward direction (i.e., leftward direction as seen in FIG. 10), the tool holder 100 is kept held by the spindle 40 through the spindle extension 46.

When a hole is to be formed in a workpiece by the drill 310 that is held by one of the quills or spindle units 30 (through the spindle 40, spindle extension 46 and tool holder 100), the one of the quills or spindle units 30 is moved in the forward direction by the corresponding quill movement device 34, so as to be positioned in an advanced position that is located on a front side of a position of each of the other quills or spindle units 30 holding the other drills and taps. That is, one of the spindle units 30 is selected as a working spindle unit by operation of the corresponding quill movement device 34. The forward movement of the selected spindle unit 30 is made by activation of a hydraulic cylinder as component of the corresponding quill movement device 34, and is stopped by a stopper so as to be positioned in the advanced position. Then, while the selected spindle unit 30 is being positioned in the advanced position, the head unit 18 is moved by the head movement device 16 in the X-axis direction and Y-axis direction, such that the drill 310 is positioned in an initial position relative to the workpiece in the X-axis direction and Y-axis direction. Then, while the drill 310 is being positioned in the initial position in the X-axis direction and Y-axis direction, the head unit 18 is moved in Z-axis direction whereby the drill 310 is moved in its axial direction. Thus, the hole is formed in the workpiece by moving the drill 310 in the axial direction and rotating the drill 310 together with the spindle 40 and spindle extension 46 by the spindle drive device 44. In this instance, the head unit 18 is moved in the Z-axis direction by a predetermined distance so that the hole is formed to have a predetermined axial depth or so that the hole is formed through a part or entirety of the workpiece having a dimension as measured in the Z-axis direction. After formation of the hole in the workpiece, the drill 310 is moved back to the initial position by movement of the head unit 18 in Z-axis direction so as to be separated from the workpiece, and the spindle unit 30 is moved in the backward direction by the quill movement device 34. It is noted that movement of the head unit 18 in the X-axis direction, Y-axis direction and Z-axis direction is controlled through a numerical control (NC).

When an internal thread is to be formed in an inner circumferential surface of the prepared hole by a tap held by one of the spindle units 30, the head unit 18 is first moved by the head movement device 16 in the X-axis direction, Y-axis direction and Z-axis direction such that the tap is positioned in an initial position relative to the workpiece in the X-axis direction and Y-axis direction. Then, while the tap is being positioned in the initial position in the X-axis direction and Y-axis direction, the one of the spindle units 30 holding the tap is moved in the forward direction by the corresponding quill movement device 34 while the tap together with the spindle extension 46 is forwardly rotated by the spindle drive device 44, whereby the internal thread is formed in the inner circumferential surface of the prepared hole by the tap. In this instance, the forward movement of the spindle unit 30 is stopped when it is detected that the tap (spindle extension 46) reaches a machining stopping position (forward movement end position). This detection is made, for example, by a spindle-position detecting device that includes a detecting portion (e.g., micro switch, proximity switch) and a detected portion (e.g., dog) such that the detecting portion is provided in one of the spindle unit 30 and the head unit 18 while the detected portion is provided in the other of the spindle unit 30 and the head unit 18. After the above detection, the spindle unit 30 is moved in the backward direction by the quill movement device 34 while the tap together with the spindle extension 46 is reversely rotated by the spindle drive device 44, so that the tap is removed out of the tapped hole.

For example, when a tool held by the spindle extension 46 becomes considerably worn and no longer usable after having been used repeated times, the tool held by the spindle extension 46 is unloaded from the machining machine 10 to the tool magazine 12, and an unused tool is loaded from the tool magazine 12 to the machining machine 10. In the present embodiment, the tool pockets 192 arranged in an upper one of the two tool pocket rows are assigned to store used tools while the tool pockets 192 arranged in a lower one of the two tool pocket rows are assigned to store unused tools. In an initial stage of operation of the present machining system, the tool pockets 192 arranged in the upper tool pocket row are empty while the tool pockets 192 arranged in the lower tool pocket row are filled with unused tools such as drills and taps. Hereinafter, the tool pockets 192 arranged in the upper tool pocket row will be referred to as "used tool pockets 192" while the tool pockets 192 arranged in the lower tool pocket row will be referred to as "unused tool pockets 192".

The tool magazine 12 is positioned in the manual operation position located in the withdrawal area that is located above the machining area, during a machining operation performed by the machining machine 10. When a used tool held by the spindle extension 46 is required to be replaced by an unused tool, the tool magazine 12 is moved by the magazine elevating device 194 down to the tool transfer position located in the machining area. Then, the used tool is unloaded from the spindle extension 46 to one of the used tool pockets 192 so as to be stored in the tool magazine 12.

There will be described a tool unloading process for unloading a used tool from the machining machine 10 to the tool magazine 12, with reference to FIGS. 10 to 14, and a tool loading process for loading an unused tool to the machining machine 10 from the tool magazine 12, with reference to FIGS. 15 to 18. Although a plurality of tools can be simultaneously transferred between the machining machine 10 and the tool magazine 12 (, for example, when the plurality of tools become unusable simultaneously), there will be described herein transference of a single tool, for simplification of the description. It is noted that each of FIGS. 10 to 18 is a pair of views showing the spindle extension 46 as the first holding device and the tool pocket 192 as the second holding device in various stages in the tool unloading process or tool loading process, wherein the two views are taken in different radial directions that are shifted from each other by 90°.

The tool unloading process is initiated by establishing a coaxial state in which the spindle extension hole 54 of the spindle extension 46 (that holds a used tool) and the tool pocket hole 230 of the used tool pocket 192 are coaxial with each other. The coaxial state is established by movement of the head unit 18 of the machining machine 10 relative to the tool magazine 12. Then, a spindle orientation is achieved for rotating the spindle extension 46 for thereby positioning the spindle extension 46 in a spindle orientation position as an example of a predetermined angular position relative to the tool pocket 192. This spindle orientation is required because the pair of drive keys 118 of the tool holder 100 have to be fitted into the respective key-receiving grooves 62 of the spindle extension 46 when a tool is loaded to the spindle extension 46. Therefore, the tool is received by the tool pocket 192 after the spindle extension 46 has been positioned in the spindle orientation position by the spindle orientation. In the present embodiment, the flange portion 114 of the tool holder 100 which has an oval cross-sectional shape (see FIG. 6) is fitted into the flange receiving hole portion 236 of the tool pocket hole 230 which has also an oval cross-sectional shape (FIG. 9), so that the tool held by the tool holder 100 is received into the tool pocket 192 with the tool holder 100 being positioned in a predetermined angular position relative to the tool pocket 192. Since the pair of flat surface portions 116 of the tool holder 100 are engaged with the respective spring holders 276, 278 which define parts of the flange receiving hole portion 236, the tool holder 100 is inhibited form being rotated relative to the tool pocket 192 while being stored in the tool pocket 192. The spindle extension 46 is positioned in the predetermined angular position relative to the tool pocket 192, not only when handing over the tool to the tool pocket 192 but also when receiving the tool from the tool pocket 192. That is, the spindle extension 46 is positioned in the predetermined angular position in which the pair of key-receiving grooves 62 are aligned with the respective spring holders 276, 278 which define parts of the flange receiving hole portion 236, and in which the pair of key-receiving grooves 62 are aligned with the respective drive keys 118 of the tool holder 100 while the tool is being held by the spindle extension 46. Therefore, when the tool is unloaded from the spindle extension 46 to the tool pocket 192, the flange portion 114 of the tool holder 100 can be positioned in a predetermined angular position relative to the flange receiving hole portion 236 of the tool pocket hole 230 so that the tool can be held by the tool pocket 192 with the tool being positioned in a predetermined angular position relative to the tool pocket 192. When the tool is loaded to the spindle extension 46 from the tool pocket 192, the pair of drive keys 118 of the tool holder 100 can be aligned with the respective key-receiving grooves 62 of the spindle extension 46 so that the drive keys 118 can be fitted in the respective key-receiving grooves 62.

In the tool unloading process for unloading the tool from the spindle extension 46 to the tool pocket 192, the spindle drive device 44 is controlled by the control device 300 such that the spindle extension 46 is rotated together with the spindle 40 and is stopped to be positioned in the predetermined angular position whereby the flange portion 114 of the tool holder 100 can be positioned in the predetermined angular position relative to the flange receiving hole portion 236 of the tool pocket hole 230. It is noted that, while the flange portion 114 of the tool holder 100 is being stored in the flange receiving hole portion 236 of the tool pocket hole 230, non-flat surface portions (i.e., cylindrical surface portions) of the outer circumferential surface of the flange portion 114 are radially opposed to the ball plungers 249. The non-flat surface portions of the outer circumferential surface of the flange portion 114 are portions other than flat surface portions 116 of the outer circumferential surface of the flange portion 114 in which the drive keys 118 are provided.

Figure 11:
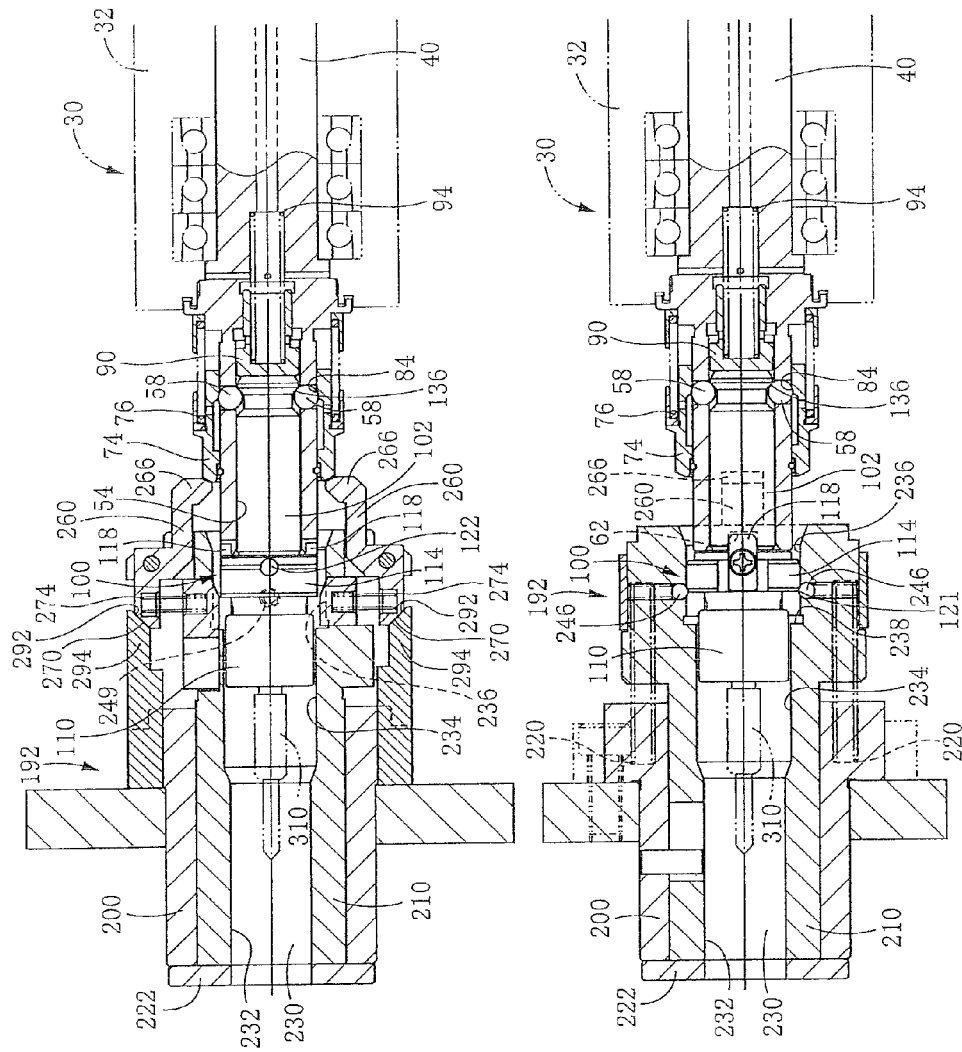
FIG. 11 is a pair of side cross-sectional views showing a stage of the tool unloading process, in which the tool held by the spindle extension is introduced into a receiving hole of the tool pocket and a clamp sleeve of the spindle extension is brought into contact with a movable engaging lever of the tool pocket.

While being positioned in the predetermined angular position, the spindle unit 30 is moved in the forward direction by the quill movement device 34 whereby the spindle extension 46 together with the spindle 40 is moved toward the tool pocket 192. The forward direction corresponds to one of first opposite directions that are parallel to the axis of the spindle extension hole 54 of the spindle extension 46. As a result of the forward movement of the spindle extension 46 toward the tool pocket 192, as shown in FIG. 11, the drill 310 and a left side portion (i.e., portion opposite to a portion that is received in the spindle extension hole 54) of the tool holder 100 are introduced into the tool pocket hole 230, so that the drill 310 is received in the tool receiving hole portion 232 while the clamp nut 110 and the flange portion 114 of the tool holder 100 are fitted in the clamp-nut receiving hole portion 234 and the flange receiving hole portion 236, respectively. In this instance, the balls 246 of the ball plungers 249 are moved, by the tapered portion 121 and the above-described non-flat surface portions of the outer circumferential surface of the flange portion 114, into the ball retaining holes 244 against forces of the springs 248, thereby allowing the flange portion 114 of the tool holder 100 to pass through the ball plungers 249.

Figure 12:
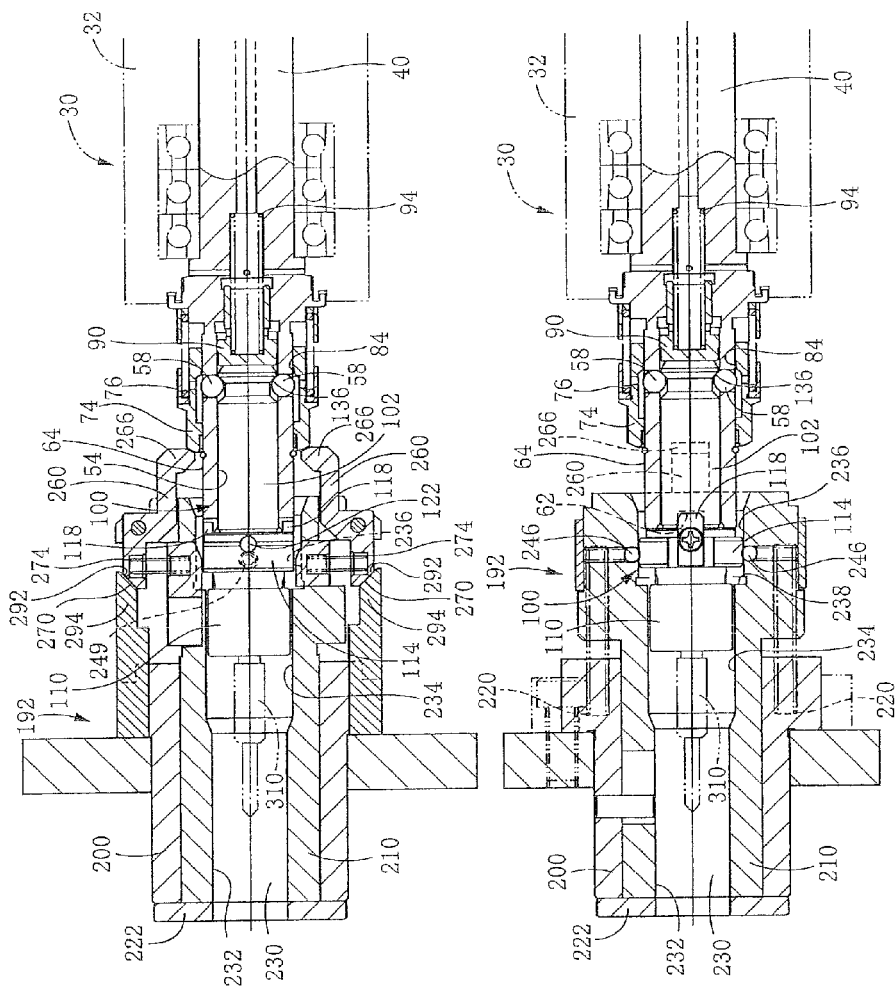
FIG. 12 is a pair of side cross-sectional views showing a stage of the tool unloading process, in which a spindle-extension-hole defining member of the spindle extension is moved in a forward direction relative to the clamp sleeve of the spindle extension.

FIG. 11 shows a stage in which the clamp sleeve 74 is brought into contact with the engaging portions 266 of the movable engaging levers 260 whereby the clamp sleeve 74 is inhibited from being further moved in the forward direction relative to the tool pocket 192. The tool-pocket-hole defining member 210 is forced in a forcing direction (i.e., rightward direction as seen in FIG. 11) as one of the above-described second opposite directions, by forces generated by the four springs 220, wherein a sum of the forces of the four springs 220 is larger than force of the spring 76 forcing the clamp sleeve 74 in the forward direction (i.e., leftward direction as seen in FIG. 11), so that the tool-pocket-hole defining member 210 is not moved in an opposite direction opposite to the forcing direction, whereby the movable engaging levers 260 are held positioned in their working positions so as to be held in engagement with the clamp sleeve 74. With the movable engaging levers 260 being held in engagement with the clamp sleeve 74, the spindle-extension-hole defining member 48 is moved relative to the clamp sleeve 74 in the forward direction, while causing the spring 76 to be compressed. In other words, the clamp sleeve 74 is moved relative to the spindle-extension-hole defining member 48 in the backward direction against the force of the spring 76. As a result of the backward movement of the clamp sleeve 74 relative to the spindle-extension-hole defining member 48, as shown in FIG. 12, the balls 58 are moved relative to the clamp sleeve 74 in the forward direction, so as to be separated from the gently tapered portion 84, so that clamping of the tool holder 100 by the ball clamping device is released. Thus, each of the balls 58, which have been introduced in the annular grooved portion 132 of the tool holder 100, is allowed to be moved toward the outer circumferential surface 64 of the spindle-extension-hole defining member 48, and is forced radially outwardly by the rear side surface 136 of the grooved portion 132 of the tool holder 100. The tool holder 100 is pushed out of the spindle extension 54, by the pushing member 90 based on force of the spring 94. The forward movement of the spindle unit 30 is stopped in the tool unloading process when it is detected that the spindle extension 46 reaches a tool-unloading forward movement end position as a predetermined position. This detection is made, for example, by the above-described spindle-position detecting device that includes a detecting portion and a detected portion such that the detecting portion is provided in one of the spindle unit 30 and the head unit 18 while the detected portion is provided in the other of the spindle unit 30 and the head unit 18. One of the detecting portion and the detected portion may be provided by a corresponding one of the above-described detecting and detected portions that are used for detecting that the tap reaches the machining stopping position in the internal thread forming operation.

Figure 13:
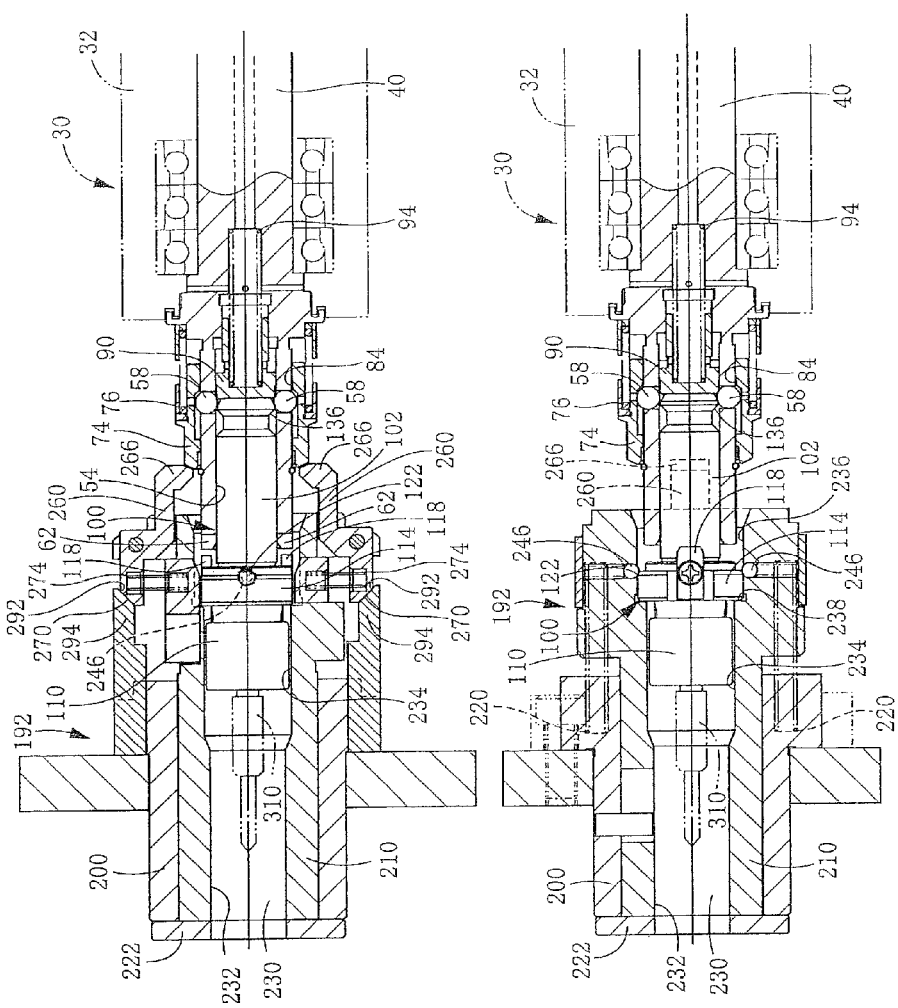
FIG. 13 is a pair of side cross-sectional views showing a stage of the tool unloading process, in which the tool is pushed by a pushing member of the spindle extension.

FIG. 13 shows a stage in which the tool holder 100 is pushed out of the spindle extension hole 54 and is pushed into the tool pocket 230, and the flange portion 114 is brought into contact with the contactable surface portion 238 of the tool pocket hole 230. In this stage, the balls 246 of the respective sets of ball plungers 249 protrude into the flange receiving hole portion 236 of the tool pocket hole 230, and is engaged with the tapered portion 122 of the flange portion 114, so that the tool holder 100 is held in the used tool pocket 192 while being prevented from being removed from the tool pocket hole 230. Although being located on only one side of each ball 246 that constitutes the radially protruding portion, the tapered portion 122 of the flange portion 114 constitutes a radially recessed portion that is to be engaged with the radially protruding portion, and serves as an engaged portion that is to be engaged with each ball 246 that serves as an engaging portion. Further, in this stage shown in FIG. 13, the pushing member 90 has been moved in the forward direction such that the small diameter portion 92 of the pushing member 90 is positioned in a position corresponding to the ball retaining holes 56, whereby each ball 58 is prevented from protruding into the spindle extension hole 54 by a distance larger than a radial clearance between the small diameter portion 92 of the pushing member 90 and the inner circumferential surface 52 of the spindle-extension-hole defining member 48.

Figure 14:
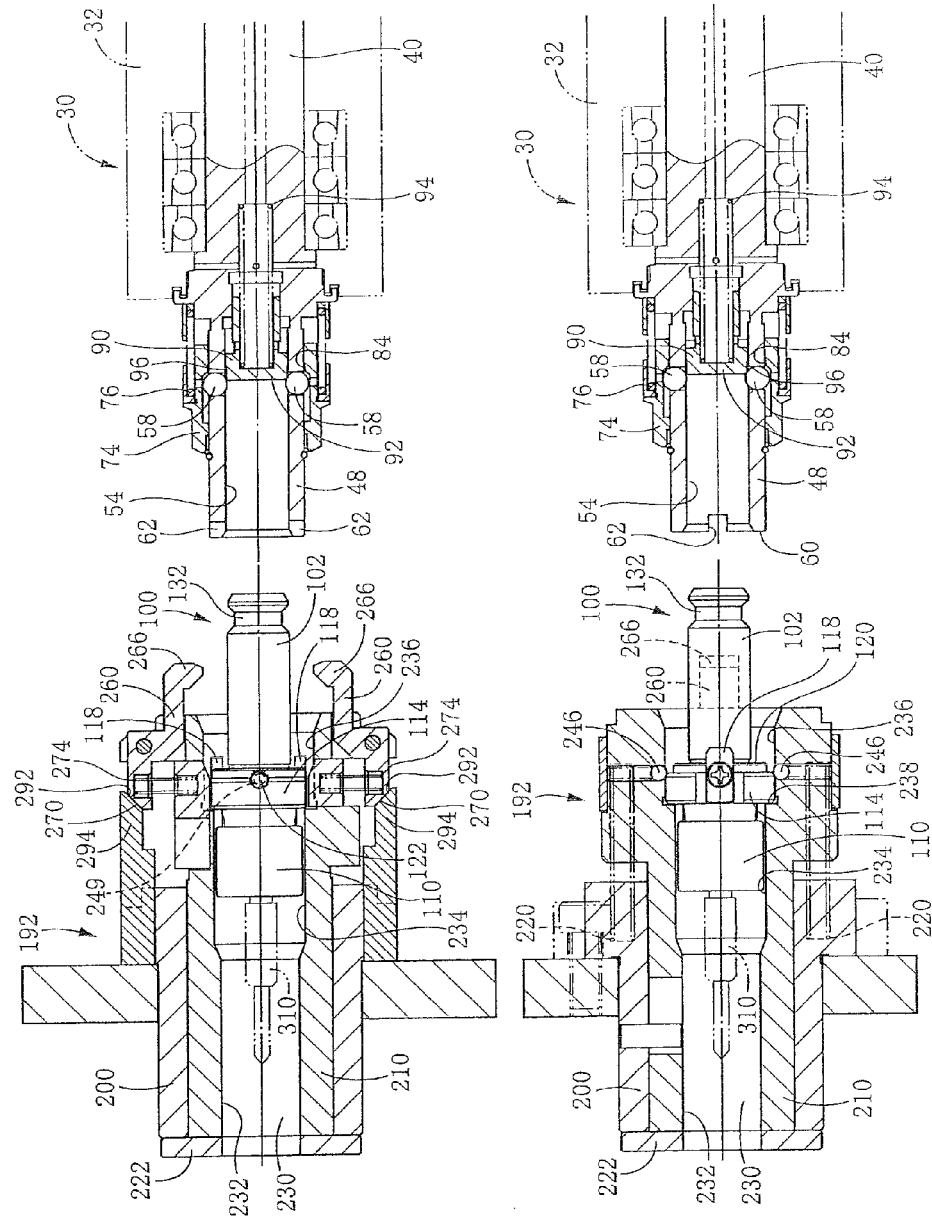
FIG. 14 is a pair of side cross-sectional views showing a stage of the tool unloading process, in which the tool is removed out of the spindle extension after being received by the tool pocket.

FIG. 14 shows a stage in which the spindle unit 30 is moved in the backward direction by the quill movement device 34, so as to be separated from the tool pocket 192, whereby the tool holder 100 is removed out of the spindle extension hole 54. In this stage, owing to the engagement of the balls 246 of the ball plungers 249 with the tapered surface 122 of the flange portion 114, a removal preventing force is applied to the tool holder 100 whereby the tool holder 100 is prevented from being removed from the tool pocket hole 230. Meanwhile, the clamp sleeve 74 is separated from the movable engaging levers 260 as a result of separation of the spindle extension 46 from the tool pocket 192, and is moved in the forward direction owing to force of the spring 76. Since the pushing member 90 prevents each ball 58 from protruding into the spindle extension hole 54 by a distance larger than a radial clearance between the small diameter portion 92 of the pushing member 90 and the inner circumferential surface 52 of the spindle extension hole 54, the clamp sleeve 74 cannot be forwardly moved to a clamping position (in which the gently tapered portion 84 is to be brought into contact with the balls 58 so as to force the balls 58 into the respective ball retaining holes 56), and is held in an unclamping position (in which the steeply tapered portion 82 is in contact with the balls 58), so that the unclamping state of the ball clamping device is maintained. The pushing member 90 serves also to prevent the balls 58 from dropping from the respective ball retaining holes 56 into the spindle extension hole 54. Further, the pushing member 90 is in contact at its annular-shaped shoulder portion 96 with the balls 58, so that the balls 58 serve to prevent the pushing member 90 from being removed from the spindle extension hole 54. That is, the balls 58 can be considered to constitute a stopper portion or a removal preventing portion configured to stop the forward movement of the pushing member 90 or to prevent removal of the pushing member 90 from being removed from the spindle extension hole 54.

Further, in this stage shown in FIG. 14, it is judged whether the tool is being held by the used tool pocket 192. This judgment is made, by the computer of the control device 300, based on the signal that is outputted from the holder sensor 250. If presence of the tool in the tool pocket 192 is not detected by the holder sensor 250 in spite of completion of the relative movement of the spindle extension 46 and the tool pocket 192 which is required for the tool unloading process, an operator is informed, by an warning device, for example, of the failure of detection of the presence of the tool in the tool pocket 192.

The tool unloading process is followed by the tool loading process that is carried out for loading an unused tool from an unused tool pocket 192 to the spindle extension 46, from which the used tool has been unloaded to the used tool pocket 192 in the tool unloading process. The loading process is initiated by establishing a coaxial state in which the spindle extension hole 54 of the spindle extension 46 and the tool pocket hole 230 of an unused tool pocket 192 (which holds an unused tool and which is located below the used tool pocket 192) are coaxial with each other. The coaxial state is established by causing the magazine elevating device 194 to elevate the tool magazine 12. The spindle extension 46, which has handed over the used tool to the used tool pocket 192, is already positioned in the predetermined angular position in which the pair of key-receiving grooves 62 are aligned with the respective drive keys 118, so that the spindle extension 46 is not required to be rotated for the spindle orientation. This stage is shown in FIG. 14, although the spindle extension 46 is opposed to the unused tool pocket 192 (rather than to the used tool pocket 192) in this stage.

Figure 15:
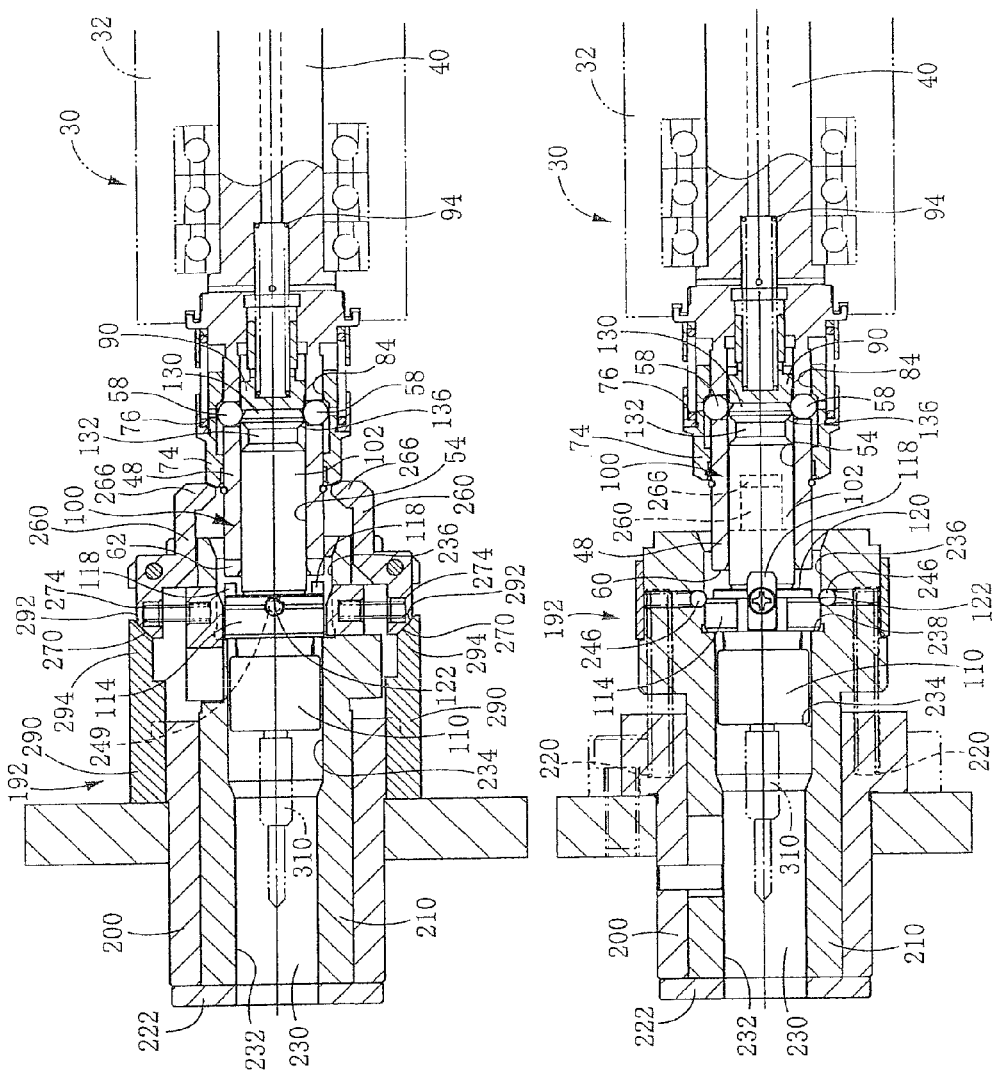
FIG. 15 is a pair of side cross-sectional views showing a stage of a tool loading process for loading a tool from the tool pocket to the spindle extension, in which the clamp sleeve is brought into contact with the movable engaging lever of the tool pocket.

FIG. 15 shows a stage in which the spindle unit 30 has been moved in the forward direction so that a right side portion (i.e., portion opposite to the portion that is received in the tool pocket hole 230) of the tool holder 100 is fitted into the spindle extension hole 54 of the spindle extension 46. In this stage, the tool holder 100 can be fitted into the spindle extension hole 54, without introduction of the tool holder 100 into the spindle extension hole 54 being impeded by the balls 58 of the ball clamping device, because the unclamping state of the ball clamping device is maintained after the drill 310 has been unloaded from the spindle extension 46 to the used tool pocket 192, as described above. As a result of the forward movement of the spindle extension 46, the pushing member 90 is brought into contact with the tool holder 100, and then the spring 94 is compressed. Meanwhile, the clamp sleeve 74 is brought into contact with the engaging portions 266 of the respective movable engaging levers 260. Described specifically, the clamp sleeve 74 is brought into contact at its tapered front end surface 79 with the inclined surface 268 of the engaging portion 266 of each of the movable engaging levers 260. In the present embodiment, the clamp sleeve 74 is brought into contact with the movable engaging levers 260 after the pushing member 90 has been brought into contact with the tool holder 100 during the forward movement of the spindle extension 46. However, the contact of the clamp sleeve 74 with the movable engaging levers 260 may be made before the contact of the pushing member 90 with the tool holder 100 during the forward movement of the spindle extension 46.

The spindle extension 46 is further moved in the forward direction relative to the pushing member 90 and the clamp sleeve 74, causing the spring 94 and the spring 76 to be compressed. The sum of the forces of the four springs 220, which force the tool-pocket-hole defining member 210 in the forcing direction (i.e., rightward direction as seen in FIG. 15), is larger than a sum of forces of the springs 76, 94, so that the tool-pocket-hole defining member 210 is not moved in the opposite direction opposite to the forcing direction, whereby the movable engaging levers 260 are held positioned in their working positions so as to be held in engagement with the clamp sleeve 74. Meanwhile, the pushing member 90 is moved in the backward direction against force of the spring 94 whereby the tool holder 100 is further inserted into the spindle extension hole 54. As described above, the straight portion of the axially proximal end portion of the tool holder 100, which is located between the guide portion 130 and the rear side surface 136 of the annular grooved portion 132, has the diameter which is substantially the same as the diameter of the small diameter portion 92 of the pushing member 90 and which is smaller than the diameter of the spindle extension hole 54, so that the balls 58 can be moved relative to the tool holder 100 in the forward direction, passing over the axially proximal end portion of the tool holder 100. In this instance, even if the balls 58 enter into a space between the small diameter portion 92 of the pushing member 90 and the guide portion 130 of the tool holder 100, the balls 58 are guided by inclination of the guide portion 130 and moved back toward the respective ball retaining holes 56 so that the balls 58 can pass over the axially proximal end portion of the tool holder 100 after all.

Figure 16:
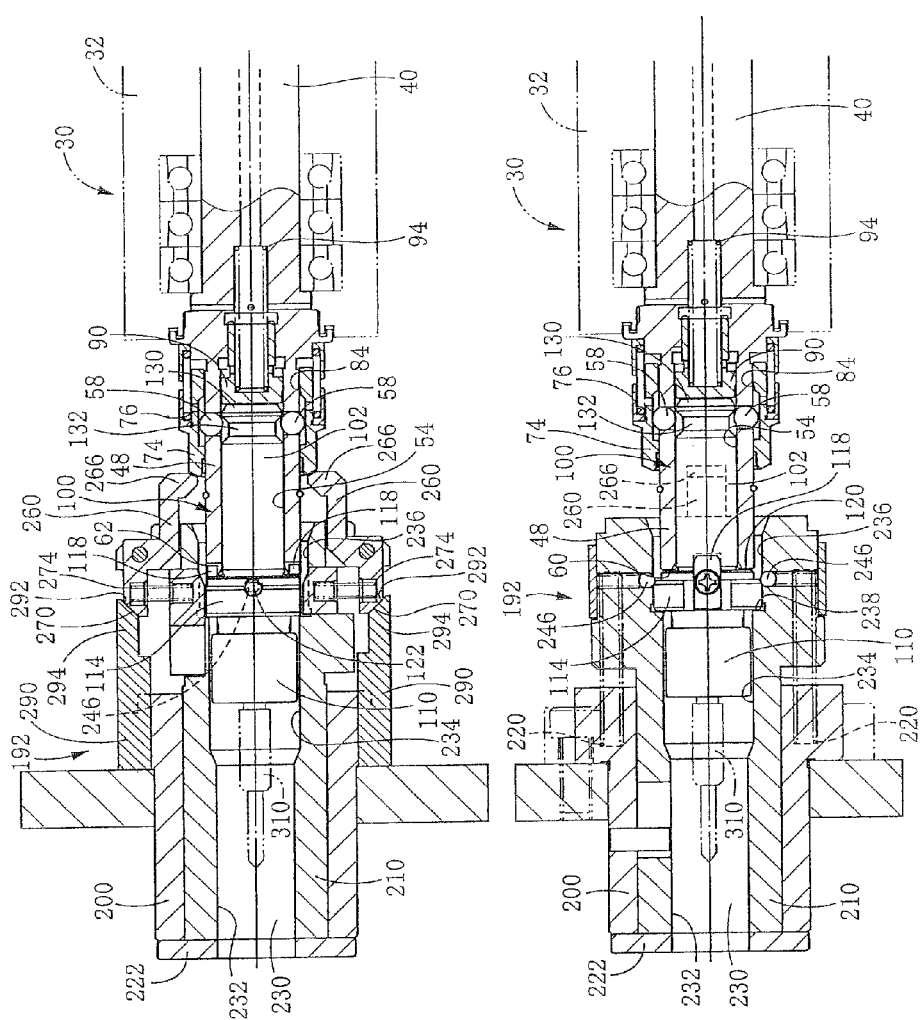
FIG. 16 is a pair of side cross-sectional views showing a stage of the tool loading process, in which a distal end face of the spindle-extension-hole defining member is brought into contact with a tool holder that holds the tool.

FIG. 16 shows a stage in which the key-receiving grooves 62 of the spindle extension 46 are fitted onto the drive keys 118 of the tool holder 100 while the front end surface 60 of the spindle extension 46 is brought into contact with the rear end surface 120 of the flange portion 114 of the tool holder 100. Further, in this stage, each of the balls 58 is positioned in a position corresponding to the annular grooved portion 132 of the tool holder 100, so as to be engageable with the rear side surface 120 of the annular grooved portion 132.

Figure 17:
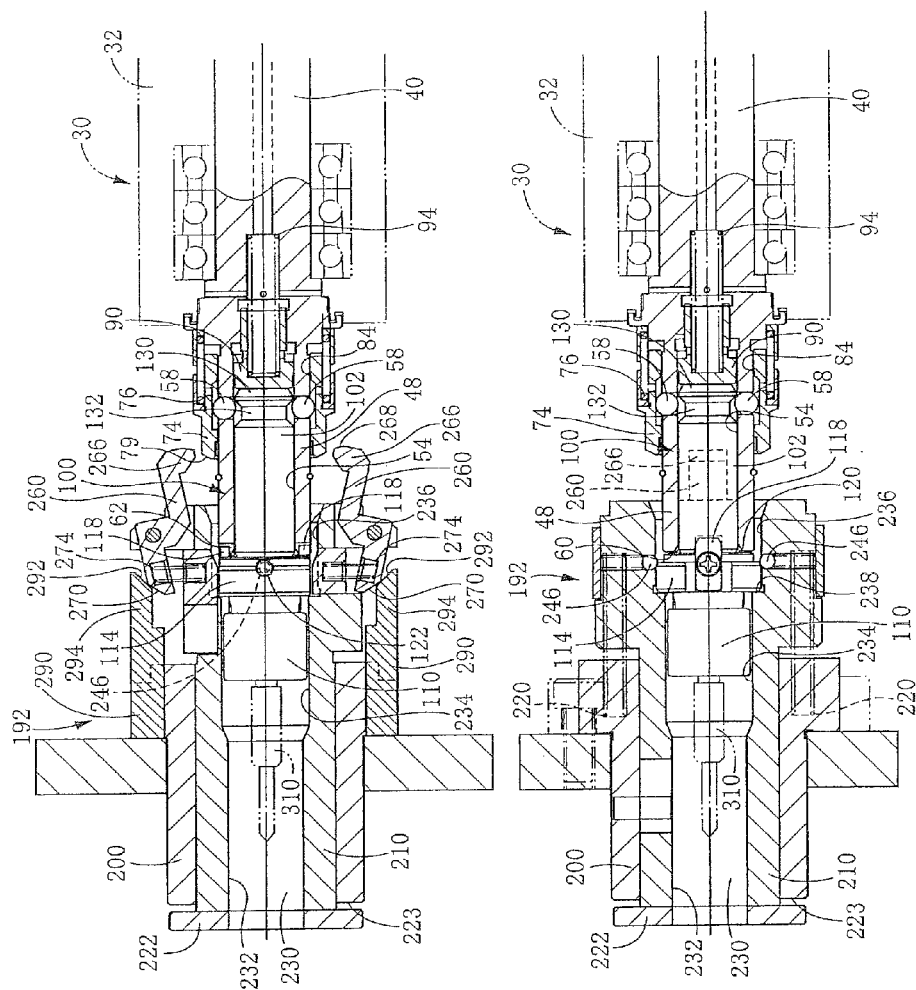
FIG. 17 is a pair of side cross-sectional views showing a stage of the tool loading process, in which the movable engaging lever has been moved to its non-working position as a result of backward movement of a tool-pocket-hole defining member of the tool pocket relative to a main body of the tool pocket.

FIG. 17 shows a stage in which the tool-pocket-hole defining member 210 has been moved relative to the pocket body 200 in the opposite direction (i.e., leftward direction as seen in FIG. 17), by contact of the front end surface 60 of the spindle extension 46 with the rear end surface 120 of the flange portion 114 and also contact of the flange portion 114 with the contactable surface portion 238 of the tool-pocket-hole defining member 210. The opposite movement of the tool-pocket-hole defining member 210 relative to the pocket body 200 is caused based on force of the quill movement device 34 acting in the tool-pocket-hole defining member 210 via the tool holder 100 in the opposite direction. More specifically, the opposite movement of the tool-pocket-hole defining member 210 is caused when a sum of the forces of the respective springs 76, 94 and the force applied to the tool-pocket-hole defining member 210 from the quill movement device 34 is larger than a sum of the forces of the four springs 220. During the opposite movement of the tool-pocket-hole defining member 210, the front end surface 60 of the spindle extension 46 serves as a force applying surface, and the flange portion 114 of the tool holder 100 serves as a force transmitting portion.

When the tool-pocket-hole defining member 210 is moved in the opposite direction, the movable engaging levers 260 are also moved in the opposite direction since the movable engaging levers 260 are pivotably held by the tool-pocket-hole defining member 210. However, in this instance, since the movable engaging levers 260 are held in contact at their respective cam surfaces 270 with the cam surfaces 292 of the respective actuating members 290 that are fixed to the pocket body 200, the movable engaging levers 260 are pivoted to be withdrawn to their respective non-working positions owing to the contacts of the levers 260 with the actuating members 290, as a result of the opposite movement of the tool-pocket-hole defining member 210 relative to the pocket body 200. In absence of the opposite movement of the tool-pocket-hole defining member 210, the movable engaging levers 260 are held in contact at their inclined surfaces 268 with the tapered front end surface 79 of the clamp sleeve 74. Therefore, owing to effect of the inclined surfaces 268, 79, upon the opposite movement of the tool-pocket-hole defining member 210, the movable engaging levers 260 are smoothly pivoted to their non-working positions after once having forced the clamp sleeve 74 to be moved in the backward direction against the force of the spring 76. When the movable engaging levers 260 are disengaged from the clamp sleeve 74 as a result of pivotal movements of the movable engaging lever 260 to the non-working positions, the clamp sleeve 74 is allowed to be moved in the forward direction.

Figure 18:
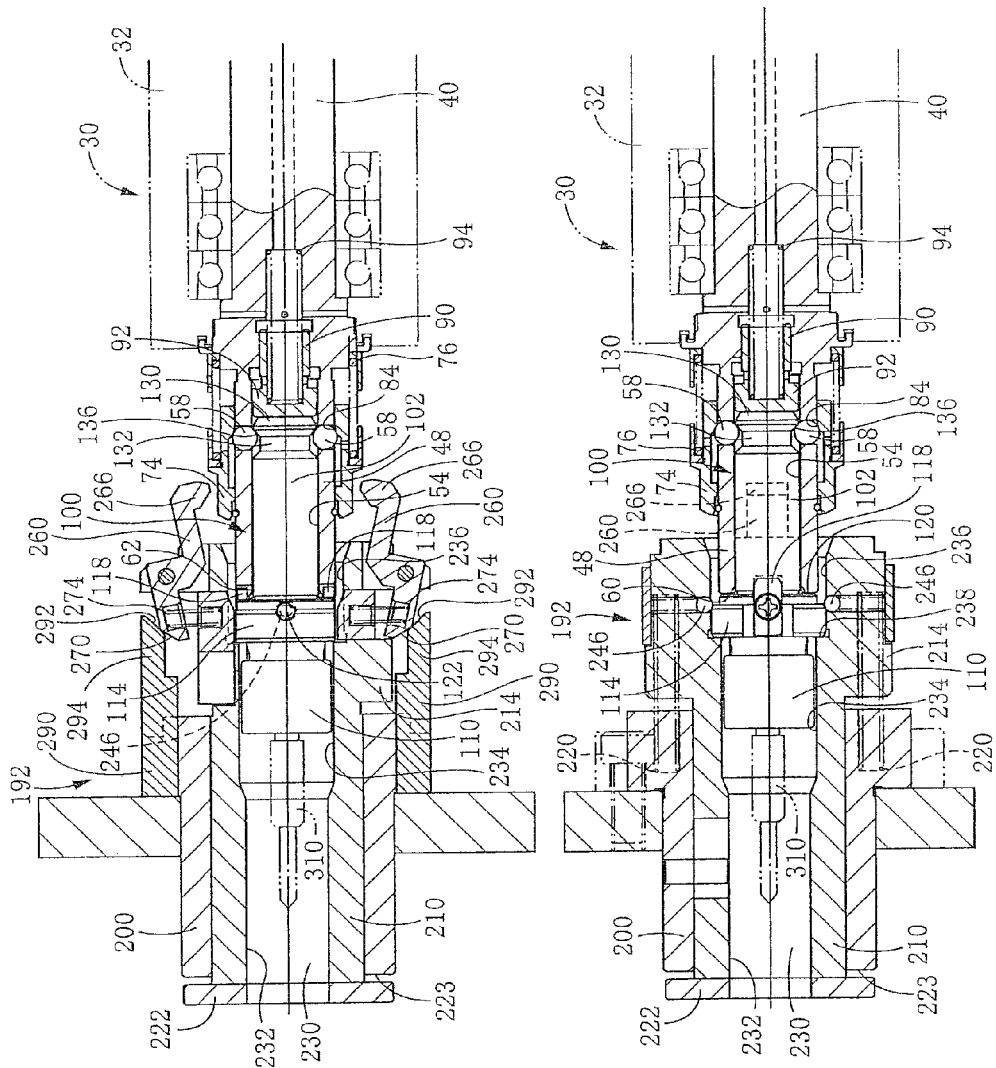
FIG. 18 is a pair of side cross-sectional views showing a stage of the tool loading process, in which the clamp sleeve of the spindle extension is moved in the forward direction relative to the spindle-extension-hole defining member of the spindle extension so as to be positioned in a clamping position, as a result of withdrawal movement of the movable engaging lever to the non-working position.

FIG. 18 shows a stage in which the clamp sleeve 74 has been moved relative to the spindle-extension-hole defining member 48 in the forward direction owing to the force of the spring 76, as a result of disengagement of each of the movable engaging levers 260 from the clamp sleeve 74. In this stage, the gently tapered portion 84 of the inner circumferential surface of the clamp sleeve 74 is brought into engagement with the balls 58, and causes the balls 58 to be moved radially inwardly within the respective ball retaining holes 56 so as to be pressed against the rear side surface 136 of the annular grooved portion 132 of the tool holder 100. Since the tool holder 100 is in contact at its rear end surface 120 of the flange portion 114 with the front end surface 60 of the spindle extension 46, the tool holder 100 is no further introduced into spindle extension hole 54, so that the balls 58 are pressed against the rear side surface 136 with force that is sufficiently large owing to effect of the inclined surface of the gently tapered portion 84. Consequently, the tool holder 100 is firmly held by the spindle extension 46.

The forward movement of the spindle unit 30 is stopped in the tool loading process when it is detected that the spindle extension 46 reaches a tool-loading forward movement end position as a predetermined position. This detection is made, for example, by the above-described spindle-position detecting device that includes a detecting portion and a detected portion such that the detecting portion is provided in one of the spindle unit 30 and the head unit 18 while the detected portion is provided in the other of the spindle unit 30 and the head unit 18. One of the detecting portion and the detected portion may be provided by a corresponding one of the above-described detecting and detected portions that are used for detecting that the tap reaches the machining stopping position in the internal thread forming operation and/or for detecting that the spindle extension 46 reaches the tool-unloading forward movement end position in the tool unloading process. The movement of the tool-pocket-hole defining member 210 in the opposite direction relative to the pocket body 200 is stopped when the forward movement of the spindle unit 30 is stopped. Since the tool-loading forward movement end position is determined such that the opposite movement of the tool-pocket-hole defining member 210 is stopped before the holding portion 214 of the tool-pocket-hole defining member 210 is brought into contact with the pocket body 200, the holding portion 214 of the tool-pocket-hole defining member 210 is never brought into contact with the pocket body 200, as long as the spindle unit 30 is stopped in the tool-loading forward movement end position. If the spindle unit 30 could not be stopped in the tool-loading forward movement end position, for some reasons such as failure of the spindle-position detecting device, the holding portion 214 of the tool-pocket-hole defining member 210 would be brought into contact with the pocket body 200. That is, in such a case, the tool-pocket-hole defining member 210 is prevented, by the contact of the holding portion 214 with the tool-pocket-hole defining member 210 from being moved in the opposite direction by an excessive distance.

After the tool holder 100 has been received by the spindle extension 46, the spindle extension 46 is moved in the backward direction whereby the tool holder 100 is removed out of the tool pocket hole 230. When the spindle extension 46 is moved away from the tool pocket 192, the balls 246 of the respective sets of ball plungers 249 are moved into the respective ball retaining holes 244 against the respective springs 248, by the tapered portion 122 of the flange portion 114 and a non-tapered portion (straight portion) of the flange portion 114 which is contiguous to the tapered portion 122, owing to force of the quill movement device 34 which acts on the tool holder 100 in the backward direction. Thus, the tool holder 100 is allowed to be removed out of the tool pocket hole 230 as a result of movements of the balls 246 into the respective ball retaining holes 244. As a result of the backward movement of the spindle extension 46, the tool-pocket-hole defining member 210 is moved back to the forward movement end position, by the forces of the respective springs 220. This stage is shown in FIG. 10, although the spindle extension 46 is opposed to the unused tool pocket 192 (rather than the used tool pocket 192) in this stage. Thus, in the present tool transfer system, a tool can be transferred between the machining machine 10 and the tool magazine device 12, by simply causing the spindle extension 46 as an example of the first tool holding device and the tool pocket 192 as an example of the second holding device to be moved relative to each other while maintaining a predetermined angular position of the spindle extension 46 relative to the tool pocket 192, namely, without causing the spindle extension 46 and the tool pocket 192 to be rotated relative to each other. The quill movement device 34 constitutes a relative axial movement device that is configured to cause the spindle extension 46 and the tool pocket 192 to be axially moved relative to each other in the tool unloading or loading process.

After all used tools have been replaced by unused tools by carrying out the above-described tool unloading and loading processes, the tool magazine 12 is moved, by the magazine elevating device 194, up to the above-described manual operation position, and then the machining machine 10 starts to perform a machining operation. While the machining operation is being performed onto a workpiece, a manual operation may be performed onto the magazine 12 (which has been moved to the manual operation position) by an operator. Described specifically, the used tools (which have been unloaded from the spindle extension 46) may be removed from the used tool pockets 192, and unused tools may be attached into the unused tool pockets 192 (from which the tools have been loaded to the spindle extension 46) for next tool loading process. It is noted that the tool transfer is carried out not only in case where the tool becomes no longer usable but also in a case of a lot change requiring the tool to be replaced by another kind of tool.

Figure 19:
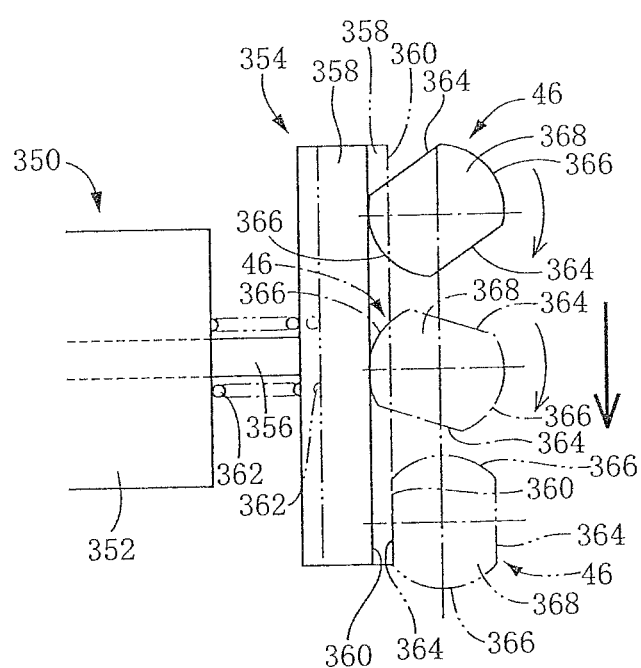
FIG. 19 is a view schematically showing an angularly positioning device operable to position the spindle extension in a predetermined angular position, prior to transfer of a tool between the spindle extension and the tool pocket.

In the above-described embodiment, prior to the tool unloading and loading processes, the spindle extension 46 together with the spindle 40 is electrically positioned in the spindle orientation position by the angularly positioning device in the form of the spindle orientation device that is included in the spindle drive device 44. However, the spindle orientation may be achieved by a mechanical spindle-orientation device 350 as another example of the angularly positioning device, as shown in FIG. 19. The mechanical spindle-orientation device 350 includes a main body 352 and an angularly positioning member 354 which is held by the main body 352 and which is movable in rightward and leftward directions (as seen in FIG. 19). The angularly positioning member 354 includes a rod portion 356 and an angularly positioning plate 358. The rod portion 356 is movably held by the main body 352, and protrudes from the main body 352 in rightward direction (as seen in FIG. 19). The angularly positioning plate 358, which is an example of an angularly positioning portion, is provided in a distal end portion of the rod portion 356. The angularly positioning plate 358 has a positioning surface 360 that is provided by a flat surface. The angularly positioning member 354 is forced by a positioning-member forcing device in the form of a compression coil spring 362 as an example of an elastic member, in a direction away from the main body 352. Forward movement of the angularly positioning member 354 owing to force of the spring 362 is limited by a forward movement end defining device (not shown). In the present embodiment, the mechanical spindle-orientation device 350 is positioned relative to the machining machine 10 such that the angularly positioning member 354 is movable in parallel to the X-axis direction of the machining machine 10 and such that the positioning surface 360 is perpendicular to the X-axis direction and is elongated in the Y-axis direction of the machining machine 10.

The spindle extension 46 includes a contactable portion 368 which is a portion of the outer cylindrical surface of the spindle extension 46, and which is located on a front side of the clamp sleeve 74 when the clamp sleeve 74 is positioned in its forward movement end position. The contactable portion 368, which is provided by the portion of the outer cylindrical surface of the spindle extension 46, includes at least one flat surface portion 364 and at least one part-cylindrical surface portion 366. In the present embodiment, the contactable portion 368 has a pair of part-cylindrical surface portions 366 and a pair of flat surface portions 364 each of which is located between the part-cylindrical surface portions 366 in a circumferential direction of the spindle extension 46. The pair of flat surface portions 366 are formed by removing diametrically opposite portions of the contactable portion 368, so as to be parallel to the axial direction of the spindle extension 46. The flat surface portions 364 are located in respective positions relative to the key-receiving groove 62, which positions enable the spindle extension 46 to be positioned in the spindle orientation position by the mechanical spindle-orientation device 350. In the present embodiment, the spindle extension 46 is rotatably together with the spindle 40 by, in place of the spindle drive device 44 including the electrical-spindle orientation device or function, a spindle drive device that does not include such an electrical-spindle orientation device or function.

When the spindle extension 46 of one of the spindle units 30 is required to receive a tool from the tool magazine 12, the head unit 18 is moved toward the mechanical spindle-orientation device 350, the one of the spindle units 30 is moved in the forward direction by the corresponding quill movement device 34 so as to be positioned in a spindle orientation execution position that is located on a front side of a position of each of the other spindle units 30. The spindle extension 46 is positioned relative to the spindle-orientation device 350 such that the contactable portion 368 of the spindle extension 46 is opposed to an upper portion of the positioning surface 360 in the X-axis direction of the machining machine 10. Then, the head unit 18 is moved toward the positioning surface 360. This movement of the head unit 18 toward the positioning surface 360 is made by causing the head movement device 16 as an example of a relative movement device to move the head unit 18 in a direction which is perpendicular to the positioning surface 360, namely, which is parallel to the X-axis direction. As a result of the movement of the head unit 18 toward the positioning surface 360, the spindle extension 46 is positioned in a predetermined position relative to the angularly positioning member 354 that is positioned in a forward movement end position such that the axis of the spindle extension 46 is distant from the positioning surface 360 by a distance that is slightly smaller than a radial distance between the axis of the spindle extension 46 and each of the flat surface portions 364 of the spindle extension 46. Therefore, the spindle extension 46 is pressed against the positioning surface 360, while forcing the angularly positioning member 354 to be moved (as represented by solid line in FIG. 19) in a direction (i.e., leftward direction as seen in FIG. 19) that is away from the forward movement end position, against force of the spring 362.

While the spindle extension 46 is forcing the angularly positioning member 354 in the direction away from the forward movement end position, the head unit 18 is moved downwardly by the head movement device 16 whereby the spindle extension 46 is moved, relative to the spindle-orientation device 350, downwardly in a direction (as indicated by arrow in FIG. 19) which is parallel to the positioning surface 360 and perpendicular to the axis of the spindle extension 46, namely, which is parallel to the Y-axis direction of the machining machine 10. In this instance, the spindle drive device allows the spindle extension 46 to establish a freely rotatable state in which the spindle extension 46 is freely rotatable. Therefore, when the spindle extension 46 is positioned in an angular position (as represented by solid line in FIG. 19) that causes one of the part-cylindrical surface portions 366 to be in contact with the positioning surface 360 of the angularly positioning plate 358, the spindle extension 46 is rotated about its axis in clockwise direction (as seen in FIG. 19) by friction acting between the part-cylindrical surface portion 366 and the positioning surface 360, as the spindle extension 46 is moved downwardly relative to the spindle-orientation device 350. When the spindle extension 46 is positioned in an angular position (as represented by two-dot chain line in FIG. 19) that causes one of the flat surface portions 364 to be in close contact with the positioning surface 360 of the angularly positioning plate 358, the rotation of the spindle extension 46 is stopped while the angularly positioning member 354 forced by the spring 362 against the flat surface portion 364 is held in a position as represented by two-dot chain line in FIG. 19. The angular position as represented by the two-dot chain line in FIG. 19 is the spindle orientation position that enables the key-receiving grooves 62 of the spindle extension 46 to be aligned with the respective drive keys 118 of the tool holder 100.

The head unit 18 is moved downwardly by the head movement device 16 until the spindle extension 46 is positioned in a downward movement end position in which the one of the flat surface portions 364 is in close contact with a lower portion of the positioning surface 360. The positioning surface 360 has a vertical length (as measured in a direction in which the spindle extension 46 is moved relative to the angularly positioning member 354) which is sufficiently large for enabling one of the flat surface portions 364 to be in close contact with the positioning surface 360 before the spindle extension 46 reaches the downward movement end position, irrespective of an angular position of the spindle extension 46 upon contact of the spindle extension 46 with the positioning surface 360. In this sense, the vertical length of the positioning surface 360 has to be larger than a length of each of the part-cylindrical surface portions 366 as measured in a circumferential direction of the spindle extension 46. The spindle extension 46 has the pair of key-receiving grooves 62 while the tool holder 100 has the pair of drive keys 118 so that the tool transfer can be made with the spindle extension 46 being positioned in either one of two angular positions relative to the tool pocket 192, namely, with the spindle extension 46 being positioned in either one of two spindle orientation positions that are shifted from each other by 180°. Therefore, a pair of flat surface portions 364 are provided as the at least one flat surface portion 364, for thereby making it possible to reduce an amount of rotation of the spindle extension 46 required for the spindle orientation and to quickly achieve the spindle orientation. Further, the above-described vertical length of the positioning surface 360 can be made small, and the mechanical spindle-orientation device 350 as a whole can be made compact in size.

After the downward movement of the head unit 18 has been completed, the spindle extension 46 is switched from the freely rotatable state to a freely unrotatable state in which the spindle extension 46 is not rotatable freely but rotatable by the spindle drive device. Therefore, during loading of a tool from the tool magazine 12 to the spindle extension 46, it is possible to prevent the spindle extension 46 from being rotated from the spindle orientation position, so that the spindle extension 46 can receive the tool with the key-receiving grooves 62 of the spindle extension 46 being aligned with the respective drive keys 118 of the tool holder 100. Upon unloading of a tool from the spindle extension 46 to the tool magazine 46, too, the spindle extension 46 is subjected to the spindle orientation achieved by the mechanical spindle-orientation device 350. In a case where a tool is to be loaded from the tool magazine 46 to the spindle extension 46 immediately after another tool has been unloaded from the same spindle extension 46 to the tool magazine 46, the spindle extension 46 is not required to be subjected to the spindle orientation, because the spindle extension 46 is already positioned in the spindle orientation position in such a case.

In the above-described machining machine 10, the plurality of spindle units 30 can be axially moved by the respective quill movement devices 34, independently of each other. However, the above-described spindle-orientation device 350 can be employed also for a machining machine having a plurality of spindle units that can not be axially moved independently of each other. In such a machining machine in which one of the spindle units which is to be subjected to the spindle orientation can not be positioned in a front side of each of the other spindle units, the spindle orientation can be carried out, for example, by designing the angularly positioning plate 358 of the spindle-orientation device 350 such that the positioning plate 358 has a shape and a size that permit the positioning plate 358 to enter between a space between the spindle unit and another adjacent spindle unit in a direction in which the spindle unit is to be moved so as to be brought into contact with the positioning surface 360.

In the above-described embodiment, the contactable portion 368 including the flat and part-cylindrical surface portions 364, 366 is provided in the spindle extension 46. However, where a tool is held by the tool holder 100 so as to be held by the spindle extension 46, the contactable portion 368 may be provided in the tool holder 100. In this modified arrangement, upon initiation of a machining operation, a tool held by the tool holder 100 is manually attached to the spindle extension 46 by an operator. Then, when the tool is to be unloaded from the spindle extension 46 to the tool pocket 192, the spindle orientation can be achieved by the spindle-orientation device 350 substantially in the same manner as in the above-described embodiment. In a case where a tool is to be loaded from the tool magazine 46 to the spindle extension 46 immediately after another tool has been unloaded from the same spindle extension 46 to the tool magazine 46, the spindle orientation is not required since the spindle extension 46 is already positioned in the spindle orientation. In this case, even if the loaded tool is held by a tool holder that is not provided with the contactable portion 368, namely, even if the spindle orientation cannot be made by the spindle-orientation device 350, the spindle extension 46 can receive the tool with the key-receiving grooves 62 of the spindle extension 46 being aligned with the respective drive keys 118 of the tool holder 100.

Referring next to FIGS. 20 to 26, there will be described a tool transfer system which is constructed according to another embodiment of the invention. In this tool transfer system, the movable engaging member of the second tool holding device of the clamping-device controlling device is a linearly-movable engaging member that is movable relative to the main body of the second tool holding device in the second opposite directions parallel to the axis of the second receiving hole. The spindle extension 46 as an example of the first tool holding device in the present embodiment is identical with that in each of the above-described embodiments, and is not described herein.

Figure 20:
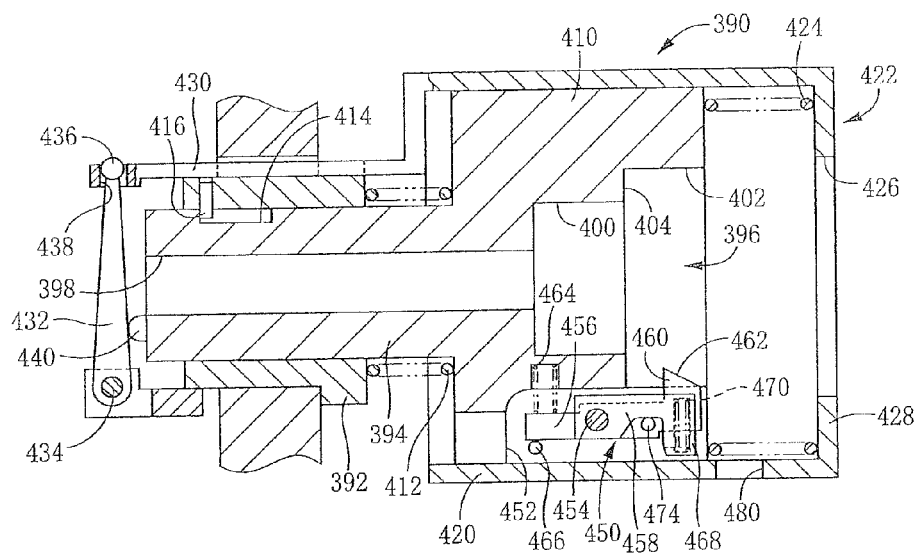
FIG. 20 is a side cross-sectional view showing a tool pocket of a tool storage device, which is constructed according to another embodiment of the invention.

In the present embodiment, a tool pocket 390 as an example of the second tool holding device includes a pocket body 392 as an example of the main body of the second tool holding device and a tool-pocket-hole defining member 394 as an example of the second-receiving-hole defining member. As shown in FIG. 20, the tool-pocket-hole defining member 394 is axially movably fitted in the pocket body 392. The tool-pocket-hole defining member 394 defines a second receiving hole in the form of a tool pocket hole 396 that extends through an axis of the tool-pocket-hole defining member 394. The tool pocket hole 396 is a stepped hole having a circular shape in its transversal cross section, so as to include a plurality of hole portions having respective diameters different from each other. Like the above-described tool pocket hole 230, the tool pocket hole 396 includes three hole portions consisting of a tool receiving hole portion 398, a clamp-nut receiving hole portion 400 and a flange receiving hole portion 402 which are arranged in this order of description as viewed in the forward direction (i.e., rightward direction as seen in FIG. 20). The tool pocket hole 396 has an inner circumferential surface including a contactable surface portion 404 located between the clamp-nut receiving hole portion 400 and the flange receiving hole portion 402 that has a diameter larger than a diameter of the clamp-nut receiving hole portion 400. The contactable surface portion 404 of the inner circumferential surface of the tool pocket hole 396 is perpendicular to an axis of the tool pocket hole 396, and faces in the forward direction so as to serve a force receiving surface.

As shown in FIG. 20, the tool-pocket-hole defining member 394 includes a large diameter portion 410 that protrudes from the pocket body 392 in the forward direction (i.e., rightward direction as seen in FIG. 20). The tool-pocket-hole defining member 394 is forced in the forward direction by a hole-defining-member forcing device in the form of a compression coil spring 412 as an example of an elastic member. The spring 412 is disposed between the large diameter portion 410 and the pocket body 392. The tool-pocket-hole defining member 394 has an axially extending groove 414 while the pocket body 392 has an engaged protrusion 416 which is engaged in the groove 414 and which is axially movable relative to the groove 414. The axially extending groove 414 and the engaged protrusion 416 cooperate with each other to constitute a forward movement limiting device for liming forward movement of the tool-pocket-hole defining member 394 owing to force of the spring 412. That is, a forward movement end position of the tool-pocket-hole defining member 394 is defined by engagement of the engaged protrusion 416 with a rear end portion of the axially extending groove 414. The forward movement limiting device serves also an a relative rotation inhibiting device that inhibits rotation of the tool-pocket-hole defining member 394 and the pocket body 392 relative to each other.

As shown in FIG. 20, a movable engaging sleeve 420 as an example of a linearly movable engaging member is fitted on the large diameter portion 410 of the tool-pocket-hole defining member 394, and is movable relative to the tool-pocket-hole defining member 394 in the second opposite directions parallel to the axis of the tool pocket hole 396. The movable engaging sleeve 420 has a bottom wall 422 in its front end portion (i.e., right end portion as seen in FIG. 20), and is forced in a forcing direction (i.e., forward direction) by a compression coil spring 424 that is disposed between the bottom wall 422 and the large diameter portion 410 of the tool-pocket-hole defining member 394. The bottom wall 422 is perpendicular to the axis of the tool pocket hole 396, and has an opening 426 that allows introduction of the tool holder 100 therethrough. The opening 426 is surrounded by a radially inner end portion of the bottom wall 422 which serves as an engaging portion 428. An actuating member 430 is provided to extend from an uppermost portion (as seen in FIG. 20) of periphery of the movable engaging sleeve 420, in a backward direction (i.e., leftward direction as seen in FIG.

20). The actuating member 430 penetrates through a penetrated portion of the pocket body 392, and is movable relative to the pocket body 392 in the second opposite directions parallel to the axis of the tool pocket hole 396. The actuating member 430 includes a rear end portion protruding from the pocket body 392 in the backward direction. A speed increasing lever 432 is provided to be engaged with the rear end portion of the actuating member 430.

The speed increasing lever 432 is provided by a straight-shaped bar, and is pivotably attached at one of its longitudinally opposite end portions to the pocket body 392 via a shaft 434 fixed to a portion of the pocket body 392 which is diametrically opposite to the above-described penetrated portion. The lever 432 is pivotable about an axis of the shaft 434 which is perpendicular to the axis of the tool pocket hole 396 and which is distant from the axis of the tool pocket hole 396. The lever 432 has a spherical-shaped engaging portion 436 in the other of the longitudinally opposite end portions, such that the lever 432 is engaged at its spherical-shaped engaging portion 436 with the rear end portion of the actuating member 430. The spherical-shaped engaging portion 436 of the lever 432 is fitted in a through-hole 438 formed though an engaged portion of the actuating member 430, which is provided by the rear end portion of the actuating member 430. The spherical-shaped engaging portion 436 fitted in the through-hole 438 that extends in a vertical direction (as seen in FIG. 20), and is movable relative to the through-hole 438 in directions parallel to an axis of the through-hole 438. The lever 432 is opposed to rear end surfaces of the pocket body 392 and the tool-pocket-hole defining member 394. The force of the spring 424 forcing the movable engaging sleeve 420 in the forward direction acts on the lever 432 via the movable engaging sleeve 420 and the actuating member 430, such that the lever 432 is forced in a direction that causes the spherical-shaped engaging portion 436 to be moved in the forward direction. Pivotal forward movement of the lever 432 owing to force of the spring 424 is limited by contact of the lever 432 with a protruding portion 440 that is provided on a portion of the rear end surface of the tool-pocket-hole defining member 394, which portion is closer to the axis of the shaft 434 (i.e., pivot axis of the lever 432) than the actuating member 430. A distance between the pivot axis of the lever 432 and a contactable portion of the lever 432 which is contactable with the protruding portion 440 is smaller than a distance between the pivot axis of the lever 432 and the engaging portion 436 of the lever 432 which is engaged with the actuating member 430. Further, the above-described contact of the lever 432 with the protruding portion 440 limits forward movement of the movable engaging sleeve 420 owing to force of the spring 424. That is, the contact of the lever 432 with the protruding portion 440 defines a forward movement end position of the movable engaging sleeve 420 which corresponds to a working position of the movable engaging sleeve 420.

Figure 21:
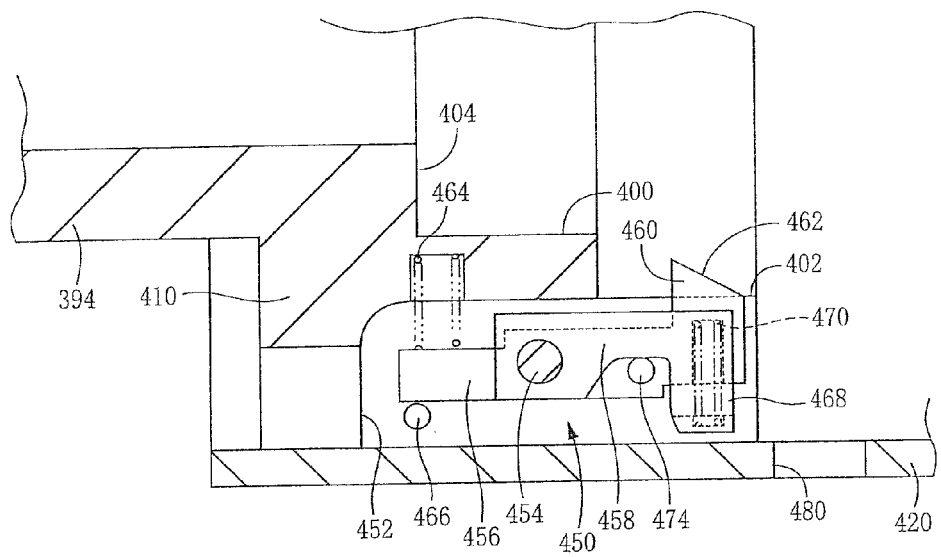
FIG. 21 is a side cross-sectional view showing an engaging-sleeve holding device that is provided in the tool pocket of FIG. 20.

The tool-pocket-hole defining member 394 is provided with an engaging-sleeve holding device 450 that is configured to hold the movable engaging sleeve 420 in its non-working position. As shown in FIG. 21, the engaging-sleeve holding device 450 includes first and second levers 456, 458 that are pivotably attached to the tool-pocket-hole defining member 394 via a shaft 454 that is fixed to a recessed portion 452 of the large diameter portion 410 of the tool-pocket-hole defining member 394. The first and second levers 456, 458 are pivotable relative to each other about an axis of the shaft 454 which is perpendicular to the axis of the tool pocket hole 396 and which is distant from the axis of the tool pocket hole 396. The first lever 456 includes a forwardly extending portion extending from the shaft 454 in the forward direction (i.e., rightward direction as seen in FIG. 21). An actuating portion 460 extends from a distal end portion of the forwardly extending portion, in a direction toward the flange receiving hole portion 402 of the tool pocket hole 396. The actuating portion 460 has a cam surface 462 that is inclined with respect to the axis of the tool pocket hole 396 such that a radial distance between the a rear portion of the cam surface 462 and the axis of the axis of the tool pocket hole 396 is smaller than a radial distance between a front portion of the cam surface 462 and the axis of the axis of the tool pocket hole 396. A compression coil spring 464 is disposed between the tool-pocket-hole defining member 394 and a backwardly extending portion of the first lever 456 that extends from the shaft 454 in the backward direction. The first lever 456 is forced by the spring 464, to be pivoted in a direction that causes the actuating portion 460 to protrude into the flange receiving hole portion 402 of the tool pocket hole 396. Pivotal movement of the first lever 456 owing to force of the spring 464 is limited by contact of the backwardly extending portion of the first lever 456 with a stopper 466 that is provided in the recessed portion 452 of the large diameter portion 410. While the backwardly extending portion of the first lever 456 is held in contact with the stopper 466, the cam surface 462 in its entirety protrudes into the flange receiving hole portion 402 of the tool pocket hole 396, as shown in FIG. 21.

The second lever 458, which is pivotable relative to the first lever 456, includes a forwardly extending portion extending from the shaft 454 in the forward direction. A protruding portion 468 as an example of an engaging portion is provided to extend from a distal end portion of the forwardly extending portion, in a direction toward the movable engaging sleeve 420, as shown in FIG. 20. The second lever 458 is forced by a compression coil spring 470 that is disposed between the protruding portion 468 and the first lever 456, to be pivoted in a direction that causes the protruding portion 468 to protrude from the recessed portion 452 of the large diameter portion 410 toward outside of the large diameter portion 410. Pivotal movement of the second lever 458 owing to force of the spring 470 is limited by contact of the second lever 458 with a stopper 474 that is provided on a side surface of the first lever 456. While the first and second levers 456, 458 are held in contact with the respective stoppers 466, 474, the second lever 458 is positioned in its non-working position in which the protruding portion 468 is accommodated in the recessed portion 452 of the large diameter portion 410. A through-hole 480 as an example of an engaged portion is formed to radially penetrate through a circumferential wall of the movable engaging sleeve 420, such that the protruding portion 468 of the second lever 458 is engageable into the through-hole 480. While the movable engaging sleeve 420 is being positioned in its forward movement end position, the through-hole 480 is positioned in a front side of the protruding portion 468 of the second lever 458. Although not being illustrated in the drawings, two sets of ball plungers are provided in a portion of the tool-pocket-hole defining member 394 which defines the flange receiving hole portion 402 of the tool pocket hole 396, so as to hold the tool holder.

There will be described a tool unloading process for unloading the drill 310 held by the tool holder 100, from the spindle extension 46 to the tool pocket 390. The tool unloading process is initiated by establishing a coaxial state in which the spindle extension hole 54 of the spindle extension 46 and the tool pocket hole 396 of the tool pocket 390 are coaxial with each other, by movement of the head unit 18 of the machining machine 10 relative to the tool magazine 12. In this instance, the spindle extension 46 is positioned in a spindle orientation position as an example of a predetermined angular position relative to the tool pocket 390, while the tool-pocket-hole defining member 394 is positioned in its forward movement end position whereby the movable engaging sleeve 420 is positioned in its working position. Then, the drill 310 together with the tool holder 100 is introduced into the tool pocket hole 396. During forward movement of the spindle extension 46 relative to the tool pocket 390 in the coaxial state, the clamp sleeve 74 is brought into contact with the engaging portion 428 of the movable engaging sleeve 420, so that the clamp sleeve 74 is inhibited from being further moved in the forward direction. Then, as a result of forward movement of the spindle extension 46 relative to the clamp sleeve 74, the balls 58 of the ball clamping device are separated from the gently tapered portion 84 of the clamp sleeve 74 whereby clamping of the tool holder 100 by the ball clamping device is released.

Figure 22:
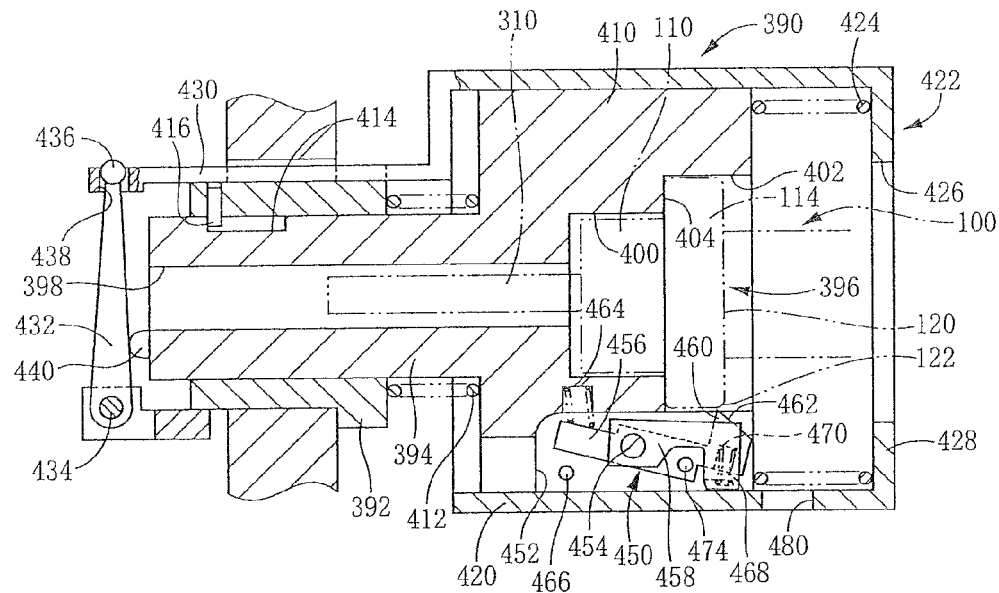
FIG. 22 is a side cross-sectional view showing a stage of the tool unloading process, in which the tool has been received by the tool pocket of FIG. 20.

As the tool holder 100 is thus unclamped, the tool holder 100 is pushed, by the pushing member 90, out of the spindle extension hole 54, so as to be introduced into the tool pocket hole 396. FIG. 22 shows a stage in which the first lever 456 is pivoted against force of the spring 464 as a result of contact of the flange portion 114 of the tool holder 100 with the cam surface 462 of the actuating portion 460 of the first lever 456 of the engaging-sleeve holding device 450, whereby the actuating portion 460 is moved away from the flange receiving hole portion 402 into the recessed portion 452. The pivotable movement of the first lever 456 causes the stopper 474 to be moved downwardly (as seen in FIG. 22), so that the second lever 458 is allowed to be pivoted in a direction toward the movable engaging sleeve 420, owing to force of the spring 470. The pivotal movement of the second lever 458 is stopped by its contact with an inner circumferential surface of the movable engaging sleeve 420. In this stage, the through-hole 480 is still located on a front side of the engaging-sleeve holding device 450. The tool holder 100 is introduced into the tool pocket hole 396 until the flange portion 114 is brought into contact with the contactable surface portion 404 of the tool-pocket-hole defining member 394, and then the tool holder 100 is held by the tool pocket 390, with the balls of the respective sets of ball plungers being engaged with the tapered portion 122 of the flange portion 114. The spindle extension 46 is moved in the backward direction, so that the tool holder 100 is removed out of the spindle extension 54, whereby the tool unloading process is completed.

Figure 23:
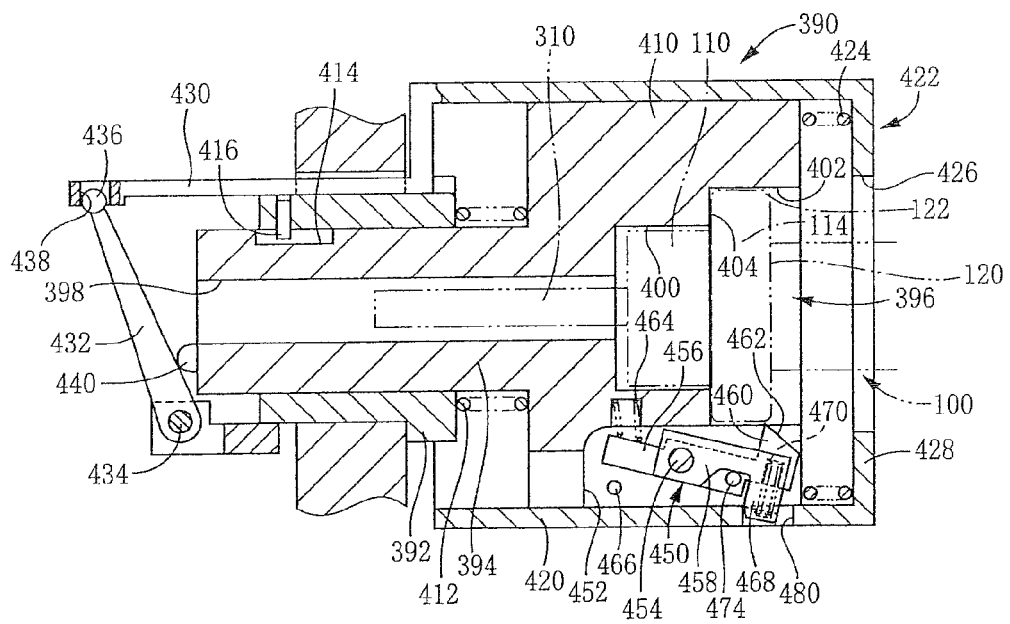
FIG. 23 is a side cross-sectional view showing a stage of the tool loading process, in which a tool-pocket-hole defining member of the tool pocket of FIG. 20 has been moved in a backward direction relative to a main body of the tool pocket of FIG. 20 and a movable engaging sleeve is held in its non-working position by the engaging-sleeve holding device.

There will be described a tool loading process for loading the drill 310 held by the tool holder 100, from the tool pocket 390 to the spindle extension 46. In the tool loading process, during forward movement of the spindle extension 46 relative to the tool pocket 390 in the coaxial state, the pushing member 90 is brought into contact with the tool holder 100 so as to be inhibited from being further moved in the forward direction, and the clamp sleeve 74 is brought into contact with the engaging portion 428 of the movable engaging sleeve 420 so as to be inhibited from being further moved in the forward direction. The spindle extension 46 is further moved in the forward direction, so that the drive keys 118 of the tool holder 100 are received into the respective key-receiving grooves 62 of the spindle extension 46 and then the front end surface 60 of the spindle extension 46 is brought into contact with the rear end surface 120 of the flange portion 114 of the tool holder 100. FIG. 23 shows a stage in which the tool-pocket-hole defining member 394 has been moved, by the spindle extension 46 via the tool holder 100, in the opposite direction (i.e., backward direction) against force of the spring 424, while the speed increasing lever 432 has been pivoted by the opposite movement of the tool-pocket-hole defining member 394 relative to the pocket body 392. As a result of the pivotal movement of the speed increasing lever 432, the movable engaging sleeve 420 is moved in the backward direction against force of the spring 424.

The distance between the pivot axis of the lever 432 and the contactable portion of the lever 432 which is contactable with the protruding portion 440 is smaller than the distance between the pivot axis of the lever 432 and the engaging portion 436 of the lever 432 which is engaged with the actuating member 430. In other words, a distance between a pivotal fulcrum portion of the lever 432 and an effort portion of the lever 432 is smaller than a distance between the pivotal fulcrum portion of the lever 432 and a load portion of the lever 432. Therefore, as shown in FIG. 23, the opposite movement of the tool-pocket-hole defining member 394 is transmitted to the movable engaging sleeve 420, with an amount of the movement being increased. Thus, the movable engaging sleeve 420 is moved in the opposite direction by a distance larger than a distance by which the tool-pocket-hole defining member 394 is moved in the opposite direction, so that the movable engaging sleeve 420 is moved relative to the tool-pocket-hole defining member 394 in the opposite direction. As a result of the movement of the movable engaging sleeve 420 relative to the tool-pocket-hole defining member 394 in the opposite direction (i.e., leftward movement as seen in FIG. 23), the through-hole 480 of the movable engaging sleeve 420 reaches the protruding portion 468 of the second lever 458, so that the second lever 458 is pivoted owing to force of the spring 470 such that the protruding portion 468 is engaged into the through-hole 480, whereby the movable engaging sleeve 420 is engaged to the tool-pocket-hole defining member 394 via the second lever 458 and the shaft 454, so as to be held in its non-working position, as shown in FIG. 23. Thus, the movable engaging sleeve 420 is moved relative to the tool-pocket-hole defining member 394 in the opposite direction so as to be positioned in its non-working position. With the movable engaging sleeve 420 being positioned in its non-working position, the clamp sleeve 74 is allowed from being moved in the forward direction relative to the spindle extension 46, whereby the balls 58 are caused, by the gently tapered portion 84, to be moved within the respective ball retaining holes 56 toward the spindle extension hole 54. Therefore, the balls 58 are pressed against the rear side surface 136 of the annular grooved portion 132 of the tool holder 100 so that the tool holder 100 is clamped by the ball clamping device.

Figure 24:
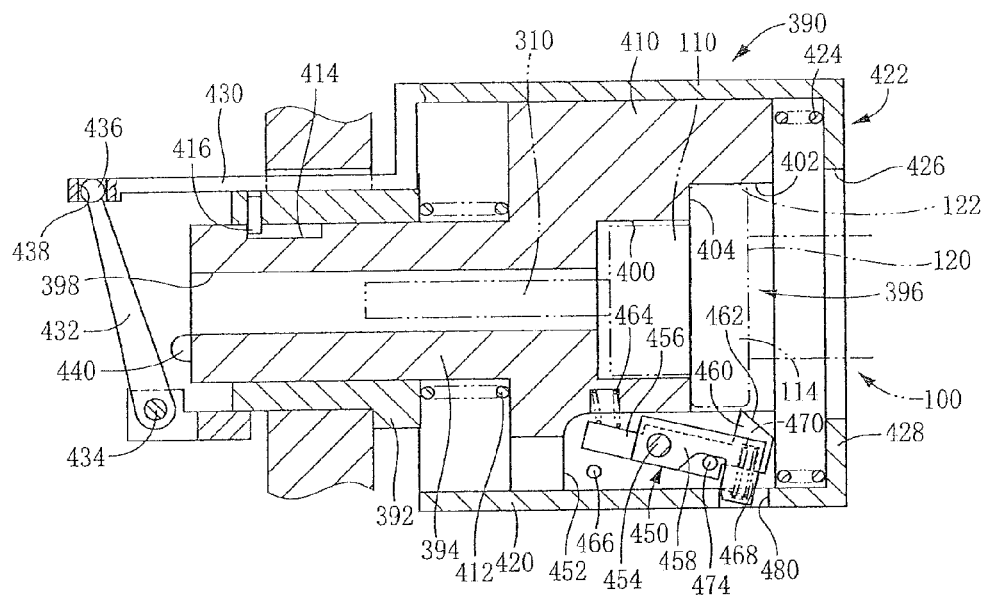
FIG. 24 is a side cross-sectional view showing a stage of the tool loading process, in which the tool has been received by the spindle extension and the movable engaging sleeve, and forward movements of the tool-pocket-hole defining member and the movable engaging sleeve of the tool pocket of FIG. 20 are initiated as a result of backward movement of the spindle extension.
Figure 25:
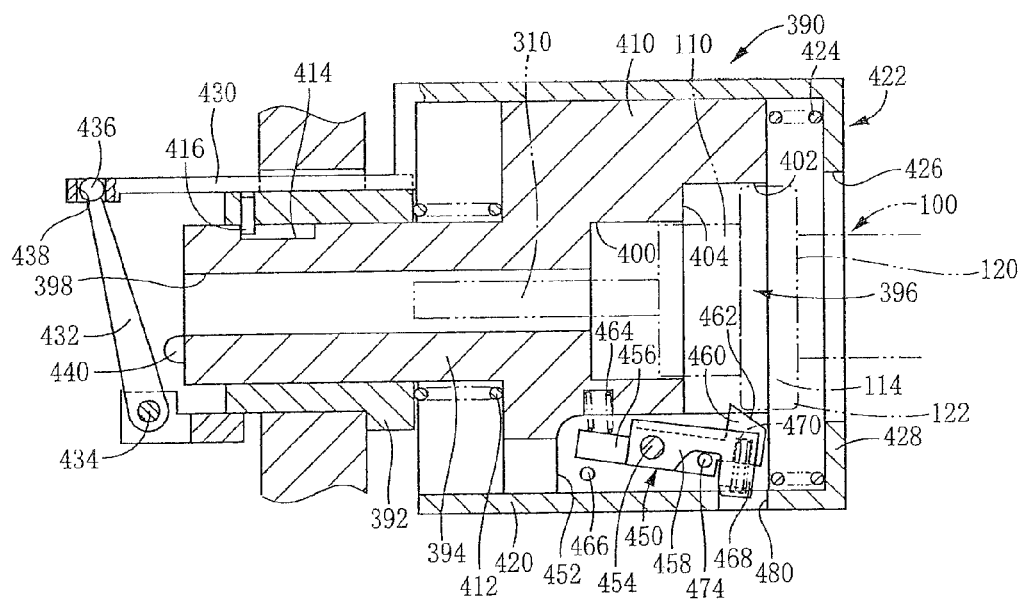
FIG. 25 is a side cross-sectional view showing a stage of the tool loading process, in which the forward movement of the tool-pocket-hole defining member has been completed, and release of the movable engaging sleeve from the non-working position is initiated.
Figure 26:
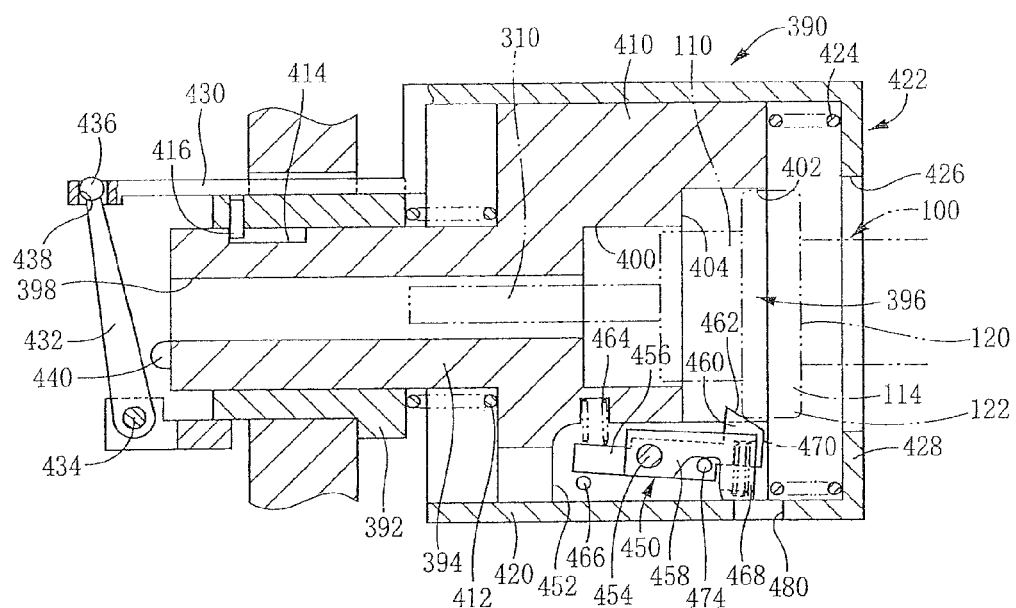
FIG. 26 is a side cross-sectional view showing a stage of the tool loading process, in which the release of the movable engaging sleeve from the non-working position has been completed, and return of the movable engaging sleeve to its working position is initiated.

While the tool holder 100 is being clamped, the spindle extension 46 is moved in the backward direction whereby the drill 310 together with the tool holder 100 is removed out of the tool pocket hole 396. As a result of the backward movement (i.e., rightward movement as seen in FIG. 23) of the spindle extension 46, the tool-pocket-hole defining member 394 is moved, owing to force of the spring 412, in the forcing direction, so as to follow the spindle extension 46, while the movable engaging sleeve 420 engaged to the tool-pocket-hole defining member 394 (via the second lever 458 and the shaft 454) is moved together with the tool-pocket-hole defining member 394 in the opposite direction (i.e., rightward direction as seen in FIG. 23). FIG. 24 shows a stage in which the protruding portion 440 has been separated from the speed increasing lever 432 as result of the movement of the tool-pocket-hole defining member 394 in the opposite direction. FIG. 25 is a stage in which, after the tool-pocket-hole defining member 394 had reached its opposite movement end position, the spindle extension 46 has been further moved in the backward direction whereby the tool holder 100 has been moved in the backward direction relative to the tool-pocket-hole defining member 394. Then, when the flange portion 114 is separated from the first lever 456, the first lever 456 is pivoted, by force of the spring 464, in a direction that causes the cam surface 462 to protrude into the flange receiving hole portion 402 of the tool pocket hole 396, whereby the second lever 458 is pivoted in a direction that causes the protruding portion 468 of the second lever 458 to be disengaged from the through-hole 480 of the movable engaging sleeve 420. FIG. 26 is a stage in which, as result of still further movement of the spindle extension 46 in the backward direction, the protruding portion 468 has been separated from the through-hole 480. Upon separation of the protruding portion 468 from the through-hole 480, the movable engaging sleeve 420 is disengaged from the tool-pocket-hole defining member 394, so that the movable engaging sleeve 420 is moved, by force of the spring 424, relative to the tool-pocket-hole defining member 394 in the forcing direction (i.e., forward direction), so as to be positioned in its working position as shown in FIG. 22.

Thus, until the movable engaging sleeve 420 reaches its working position, the front end surface 79 of the clamp sleeve 74 is positioned on a rear side of the working position of the engaging portion 428 of the movable engaging sleeve 420, the movement of the movable engaging sleeve 420 in the forcing direction does not cause the clamp sleeve 74 to be moved relative to the spindle extension 46 in the backward direction. That is, until the movable engaging sleeve 420 reaches its working position, the gently tapered portion 84 is not separated from the balls 58 so that the clamping of the tool holder 100 by the ball clamping device not is released. Since the movable engaging sleeve 420 is thus held in its non-working position by the engaging-sleeve holding device 450, the spindle extension 46 together with the tool is removed out of the tool pocket hole 396, with the tool being kept clamped by the ball clamping device. In the present embodiment, the speed increasing lever 432 constitutes the movement converting device. Further, the lever 432 cooperates with the spring 424 to constitute the engaging-member controlling device, and cooperates with the movable engaging sleeve 420 to constitute the clamping-device controlling device.

Referring next to FIGS. 27 to 34, there will be described a tool transfer system which is constructed according to still another embodiment of the invention. Like each of the above-described tool transfer systems, this transfer system is disposed between the machining machine and the tool storage device, so as to transfer a tool between the machining machine and the tool storage device. However, openings are provided in the second-receiving-hole defining member and the main body of the second tool holding device.

Figure 27:
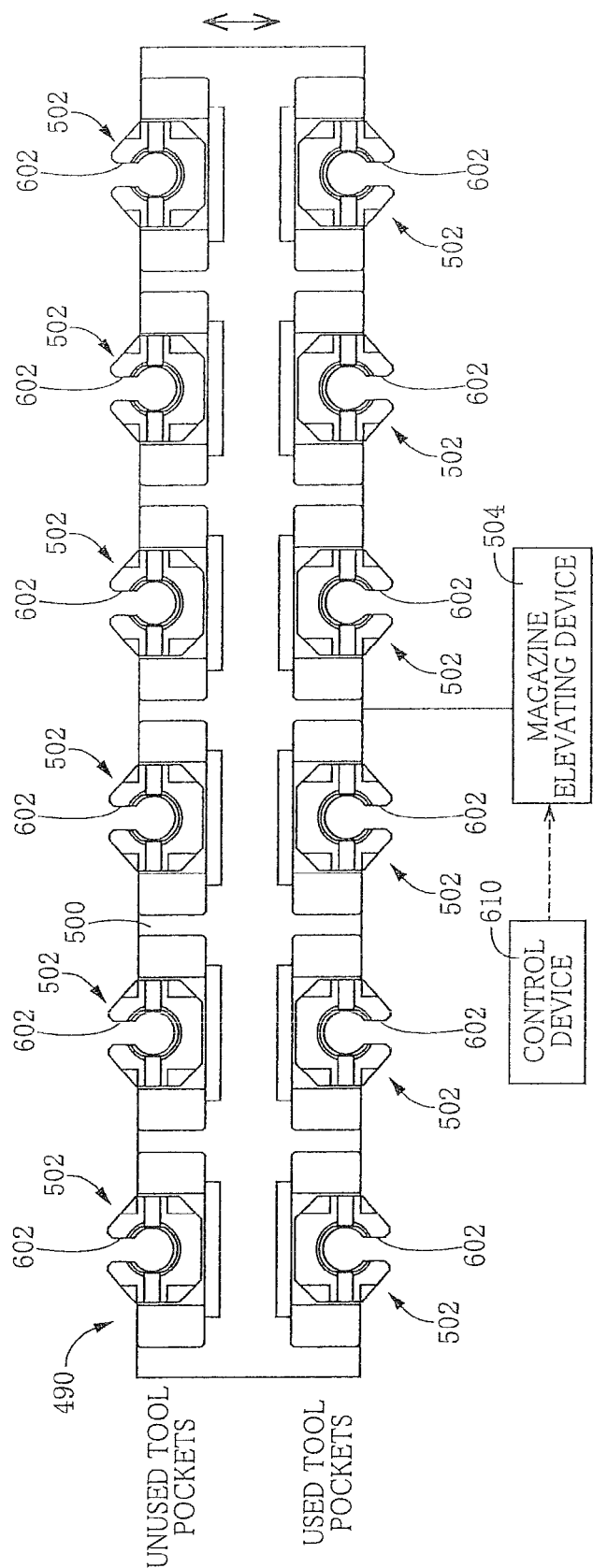
FIG. 27 is a front view of a tool storage device, which is constructed according to still another embodiment of the invention.

In the present machining system, as shown in FIG. 27, a tool magazine 490 as an example of the tool storage device has a magazine body 500 and a plurality of tool pockets 502 as examples of the second tool holding devices. Like the above-described tool pockets 192 provided in the magazine body 190 of the tool magazine 12, the tool pockets 502 are arranged in a plurality of rows (hereinafter referred to as "tool pocket rows") which extend in a horizontal direction and which are distant from each other in a vertical direction. In the present embodiment, the tool pockets 502 are arranged in two tool pocket rows such that a certain number of the tool pockets 502 are arranged in each one of the two tool pocket rows. All the tool pockets 502 are vertically movable together with one another, by vertically moving the magazine body 500 by a magazine elevating device 504. Each tool pocket 502 arranged in the upper tool pocket row and each tool pocket 502 arranged in the lower tool pocket row are identical with each other except that the opening of each tool pocket 502 of the upper tool pocket row opens upwardly while the opening of each tool pocket 502 of the lower tool pocket row opens downwardly. Therefore, one of the tool pockets 502 of the lower tool pocket row will be described as a representative one of the tool pockets 502.

Figure 28:
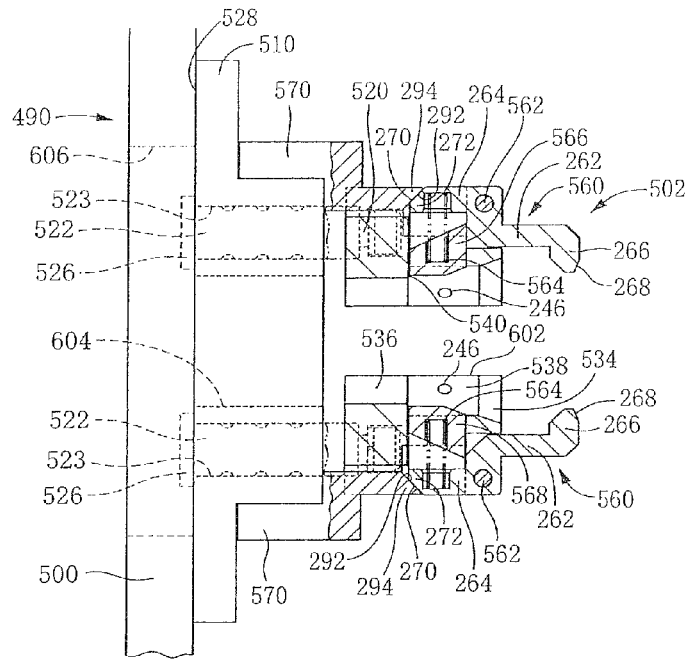
FIG. 28 is a plan view showing, partially in cross section, a tool pocket provided in the tool storage device of FIG. 27, wherein the cross section is taken along line XXVIII-XXVIII in FIG. 31.
Figure 29:
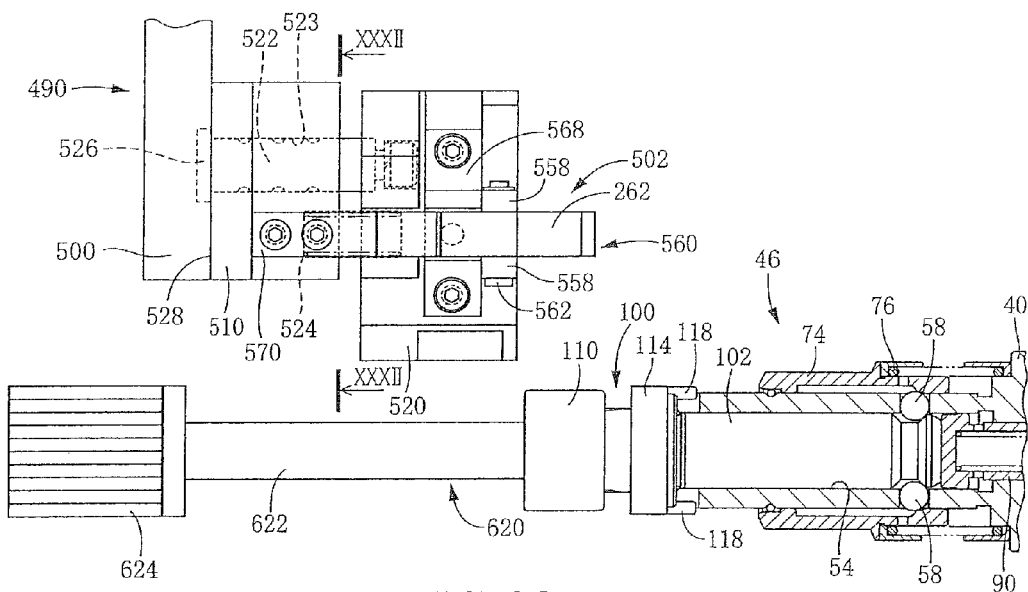
FIG. 29 is a side view showing, partially in cross section, the tool pocket of FIG. 28 together with a tool.
Figure 30:
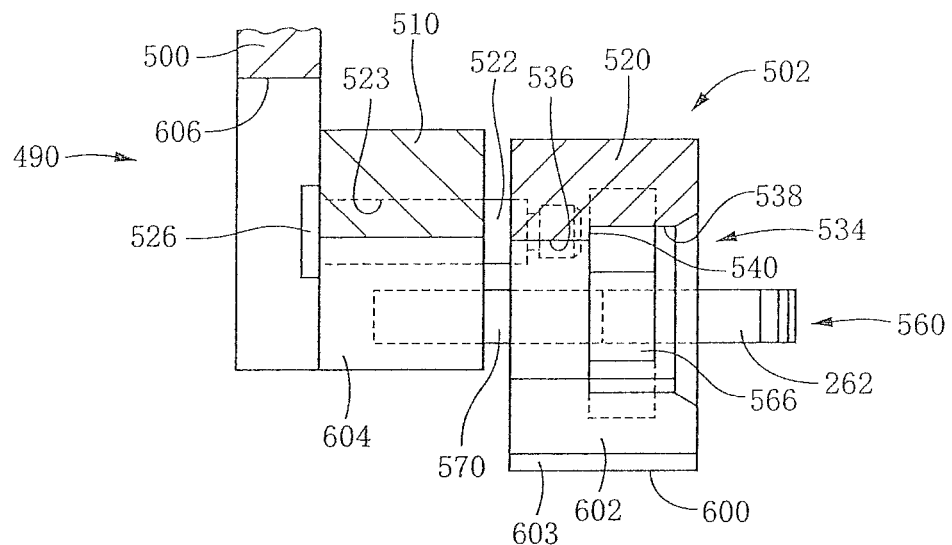
FIG. 30 is a side cross-sectional view showing the tool pocket of FIG. 28.

As shown in FIG. 28, the tool pocket 502 has a pocket body 510 as an example of the main body of the second tool holding device. As shown in FIGS. 28 and 30, the pocket body 510 is a generally rectangular-shaped body, and is removably attached to the magazine body 500. As shown in FIGS. 28 and 29, a tool-pocket-hole defining member 520 as an example of the second-receiving-hole defining member is held by the pocket body 510, such that the tool-pocket-hole defining member 520 is axially movable and unrotatable relative to the pocket body 510. A plurality of guide rods 522 as examples of guided portions are removably fixed to the tool-pocket-hole defining member 520 that is a generally rectangular-shaped member. In the present embodiment, two guide rods 522 are fixed to the tool-pocket-hole defining member 520 such that the two guide rods 522 are parallel to each other and are located in respective positions distant from each other in a direction which is perpendicular to an axis of each guide rod 522 and which is parallel to each of the tool pocket rows. The guide rods 522 project backwardly (i.e., leftward direction as seen in FIG. 28) from the tool-pocket-hole defining member 520, and are axially movably fitted in respective guide holes 523 that are provided in the pocket body 510. The guide holes 253 serves as guide portions, and cooperate with the guide rods 522 to constitute a guide device by which axial movement of the tool-pocket-hole defining member 520 relative to the pocket body 510 is guided. It is noted that the guide device serves also as a relative rotation inhibiting device for inhibiting rotation of the tool-pocket-hole defining member 520 relative to the pocket body 510.

As shown in FIG. 29, the tool-pocket-hole defining member 520 is forced in a forcing direction (i.e., forward direction) by a hole-defining-member forcing device in the form of two compression coil springs 524 (only one of which is illustrated in FIG. 29) that are disposed between the tool-pocket-hole defining member 520 and the pocket body 510. That is, the tool-pocket-hole defining member 52 is forced, by the two compression coil springs 524, in a direction away from the pocket body 510 toward the spindle extension 46 as an example of the first tool holding device. The two springs 524 are located in respective positions distant from each other in a direction which is parallel to each of the tool pocket rows. One of end portions of each of the two springs 524 is fitted in a blind hole 525 (see FIG. 32) that is formed in the pocket body 510. The forward movement of the tool-pocket-hole defining member 520 (i.e., movement of the tool-pocket-hole defining member 520 away from the pocket body 510) owing to forces of the springs 524, is limited by contact of a flange portion 526 with a rear end surface 528 of the pocket body 510. In other words, a forward movement end position of the tool-pocket-hole defining member 520 is defined by the contact of the flange portion 526 with the rear end surface 528. The flange portion 526 has a large diameter, and is provided in a rear end portion of the guide rod 522 which projects backwardly from the pocket body 510. The rear end surface 528 constitutes a stopper portion or a forward-movement limiting portion by which the forward movement of the tool-pocket-hole defining member 520 is limited. While the tool-pocket-hole defining member 520 is being positioned in the forward movement end position, the tool-pocket-hole defining member 520 is distant from the pocket body 510, as shown in FIGS. 28 and 29.

Figure 31:
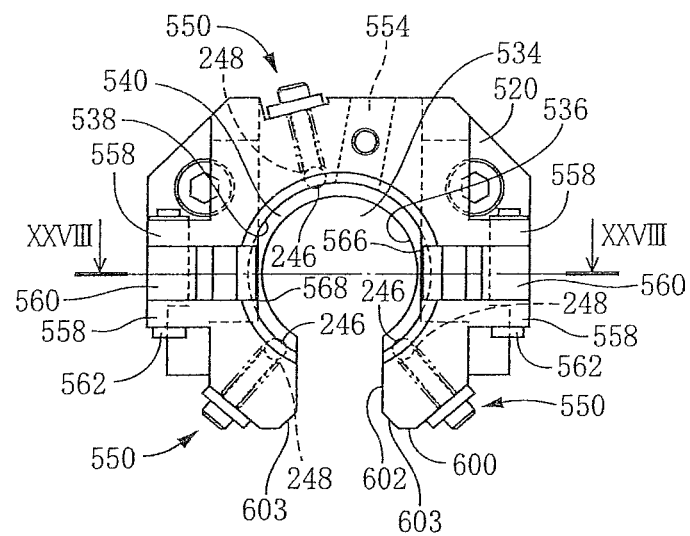
FIG. 31 is a front view showing a tool-pocket-hole defining member of the tool pocket of FIG. 28.

As shown in FIGS. 28 and 30, the tool-pocket-hole defining member 520 defines a second receiving hole in the form of a tool pocket hole 534 that extends through an axis of the tool-pocket-hole defining member 520. The tool-pocket-hole defining member 520 has an axial length which is smaller than that of the above-described tool-pocket-hole defining member 210 and which is large enough to store therein the clamp nut 110 and the flange portion 114 of the tool holder 100. As shown in FIGS. 30 and 31, the tool pocket hole 534 is a stepped hole having a circular shape in its transversal cross section, so as to include a plurality of hole portions having respective diameters different from each other. In the present embodiment, the tool pocket hole 534 includes two hole portions consisting of a clamp-nut receiving hole portion 536 and a flange receiving hole portion 538 which are arranged in this order of description as viewed in the forward direction (i.e., rightward direction as seen in FIG. 30). The clamp-nut receiving hole portion 536 has a diameter that permits the clamp nut 110 of the tool holder 100 to be fitted into the clamp-nut receiving hole portion 536. The flange receiving hole portion 538 has a diameter larger than the diameter of the clamp-nut receiving hole portion 536, such that the flange portion 114 of the tool holder 100 can be fitted into the flange receiving hole portion 538. The tool pocket hole 534 has an inner circumferential surface including a contactable surface portion 540 located between the clamp-nut receiving hole portion 536 and the flange receiving hole portion 538. The contactable surface portion 540 of the inner circumferential surface of the tool pocket hole 534 is perpendicular to the axis of the tool pocket hole 534, and faces in the forward direction so as to serve a force receiving surface.

As shown in FIGS. 28 and 31, a plural sets of ball plungers 550 are provided in a portion of the tool-pocket-hole defining member 520 which defines the flange receiving hole portion 538. In the present embodiment, three sets of ball plungers 550 are located in respective three positions that are generally equi-angularly spaced apart from each other in a circumferential direction of the tool pocket hole 534. Each of the three sets of ball plungers 550 has substantially the same construction as that of each of the above-described sets of ball plungers 249. As shown in FIG. 31, each of the three sets of ball plungers 550 is positioned relative to the tool pocket hole 534 such that an axis of each ball plunger 550 perpendicularly intersects with the axis of the tool pocket hole 534. Two of the three sets of ball plungers 550 are located on a lower side of the axis of the tool pocket hole 534, such that the two sets of ball plungers 550 are inclined with respect to a vertical plane containing the axis of the tool pocket hole 534, and are symmetrical to each other with respect to the vertical plane. Another one of the three sets of ball plungers 550 is located on an upper side of the axis of the tool pocket hole 534.

As shown in FIG. 31, a holder sensor 554 is provided in the above-described portion of the tool-pocket-hole defining member 520 which defines the flange receiving hole portion 538, and is located in a position that is angularly shifted, about the axis of the tool pocket hole 534, from each of positions in which the respective sets of ball plungers 249 are located. The holder sensor 554 has substantially the same construction as the above-described holder sensor 250, and is configured to detect presence of the tool holder 100 in the tool pocket 502, namely, in the tool magazine 490.

As shown in FIGS. 28, 29 and 31, at least one supporting wall 558 is provided in the tool-pocket-hole defining member 520, and protrudes radially outwardly from a portion of the tool-pocket-hole defining member 520 which is angularly shifted, about the axis of the tool pocket hole 534, from each of positions in which the respective sets of ball plungers 249 are located. In the present embodiment, two supporting walls 558 are located in respective positions that are distant from each other in a direction parallel to the tool pocket rows. A movable engaging lever 560 as a kind of pivot engaging member is attached to each one of the supporting walls 558 through a shaft 562, and is pivotable relative to the tool-pocket-hole defining member 520 about a pivot axis which is perpendicular to and distant from the axis of the tool pocket hole 534. Since the movable engaging lever 560 has substantially the same construction as the above-described movable engaging lever 260, the same reference signs as used in the lever 260 will be used to identify the functionally corresponding elements of the lever 560, and redundant description of these elements is not provided.

As shown in FIG. 28, the two movable engaging levers 560 are forced by respective compression coil springs 564 as examples of an engaging-member forcing device. Each of the compression coil springs 564 is held at one of its opposite end portions by a corresponding one of spring holders 566, 568 that are provided in the tool-pocket-hole defining member 520. Each of the spring holders 566, 568 includes a portion that protrudes into the flange receiving hole portion 538 of the tool pocket hole 534, as shown in FIGS. 28 and 31, so that the flange receiving hole portion 538 of the tool pocket hole 534 has, in a transversal cross section taken in a plane passing through the spring holders 566, 568, a generally oval shape that is substantially identical with the generally oval shape of the transversal cross section of the flange portion 114 of the tool holder 100 (see FIG. 6).

As shown in FIGS. 28 and 29, a pair of actuating members 570 are provided in the pocket body 510, and are located in respective positions which are diametrically opposite to each other and which are aligned with the respective movable engaging levers 560 in a circumferential direction of the tool pocket hole 534. Since each of the actuating members 570 has substantially the same construction as each of the actuating members 290, the same reference signs as used in the actuating members 290 will be used to identify the functionally corresponding elements of the actuating members 570, and redundant description of these elements is not provided. In the present embodiment, the actuating portions 294 of the respective actuating members 570 and the actuated portions 272 of the respective movable engaging levers 560 cooperate to constitute the movement converting device. Further, the actuated and actuating portions 272, 294 cooperate with the spring 564 to constitute a pivot engaging-member controlling device, and cooperate with the movable engaging lever 560 to constitute a clamping-device controlling device.

As shown in FIGS. 28, 30 and 31, the tool-pocket-hole defining member 520 has an axially extending opening 602 provided in its circumferential wall that surrounds the tool pocket hole 534. The axially extending opening 602 extends axially from one of axially opposite ends of the circumferential wall to the other of the axially opposite ends of the circumferential wall, and extends also from an outer circumferential surface 600 of the circumferential wall to the tool pocket hole 534, such that the tool pocket hole 534 is held in communication with an exterior of the tool-pocket-hole defining member 520 via the opening 602. The opening 602 opens in a lower portion of the outer circumferential surface 600, and opens also in axially opposite end surfaces of the tool-pocket-hole defining member 520, so as to extend over an entire axial length of the tool-pocket-hole defining member 520. The opening 602 has a width (as measured in a direction perpendicular to the axis of the tool pocket hole 534 and which is parallel to the tool pocket rows) which is smaller than the diameter of the clamp-nut receiving hole portion 536 of the tool pocket hole 534 and which is larger than a shank portion of a rotary machining tool. The opening 602 is defined by a pair of side surfaces each having respective radially outer end portions that serves as guide surfaces 603. The guide surfaces 603 are inclined with respect to the vertical plane containing the axis of the tool pocket hole 534, and are symmetrical to each other with respect to the vertical plane, such that a distance between the guide surfaces 603 is increased as each of the guide surfaces 603 extends radially outwardly away from the axis of the tool pocket hole 534.

Figure 32:
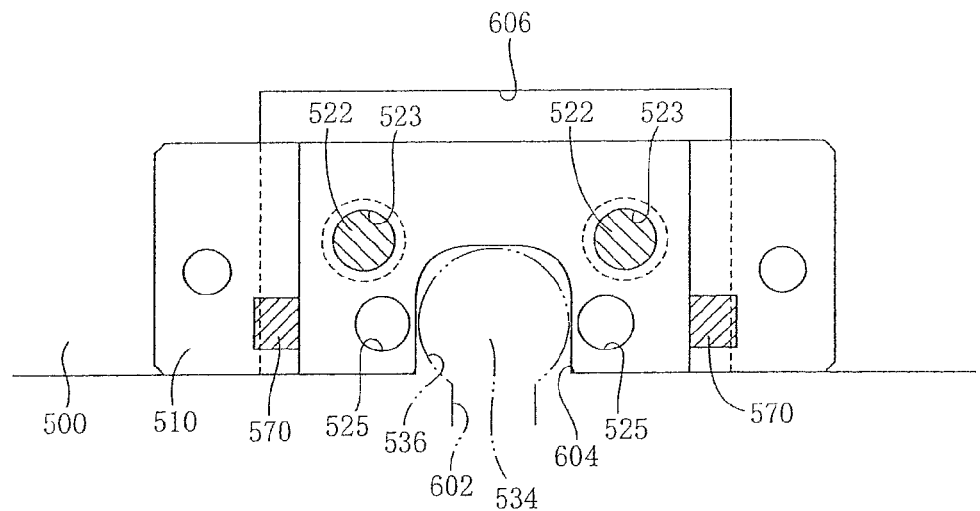
FIG. 32 is a front view showing, partially in cross section, a main body of the tool pocket of FIG. 28 together with a main body of a tool storage device, wherein the cross section is taken along line XXXII-XXXII in FIG. 29.

As shown in FIGS. 28, 30 and 32, the pocket body 510 has an opening 604 that is provided in its portion opposed to the tool pocket hole 534. The opening 604 extends in parallel to the second opposite directions, i.e., the axis of the tool pocket hole 534, and opens in a lower portion of an outer circumferential surface of the pocket body 510. The opening 604 has a generally rectangular shape (see FIG. 32) in its cross section perpendicular to the axis of the tool pocket hole 534, and opens also in axially opposite end surfaces of the pocket body 510, so as to extend over an entire axial length of the tool pocket body 510. The opening 604 has a width (as measured in a horizontal direction in FIG. 32) and a depth (as measured in a vertical direction in FIG. 32) which cooperate with each other to allow the clamp nut 110 of the tool holder 100 to be accommodated in the opening 604. In the present embodiment, the tool-pocket-hole defining member 520 and the pocket body 510 cooperate with each other to allow a tool to be moved in a radial direction of the tool pocket hole 534 via the openings 602, 604, and the tool pocket 502 as a whole has a shape that allows the radial movement of the tool.

As shown in FIGS. 28, 30 and 32, the magazine body 500 of the tool magazine 490 has openings 606 in its portions to which the pocket bodies 510 of the respective tool pockets 502 are fixed. Each of the openings 606 opens in a lower portion of an outside surface of the magazine body 500, and extends through the magazine body 500 in parallel to the axis of the tool pocket hole 534, so as to open also in opposite side surfaces of the magazine body 500 (i.e. right and left side surfaces as seen in FIG. 28). As shown in FIG. 32, the opening 606 has a width (as measured in a horizontal direction in FIG. 32) and a depth (as measured in a vertical direction in FIG. 32) which cooperate with each other to allow a machining portion of the tool (which has a diameter larger than the shank portion of the tool) to be accommodated in the opening 606, and to allow the radial movement of the tool through the opening 606.

It is noted that the tool-pocket-hole defining member 520 and pocket body 510 of each of the tool pockets 502, which are arranged in the upper tool pocket row, have the openings 602, 604, too, and that a portion of the magazine body 500 to which each of the tool pockets 502 of the upper tool pocket row has the opening 606. However, these openings 602, 604, 606, which are located in the upper tool pocket row, open upwardly. It is further noted that the machining machine and the tool magazine 490 are controlled by a control device 610 (see FIG. 27) that is principally constituted by a computer.

There will be described operations performed in the present machining system. In the present machining system, six spindle units 30 of the machining machine 10 are capable of holding various kinds of tools (e.g., drill, reamer, tap, endmill, facemill, dovetail milling cutter, T-slotter, boring bar, counterbore, deburring brush) that are required to perform various kinds of machining operations onto a workpiece. There are a case where tools held by the spindle units 30 are the same in kind as each other, and also a case where tools held by the spindle units 30 are different in kind from each other.

There will be described an operation using a brush 620 as an example of a tool. As shown in FIG. 29, the brush 620 includes a shank portion 622 and a brush portion 624 which is coaxial with the shank portion 622 and which has a diameter larger than a diameter of the shank portion 622. Like the above-described drill 310, the brush 620 is held by the tool holder 100, and is attached to the spindle extension 46 via the tool holder 100. Since the shank portion 622 of the brush 620 has a large length, the shank portion 622 includes a portion which is not introduced in the tool holder 100 and which protrudes from the tool holder 100. For machining a workpiece by the brush 620, the spindle unit 30 holding the brush 620 is moved in the forward direction by the quill movement device 34, and then the head unit 18 is moved by the head movement device 16 while the spindle extension 46 together with the spindle 40 is rotated by the spindle drive device 44, so that the workpiece is subjected to a machining operation with rotation and movement of the brush 620 in the X-axis direction, Y-axis direction and Z-axis direction, for example, for deburring the workpiece.

When the brush 620 held by the spindle extension 46 becomes considerably worn and no longer usable after having been used repeated times, the brush 620 held by the spindle extension 46 is unloaded from the machining machine 10 to the tool magazine 490, and an unused brush 620 is loaded from the tool magazine 490 to the machining machine 10. In the present embodiment, the tool pockets 502 arranged in a lower one of the two tool pocket rows are assigned to store used tools while the tool pockets 502 arranged in an upper one of the two tool pocket rows are assigned to store unused tools. In an initial stage of operation of the present machining system, the tool pockets 502 arranged in the lower tool pocket row are empty while the tool pockets 502 arranged in the upper tool pocket row are filled with unused tools. Hereinafter, the tool pockets 502 arranged in the lower tool pocket row will be referred to as "used tool pockets 502" while the tool pockets 502 arranged in the upper tool pocket row will be referred to as "unused tool pockets 502". It is noted that assignments of the tool pockets 502 may be modified such that the tool pockets 502 of the upper tool pocket row are assigned to store used tools while the tool pockets 502 of the lower tool pocket row are assigned to store unused tools as in the above-described tool magazine 12.

The tool magazine 490 is positioned in the manual operation position located in the withdrawal area that is located above the machining area during a machining operation performed by the machining machine 10. When the used brush 620 held by the spindle extension 46 is required to be replaced by an unused brush 620, the tool magazine 490 is moved by the magazine elevating device 504 down to the tool transfer position located in the machining area. Then, the used brush 620 is unloaded from the spindle extension 46 to one of the used tool pockets 502 so as to be stored in the tool magazine 12. When a plurality of tools become unusable simultaneously, the plurality of tools can be simultaneously transferred between the machining machine 10 and the tool magazine 490 even where the tools include the brush 620 or other tool that has a machining portion having a large diameter. There will be described herein transference of the brush 620 as a single tool, for simplification of the description.

Like the above-described drill 310, the brush 620, which is held by the tool holder 100 and is attached to the spindle extension 46 via the tool holder 100, is transferred between the tool pocket 502 and the spindle extension 46 while being held by the tool holder 100. For unloading the used brush 620 from the spindle extension 46 to the used tool pocket 502, the clamping of the tool holder 100 by the ball clamping device is released, and the tool holder 100 is received by the used tool pocket 502, in substantially the same manner as in unloading of the drill 310. For loading an unused brush 620 from the unused tool pocket 502 to the spindle extension 46, the holding of the tool holder 100 by the unused tool pocket 502 is released, and the tool holder 100 is received by the spindle extension 46 and is clamped by the ball clamping device, in substantially the same manner as in loading of the drill 310. However, since the brush portion 624 of the brush 620 has a large diameter, the brush 620 cannot be introduced into the tool pocket hole 534 only by relative axial movement of the spindle extension 46 and the tool pocket 502 toward each other. Therefore, the spindle extension 46 and the tool pocket 502 are caused to be moved relative to each other not only in the axial direction but also in the radial direction. In the tool unloading process, the brush 620 is placed in a coaxial position that is coaxial with the tool pocket hole 534, by the relative radial movement of the spindle extension 46 and the tool pocket 502. In the tool loading process, the brush 620 is moved away from the coaxial position, by the relative radial movement of the spindle extension 46 and the tool pocket 502.

Figure 33:
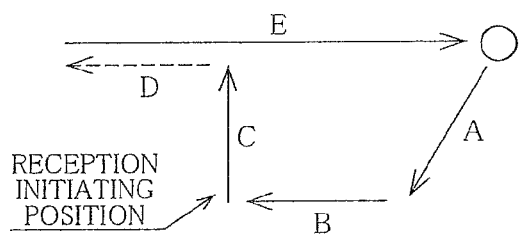
FIG. 33 is a view showing a movement path of the spindle extension during the tool unloading process for unloading a tool from the spindle extension to the tool pocket of FIG. 27.

There will be described the tool unloading process for unloading the used brush 620 from the spindle extension 46 to the used tool pocket 502. FIG. 33 schematically shows a movement path of the spindle extension 46 during the tool unloading process. The tool unloading process is initiated by establishing a coaxial state in which the spindle extension hole 54 of the spindle extension 46 and the tool pocket hole 534 of the used tool pocket 502 are coaxial with each other. The coaxial state is established by movement of the head unit 18 of the machining machine 10 relative to the tool magazine 12. Then, a spindle orientation is achieved for rotating the spindle extension 46 for thereby positioning the spindle extension 46 in a spindle orientation position as an example of a predetermined angular position relative to the tool pocket 502, so that the brush 620 can be stored in the tool pocket 502 while being positioned in a predetermined angular position relative to the tool pocket 502.

Then, the spindle extension 46 is moved in a forward and downward direction as indicated by arrow A in FIG. 33, by combination of forward movement of the spindle unit 30 by the quill movement device 34 and downward movement of the head unit 18 by the head movement device 16. When the spindle extension 46 has been moved down to a predetermined height position that is lower than the tool pocket 502 by a predetermined distance, the downward movement of the head unit 18 is stopped. After the downward movement of the head unit 18 has been stopped, the spindle extension 46 is moved in the forward direction as indicated by arrow B, by the forward movement of the spindle unit 30, so as to be positioned in a reception initiating position. FIG. 29 shows a stage in which the spindle extension 46 is positioned in the reception initiating position. While the spindle extension 46 is being positioned in the reception initiating position, as shown in FIG. 29, the brush portion 624 of the brush 620 is positioned on a rear side (i.e., right side as seen in FIG. 29) of the pocket body 510 and on a lower side of the magazine body 500, and the clamp nut 110 of the tool holder 100 is positioned in a slightly front side (i.e., left side as seen in FIG. 29) of the tool-pocket-hole defining member 520 and on a lower side of the tool-pocket-hole defining member 520. The forward movement of the spindle unit 30 is stopped, for example, when a predetermined length of time has passed from a point of time of initiation of the forward movement, or when it is detected that the spindle extension has reached the reception initiating position. In the latter case, the detection is made, for example, by a spindle-position detecting device that includes a detecting portion (e.g., micro switch, proximity switch) and a detected portion (e.g., dog).

Then, the spindle extension 46 is upwardly moved in the radial direction of the tool pocket hole 534, as indicated by arrow C, by upward movement of the head unit 18 by the head movement device 16. As a result of the upward movement of the spindle extension 46 as indicated by arrow C, the shank portion 622 of the brush 620 is introduced into the tool pocket hole 534 via the axially extending opening 602 that is provided in the tool-pocket-hole defining member 520 of the tool pocket 502, such that the shank portion 622 becomes coaxial with the tool pocket hole 534. In this instance, the introduction of the shank portion 622 into the tool pocket hole 534 is guided by the pair of guide surfaces 603. This introduction is made possible by the opening 604 of the pocket body 510 and the opening 606 of the magazine body 500 which allow radial movement of the shank portion 622 and radial movement of the brush portion 624, respectively. After the shank portion 622 has become coaxial with the tool pocket hole 534 as a result of the upward movement of the spindle extension 46 as indicated by arrow C, the spindle extension 46 is axially moved to a tool-unloading forward movement end position, as indicated by arrow D, by the quill movement device 34. As a result of the forward movement of the spindle extension 46 to the tool-unloading forward movement end position, the clamping of the tool holder 100 by the ball clamping device is released, and the tool holder 100 is received in the used tool pocket 502, in substantially the same manner as in reception of the drill 310 in the tool pocket 192. After the brush 620 has been stored in the tool magazine 490, the spindle unit 30 is axially moved in the backward direction by the quill movement device 34 whereby the spindle extension 46 is axially moved in the backward direction, as indicated by arrow E. As a result of the backward movement of the spindle extension 46, the tool holder 100 is removed out of the spindle extension hole 54.

The brush 620 includes the shank portion having the large length and the machining portion having the large diameter. However, while the brush 620 is being held by the tool pocket 502, inclination of the brush 620 is prevented by the three sets of ball plungers 550 which are equi-angularly spaced apart from each other and which cooperate with one another to grip the tool holder 100 (that holds the brush 620) with a large gripping force.

Figure 34:
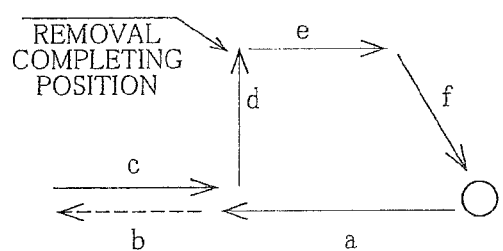
FIG. 34 is a view showing a movement path of the spindle extension during the tool loading process for loading a tool from the tool pocket of FIG. 27 to the spindle extension.

There will be next described the tool loading process for loading an unused brush 620 from the unused tool pocket 502 to the spindle extension 46. FIG. 34 schematically shows a movement path of the spindle extension 46 during the tool loading process. The tool loading process following the tool unloading process is initiated by establishing a coaxial state in which the spindle extension hole 54 of the spindle extension 46 and the tool pocket hole 534 of the unused tool pocket 502 are coaxial with each other. Since the unused tool pocket 502 is located above the used tool pocket 502 in the tool magazine 490, the coaxial state is established by downward movement of the tool magazine 490 which is made by the magazine elevating device 504. Then, the spindle extension 46 is moved in the forward direction as indicated by arrow a in FIG. 34, by the forward movement of the spindle unit 30 which is made by the quill movement device 34. As a result of the forward movement of the spindle extension 46 as indicated by arrow a, the tool holder 100 is fitted into the spindle extension hole 54. Then, the spindle extension 46 is further moved in the forward direction as indicated by arrow b, so as to be positioned in a tool-loading forward movement end position, whereby the tool holder 100 is clamped by the ball clamping device in substantially the same manner as in clamping of the drill 310.

After the forward movement of the spindle extension 46 to the tool-loading forward movement end position, the spindle unit 30 is axially moved by the quill movement device 34 in the backward direction whereby the spindle extension 46 is moved in the backward direction, as indicated by arrow c. As a result of the backward movement of the spindle extension 46 as indicated by arrow c, the gripping of the tool holder 100 by the ball plungers 550 is released, and the clamp nut 110 of the tool holder 100 is removed out of the pocket hole 534. Then, the head unit 18 is moved upwardly by the head movement device 16, whereby the spindle extension 46 is moved upwardly in the radial direction of the tool pocket hole 534, as indicated by arrow d, so as to be positioned in a removal completing position. As a result of the upward movement of the spindle extension 46 as indicated by arrow d, the shank portion 622 of the brush 620 is removed out of the tool pocket hole 534 via the axially extending opening 602. This removal of the shank portion 622 out of the tool pocket hole 534 is made possible by the opening 604 of the pocket body 510 and the opening 606 of the magazine body 500 which allow radial movement of the shank portion 622 and radial movement of the brush portion 624, respectively.

Then, the spindle extension 46 is moved in the backward direction as indicated by arrow e, until the brush portion 620 is positioned in a position that is located on a rear side of the tool pocket 602. The backward movement as indicated by arrow e is followed by backward and downward movement as indicated by arrow f whereby the spindle extension 46 is made coaxial with the tool pocket hole 534. In the present embodiment, it is possible to interpret that the magazine body 500 of the tool magazine 490 also constitutes a part of the main body of the second tool holding device, since the magazine body 500 is provided with the opening 606 for allowing the radial movement of the brush 620. Further, the quill movement device 34 constitutes a relative movement device configured to cause the first and second tool holding devices to be axially moved relative to each other upon transfer of a tool from each one of the first and second tool holding devices to the other of the first and second tool holding devices. The head movement device 16 constitutes a relative movement device configured to cause the first and second tool holding devices to be radially and axially moved relative to each other upon transfer of a tool from each one of the first and second tool holding devices to the other of the first and second tool holding devices.

The tool pocket 502 is capable of holding not only the brush 620 or other tool in which its machining portion has a diameter larger than a diameter of its shank portion but also the drill 310, tap or other tool in which its machining portion has a diameter not larger than a diameter of its shank portion. Therefore, where the drill 310 or tap is used in the machining machine 10, it is possible to transfer the drill 310 or tap between the spindle extension 46 and the tool pocket 502. In this case, as in transfer of the drill 310 or tap between the spindle extension 46 and the tool pocket 192, the drill 310 or tap is introduced into and removed out of the tool pocket 502 only by axial movement of the spindle extension 46 and the tool pocket 502 relative to each other. Further, it is possible to transfer simultaneously the brush 620 and the drill 310 between the machining machine 10 and the tool magazine 490. In this case, not only the brush 620 but also the drill 310 is introduced into and removed out of the tool pocket 502, by axial movement of the spindle extension 46 and the tool pocket 502 relative to each other and radial movement of the spindle extension 46 and the tool pocket 502 relative to each other.

In the present embodiment, the tool unloading process and the tool loading process are both initiated by establishing the coaxial state in which the spindle extension 46 and tool pocket 502 are opposed to each other and are coaxial with each other. This is because, in the tool unloading and loading processes, the coaxial state is first established irrespective of which kind of tool is to be subjected to the tool unloading and loading processes, in view of a fact that a majority of tools do not require the radial movement of the spindle extension 46 and the tool pocket 502 relative to each other, for their introduction into and removal out of the tool pocket 502. However, the establishment of the coaxial state upon initiation of the tool unloading or loading process is not essential. For example, where a tool subjected to the tool unloading process does not require the radial movement of the spindle extension 46 and the tool pocket 502 relative to each other, for its introduction into and removal out of the tool pocket 502, the process is initiated by the establishment of the coaxial state, so that the axial movement of the spindle extension 46 and the tool pocket 502 toward each other is made after the establishment of the coaxial state. Where a tool subjected to the tool unloading process requires the radial movement of the spindle extension 46 and the tool pocket 502 relative to each other, for its introduction into and removal out of the tool pocket 502, the process may be initiated without the establishment of the coaxial state, so that the axial movement of the spindle extension 46 and the tool pocket 502 toward each other is made while the spindle extension 46 and the tool pocket 502 are offset from each other in the radial direction. In the latter case, the relative movement as indicated by arrow A in FIG. 33 is not required, so that the tool is unloaded from the spindle extension 46 to the tool pocket 502, by the relative axial movement as indicated by arrow B, the relative radial movement as indicated by arrow C and the relative axial movement as indicated by arrow D.

It is noted that the machining system may be provided with a tool magazine that has the tool pockets 502 and also the above-described tool pockets 192, or that the machining system may be provided with the tool magazine 490 having the tool pockets 502 and the tool magazine 12 having the tool pockets 192. In the latter case, the tool magazines 490, 12 may be selectively moved to the machining area so that a tool transfer can be made between the machining machine 10 and a selected one of the tool magazines 490, 12.

Figure 35:
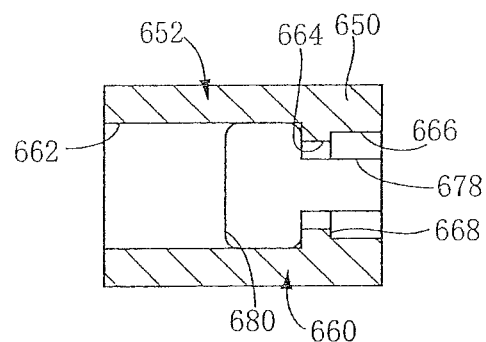
FIG. 35 is a plan cross-sectional view showing a tool-pocket-hole defining member constructed according to still another embodiment of the invention.
Figure 36:
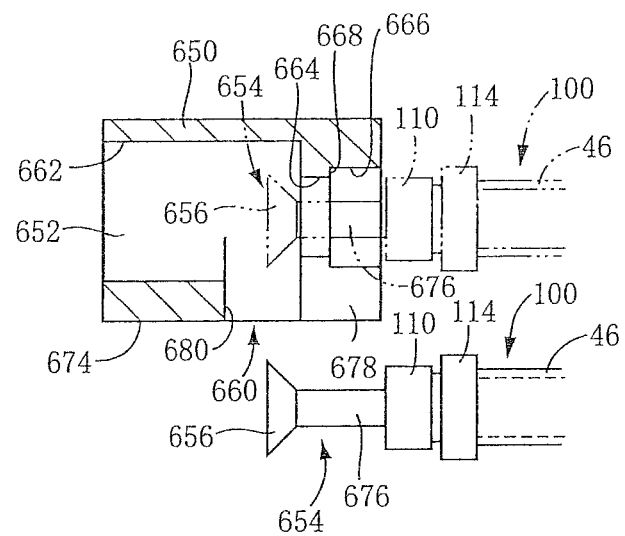
FIG. 36 is a side cross-sectional view showing the tool-pocket-hole defining member of FIG. 35 together with a tool.

In the above-described embodiment, the axially extending opening 602 is arranged to extend over the entire axial length of the tool-pocket-hole defining member 520 as an example of the second-receiving-hole defining member. However, it is not essential, and the second-receiving-hole defining member may be provided with an axially extending opening that does not extend over the entire axial length of the second-receiving-hole defining member. FIGS. 35 and 36 show another embodiment in which a tool-pocket-hole defining member 650 as an example of the second-receiving-hole defining member has a tool pocket hole 652 as an example of the second receiving hole. The tool pocket hole 652 has a shape and a size that cooperate to allow a machining portion 656 of a tool 654 to received into the tool pocket hole 652. The tool-pocket-hole defining member 650 has an axially extending opening 660 having a shape and a size that cooperate to allow movement of the tool 654 in a radial direction of the tool pocket hole 652.

The tool pocket hole 652 is a stepped hole including a tool receiving hole portion 662, a clamp-nut receiving hole portion 664 and a flange receiving hole portion 666, such that the tool 654 can be received in the tool receiving hole portion 662, and such that the clamp nut 110 and the flange portion 114 of the tool holder 100 can be fitted in the clamp-nut receiving hole portion 664 and the flange receiving hole portion 666, respectively. The tool pocket hole 652 has an inner circumferential surface including a contactable surface portion 668 located between the clamp-nut receiving hole portion 664 and the flange receiving hole portion 666 that has a diameter larger than a diameter of the clamp-nut receiving hole portion 664. The contactable surface portion 668 of the inner circumferential surface of the tool pocket hole 652 is perpendicular to an axis of the tool pocket hole 652, and faces in the forward direction so as to serve a force receiving surface. The tool receiving hole portion 662 opens in a rear end surface of the tool-pocket-hole defining member 650, and has a diameter larger than a diameter of the machining portion 656 of the tool 654. When the clamp nut 110 is positioned on a slightly front side of the tool-pocket-hole defining member 650, the machining portion 656 of the tool 654 held by the spindle extension 46 is positioned in a position corresponding to the tool receiving hole portion 662 in the axial direction. Further, the tool receiving hole portion 662 has an axial length that allows a forward movement (i.e., rightward movement as seen in FIG. 36) of the machining portion 656, which is made for bringing the flange portion 114 into contact with the contactable surface portion 668, after reception of the machining portion 656 into the tool receiving hole portion 662 as a result of radial movement of the machining portion 656 toward the tool receiving hole portion 662.

The axially extending opening 660 has a generally letter T shape in its plan view, as shown in FIG. 35. The axially extending opening 660 is formed in the tool-pocket-hole defining member 650, such that the opening 660 extends radially from a lower portion of an outer surface 674 of the circumferential wall of the tool-pocket-hole defining member 650 to the tool pocket hole 652, and extends also axially from a front end surface (i.e., right end surface as seen in FIG. 35) of the tool-pocket-hole defining member 650 toward a rear end surface (i.e., left end surface as seen in FIG. 35) of the tool-pocket-hole defining member 650. The opening 660 opens in the front end surface of the tool-pocket-hole defining member 650, but does not open in the rear end surface of the tool-pocket-hole defining member 650. The opening 660 has a small width opening portion 678 and a large width opening portion 680. The small width opening portion 678 is located in a position corresponding to the clamp-nut receiving hole portion 664 and flange receiving hole portion 666, and has a width which is smaller than a diameter of the clamp-nut receiving hole portion 664 and is larger than a diameter of a shank portion 676 of the tool 654. The large width opening portion 680 is located in a position corresponding to the tool receiving hole portion 662, and has a width which is as large as a diameter of the tool receiving hole portion 662. It is noted that, although the tool 654 is a dovetail milling cutter for cutting a dovetail groove, a T-slotter or other tool can be held in a tool pocket including the tool-pocket-hole defining member 650.

When the tool 654 is to be unloaded from the spindle extension 46 to the tool pocket including the tool-pocket-hole defining member 650, the spindle extension 46 is positioned in a reception initiating position, as indicated by solid line in FIG. 36, which is located on a lower side of the tool-pocket-hole defining member 650. While the spindle extension 46 is being positioned in the reception initiating position, the clamp nut 110 of the tool holder 100 is positioned in a position located on a slightly front side (i.e., left side as seen in FIG. 36) of the tool-pocket-hole defining member 650, and the machining position 656 is positioned in a position corresponding to a front portion of the large width opening portion 680 (i.e., portion of the large width opening portion 680 which is contiguous to the small width opening portion 678). Then, the spindle extension 46 is moved upwardly from the reception initiating position in the radial direction of the tool pocket hole 652, so that the shank portion 676 is introduced into the tool pocket hole 652 via the small width opening portion 678 of the opening 660 and so that the machining portion 656 is introduced into the tool receiving hole portion 662 via the large width opening portion 680, whereby the tool 654 is coaxially received in the tool pocket hole 652 as indicated by two-dot chain line in FIG. 36. After the spindle extension 46 has become coaxial with the tool pocket hole 652 as a result of its upward movement in the radial direction, the spindle extension 46 is moved in the forward direction so as to release the tool holder 100. In this instance, the machining portion 656 of the tool 654 is moved forwardly within the tool receiving hole portion 662 whereby the forward movement of the spindle extension 46 is allowed.

When the tool 654 is to be loaded from the tool pocket to the spindle extension 46, the spindle extension 46 is axially moved in the forward direction so as to hold the tool 654, and then is axially moved in the backward direction to a position that causes the clamp nut 110 to be removed out of the tool pocket hole 652. After having been thus moved in the backward direction, the spindle extension 46 is moved downwardly for causing the machining portion 656 and the shank portion 676 of the tool 654 to pass through the large width opening portion 680 and the small width opening portion 678, respectively, so that the tool 654 is removed out of the tool-pocket-hole defining member 650.

Figure 37:
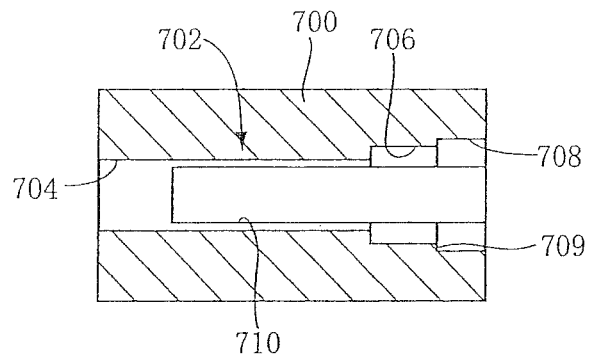
FIG. 37 is a plan cross-sectional view showing a tool-pocket-hole defining member constructed according to still another embodiment of the invention.
Figure 38:
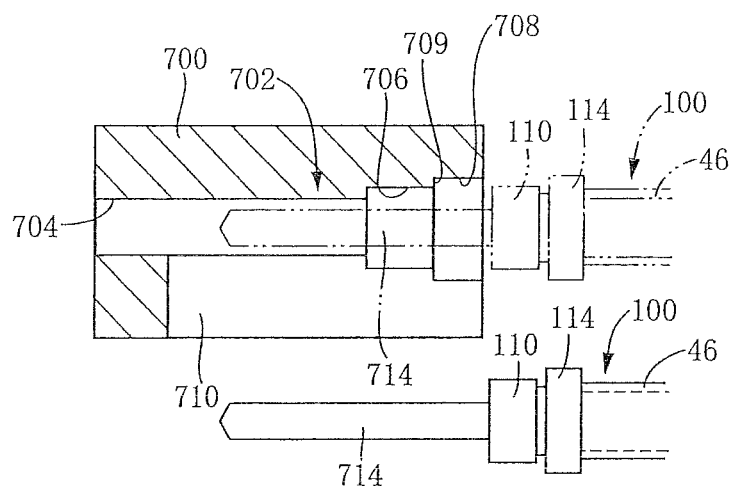
FIG. 38 is a side cross-sectional view showing the tool-pocket-hole defining member of FIG. 37 together with a tool.

The axially extending opening may be provided in the second-receiving-hole defining member not only where the second-receiving-hole defining member is assigned to receive a tool in which its machining portion has a diameter larger than a diameter of its shank portion but also where the second-receiving-hole defining member is assigned to receive a drill or other tool in which its machining portion has a diameter not larger than a diameter of its shank portion. FIGS. 37 and 38 show another embodiment in which a tool pocket hole 702 as an example of a second receiving hole is formed through a tool-pocket-hole defining member 700 as an example of a second-receiving-hole defining member. The tool pocket hole 702 is surrounded by a circumferential wall of the tool-pocket-hole defining member 700, and is provided by a stepped hole including a tool receiving hole portion 704, a clamp-nut receiving hole portion 706 and a flange receiving hole portion 708. The tool receiving hole portion 704 has a diameter that is the smallest among those of the three portions of the tool pocket hole 702. The tool pocket hole 702 has an inner circumferential surface including a contactable surface portion 709 located between the clamp-nut receiving hole portion 706 and the flange receiving hole portion 708.

The tool-pocket-hole defining member 700 has an axially extending opening 710 which extends radially from a lower portion of an outer surface of the circumferential wall to the tool pocket hole 702 and which extends axially from a front end surface of the tool-pocket-hole defining member 700 toward a rear end surface of the tool-pocket-hole defining member 700. The axially extending opening 710 opens in the front end surface but does not open in the rear end surface. The axially extending opening 710 has a width which is smaller than a diameter of the clamp-nut-receiving hole portion 706 and which is larger than a diameter of the tool 714. The tool 714 is a drill or other tool having a small diameter that is substantially constant over its entire axial length.

When the tool 714 is to be unloaded from the spindle extension 46 to a tool pocket including the tool-pocket-hole defining member 700, the spindle extension 46 is positioned in a reception initiating position, as indicated by solid line in FIG. 38, which is located on a lower side of the tool-pocket-hole defining member 700. While the spindle extension 46 is being positioned in the reception initiating position, the clamp nut 110 of the tool holder 100 is positioned in a position located on a slightly front side (i.e., left side as seen in FIG. 38) of the tool-pocket-hole defining member 700. Then, the spindle extension 46 is moved upwardly from the reception initiating position in the radial direction of the tool pocket hole 704, so that the tool 714 is introduced into the tool pocket hole 702 via the axially extending opening 710. Then, the spindle extension 46 is moved in the forward direction, whereby clamping of the tool 714 by the ball clamping device is released.

When the tool 714 is to be loaded from the tool pocket to the spindle extension 46, the spindle extension 46 is axially moved in the forward direction so as to hold the tool 714, and then is axially moved in the backward direction to a position that causes the clamp nut 110 to be removed out of the tool pocket hole 702. After having been thus moved in the backward direction, the spindle extension 46 is moved downwardly for causing the tool 714 to be removed out of the tool-pocket-hole defining member 700.

In a case where a tool has a diameter that is substantially constant over its entire axial length, the tool can be introduced into and removed out of the second receiving hole only by axial movement of the first and second tool holding devices relative to each other. However, in such a case, too, the provision of the axially extending opening in the second-receiving-hole defining member is advantageous, because it is possible to reduce an amount of the axial movement required for transferring the tool between the first and second tool holding devices, by causing the first and second tool holding devices to be radially moved relative to each other through the axially extending opening. In a process for transferring a tool from the first tool holding device to the second tool holding device, an amount of the axial movement required for releasing clamping of the tool by the ball clamping device of the first tool holding device, is not dependent on an axial length of the tool. In a process for transferring a tool from the second tool holding device to the first tool holding device, an amount of the axial movement required for releasing clamping of the tool by the second tool holding device and causing the tool to be clamped by the ball clamping device of the first tool holding device, is not dependent on the axial length of the tool. However, in the process for transferring a tool from the first tool holding device to the second tool holding device, an amount of the axial movement required for introducing the tool into the second receiving hole, is increased with increase of the axial length of the tool. In the process for transferring a tool from the second tool holding device to the first tool holding device, an amount of the axial movement required for removing the tool out of the second receiving hole, is increased with increase of the axial length of the tool. Therefore, by introducing and removing the tool into and out of the second receiving hole by radial movement of the first and second tool holding devices relative to each other, the introduction and removal of the tool into and out of the second receiving hole can be made by respective movement paths each of which does not have to be changed depending on the axial length and shape of the tool. Further, by introducing and removing the tool into and out of the second receiving hole by the radial movement, it is possible to advantageously reduce an amount of the axial movement required for transferring the tool between the first and second tool holding devices. The required amount of the axial movement can be reduced by a large degree, particularly, where the tool has a large axial length. However, where the tool has a small axial length, too, the required amount of the axial movement can be reduced by a certain degree.

Therefore, where a tool is introduced into and removed out of the second receiving hole by radial movement of the first and second tool holding devices relative to each other, the required amount of the axial movement for transferring the tool from the first tool holding device to the second tool holding device can be reduced to the required amount of the axial movement for releasing clamping of the tool by the ball clamping device of the first tool holding device, and the required amount of the axial movement for transferring the tool from the second tool holding device to the first tool holding device can be reduced to the required amount of the axial movement for releasing clamping of the tool by the second tool holding device and causing the tool to be clamped by the ball clamping device of the first tool holding device.

Figure 39:
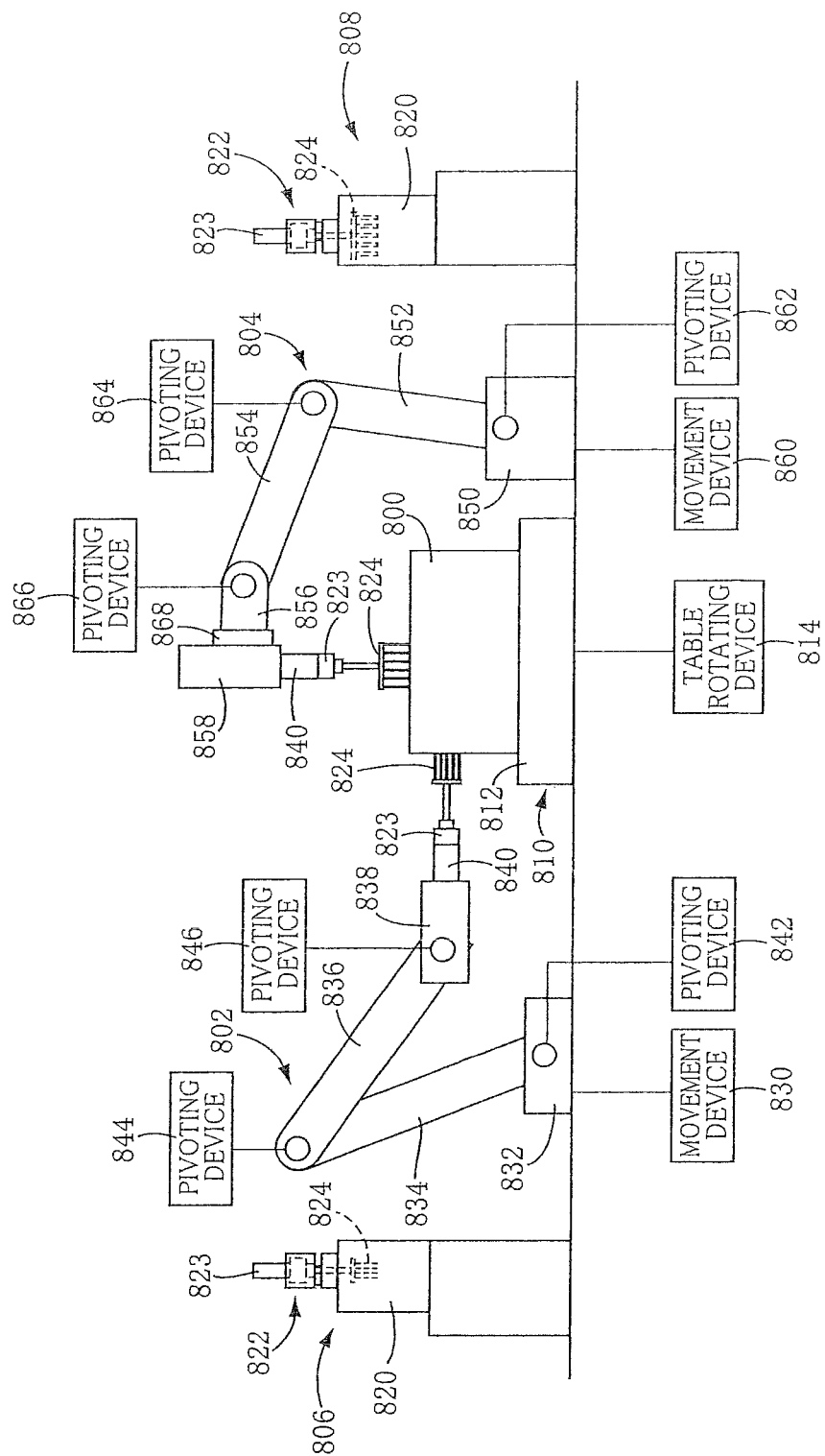
FIG. 39 is a front view showing a deburring system equipped with a tool transfer system that is constructed according to sill another embodiment of the present invention.

Referring next to FIG. 39, there will be described a tool transfer system which is constructed according to another embodiment of the invention. This tool transfer system is provided in a deburring system as an example of the machining system, and includes a plurality of robots, a plurality of tool storage devices and a work holding device. The first holding device is provided in each of the robots, which has a function of realizing various motions in a three-dimensional space. In this deburring system, the two robots 802, 804 are operated to perform deburring operations onto a workpiece 800 which has a generally rectangular shape and which is held by the work holding device 810. The work holding device 810 includes a rotary table 812 (onto which the workpiece 800 is to be disposed) and a table rotating device 814 configured to rotate the rotary table 812 about its axis that extends, for example, in a vertical direction. On the table 812, there is provided a jig or fixture (not shown) by which the workpiece 800 is removably fixed onto the table 812. The table rotating device 814 includes a drive source in the form of a servo motor so that the rotary table 812 can be rotated in a forward or reverse direction by a desired degree of angle.

Two tool magazines 806, 808 as examples of the tool storage devices are fixedly provided on respective opposite sides of the work holding device 810, and have substantially the same construction. Each of the tool magazines 806, 808 has a magazine body 820 and a plurality of tool pockets 822 (only one of which is illustrated in FIG. 39) as examples of the second tool holding devices. The magazine body 820 and tool pocket 822 are substantially the same in construction with the above-described magazine body 500 and tool pocket 502, except that a tool takes a vertical posture rather than a horizontal posture while being stored in the tool pocket 822. It is noted that, in the present embodiment, a deburring brush 824 as kind of deburring tool is held by a tool holder 823 that has substantially the same construction as the tool holder 100.

Although not being illustrated in drawings, the plurality of tool pockets 822 are arranged in a row extending in a horizontal direction perpendicular to a direction in which the tool magazines 806, 808 and the working holding device 810 are arranged, namely, perpendicular to drawing sheet of FIG. 39. The tool pockets 822, which are arranged in the row, are fixed to the magazine body 820 such that an axis of its tool pocket hole extends in a vertical direction. Further, the magazine body 820, pocket body (as a main body of the tool pocket 822) and tool-pocket-hole defining member (defining the tool pocket hole) have openings that are similar to the above-described openings 602, 604, 606 in the embodiment shown in FIGS. 27 to 34. Each of these openings faces in a horizontal direction toward the work holding device 810. Each of the deburring operations is carried out by using a deburring brush 824 having a shape and a size suitable for a portion of the workpiece 800 which is to be subjected to the deburring operation. To this end, various types of deburring brushes 824 are stored in the respective tool pockets 822 of the tool magazines 806, 808.

The robot 802 is disposed between the work holding device 810 and the tool magazine 806. The robot 802 includes a carriage 832, three pivotable arms 834, 836, 838, a spindle (not shown) and a tool holding device 840 as an example of the first tool holding device. The robot 802 together with the carriage 832 is movable in carriage movement directions that are parallel to the horizontal direction perpendicular to drawing sheet of FIG. 39, by a movement device 830 including a servo motor as an example of drive source.

The arm 834 is attached to the carriage 832, pivotably about its pivot axis that is parallel to the horizontal direction perpendicular to drawing sheet of FIG. 39. The arm 836 is attached to a distal end portion of the arm 834, pivotably about its pivot axis that is parallel to the pivot axis of the arm 834. The arm 838 is attached to a distal end portion of the arm 836, pivotably about its pivot axis that is parallel to the pivot axis of the arm 836. These arms 834, 836, 838 can be pivoted by a desired degree of angle, by respective pivoting devices 842, 844, 846 each including a drive source in the form of a servo motor.

The spindle is provided in the arm 838, and is rotatable about its axis that is perpendicular to the pivot axis of the arm 838, by a spindle drive device (not shown). Thus, the robot 802 is a kind of single-spindle machining machine, and the tool holding device 840 is provided in the spindle. The arms 834, 836, 838 are pivotable on a vertical plane that is parallel to drawing sheet of FIG. 39. By combination of pivotal movements of the respective arms 834, 836, 838, the brush 824 held by the tool holding device 840 can be moved to a desired position lying on the vertical plane, and an axis of the brush 824 can be directed to a desired direction. The tool holding device 840 as the example of the first tool holding device has substantially the same construction as the above-described spindle extension 46 that is also an example of the first tool holding device, so that detailed description thereof is not provided herein.

The robot 804 is disposed between the work holding device 810 and the tool magazine 806. The robot 804 includes a carriage 850, four pivotable arms 852, 854, 856, 858, a spindle (not shown) and another tool holding device 840 as an example of the first tool holding device. The robot 804 together with the carriage 850 is movable in carriage movement directions that are parallel to the horizontal direction perpendicular to drawing sheet of FIG. 39, by a movement device 860 including a servo motor as an example of drive source.

The arm 852 is attached to the carriage 850, pivotably about its pivot axis that is parallel to the horizontal direction perpendicular to drawing sheet of FIG. 39. The arm 854 is attached to a distal end portion of the arm 852, pivotably about its pivot axis that is parallel to the pivot axis of the arm 852. The arm 856 is attached to a distal end portion of the arm 854, pivotably about its pivot axis that is parallel to the pivot axis of the arm 854. These arms 852, 854, 856 can be pivoted by a desired degree of angle, by respective pivoting devices 862, 864, 866. The arm 858 is attached to a distal end portion of the arm 856, pivotably about its axis that is perpendicular to the pivot axis of the arm 856, and can be pivoted by a pivoting device 868. The spindle is provided in the arm 858, and is rotatable about its axis that is perpendicular to the pivot axes of the respective arms 856, 858, by a spindle drive device (not shown). Thus, the robot 804 is a kind of single-spindle machining machine, and the tool holding device 840 is provided in the spindle. By combination of pivotal movements of the respective arms 852, 854, 856, 858, the brush 824 held by the tool holding device 840 can be moved to a desired position, and an axis of the brush 824 can be directed to a desired direction.

In the present deburring system, it is possible to perform deburring operations onto an upper surface and four side surfaces of the rectangular-shaped workpiece 800 that is fixed to the table 812 through the jig or fixture. The robots 802, 804 hold respective brushes 824 suitable for portions of the workpiece 800 which are to be subjected to the deburring operations. The brush 824 held by the robot 802 is assigned to perform the deburring operation on the side surfaces of the workpiece 800, while the brush 824 held by the robot 804 is assigned to perform the deburring operation on the upper and side surfaces of the workpiece 800. It is noted that, where a hole or a recess is provided in the surfaces of the workpiece 800, an opening edge of the hole or recess and an inside surface of the hole or recess also are subjected to the deburring operations performed by the brushes 824.

The brush 824 held by the robot 802 is positioned relative to a subjected portion of a side surface of the workpiece 800, and the axis of the brush 824 is directed to a direction suitable for the deburring operation, by pivotal movements of the arms 834, 836, 838 and movement of the carriage 832. Then, the deburring operation is performed on the subjected portion of the side surface of the workpiece 800, by the brush 824 rotated about the axis by rotation of the spindle. The brush 824 held by the robot 804 also performs the deburring operation substantially in the same manner as the brush 824 held by the robot 806. However, since the arm 858 is pivotable about its pivot axis that is perpendicular to the pivot axis of the arm 856, the movement of the robot 804 has a higher degree of freedom than the movement of the robot 802, so that the brush 824 held by the robot 804 is capable of performing the deburring operation on not only the side surface of the workpiece 800 parallel to the carriage movement directions but also an upper surface of the workpiece 800 and the side surface of the workpiece 800 perpendicular to the carriage movement directions.

After the side surface of the workpiece 800 and the upper surface of the workpiece 800 have been subjected to the deburring operations performed by the brushes 824 held by the respective robots 802, 804, the table 812 is rotated by 90° whereby another side surface of the workpiece 800 is brought into parallel to the carriage movement directions, or by 180° whereby another side surface (that is opposite to the side surface having been subjected to the deburring operation) of the workpiece 800 is brought into parallel to the carriage movement directions. In this instance, the table 812 may be rotated by a desired degree that is not multiple of 90° so that the side surface of the workpiece 800 becomes not parallel to the carriage movement directions.

When the brush 824 held by the robot 802 is to be replaced by another kind of brush 124, the used brush 824 is unloaded from the robot 802 to the tool magazine 806 and the another kind of brush 824 is loaded to the robot 802 from the tool magazine 806. For example, the robot 802 is operated to hand over the used brush 824 to a vacant one of the tool pockets 822, and to receive the another kind of brush 824 from another one of the tool pockets 822 so that the received brush 824 is held by the tool holding device 840. The brush 824 includes a machining portion having a diameter larger than a shank portion of the brush 824, so that the brush 824 is introduced into and removed out of the tool pocket 822 by movement of the tool holding device 840 relative to the tool pocket 822 in a radial direction of the tool pocket hole of the tool pocket 822. In the present embodiment, since the axis of the tool pocket hole of the tool pocket 822 extends in a vertical direction, the radial movement of the tool holding device 840 relative to the tool pocket 822 is made by a horizontal movement of the tool holding device 840 rather than by a vertical movement of the tool holding device 840. That is, a movement path of the tool holding device 840 relative to the tool pocket 502 during the tool unloading process is substantially the same as the movement path shown in FIG. 33, i.e., the movement path of the spindle extension 46 in the above-described embodiment, except that the radial movement of the tool holding device 840 is made by a horizontal movement of the tool holding device 840. It is noted that the movement of the tool holding device 840 relative to the tool pocket 502 is pivotal movements the respective arms 834, 836, 838.

When the brush 824 held by the tool holding device 840 is to be unloaded from the robot 802 to the tool magazine 806, the brush 824 is caused to take a vertical posture, and then the tool holding device 840 is moved relative to tool pocket 822 in a horizontal direction, whereby the shank portion of the brush 824 is introduced into the tool pocket hole of the tool pocket 822 via the above-described openings, such that the brush 824 becomes coaxial with the tool pocket hole. Then, the tool holding device 840 is moved downwardly in the coaxial state, whereby clamping of the tool holder 823 by the boll clamping device is released. When the brush 824 held by the tool pocket 822 is to be loaded from the tool magazine 806 to the robot 802, the robot 802 is moved together with the carriage 832 in one of the carriage movement directions such that the tool holding device 840 becomes coaxial with the brush 824 held by the tool pocket 822. Then, the tool holding device 840 is moved downwardly in the coaxial state, so as to hold the brush 824. While holding the brush 824, the tool holding device 840 is moved in a horizontal direction whereby the brush 824 is removed out of the tool pocket of the tool pocket 822 via the openings. When the brush 824 held by the robot 804 is to be replaced by another kind of brush 124, the used brush 824 is unloaded from the robot 804 to the tool magazine 808 and the another kind of brush 824 is loaded to the robot 804 from the tool magazine 808, in substantially the same manner as in the replacement of the brush 824 held by the robot 802. Prior to the tool unloading and loading processes, the tool holding device 840 is electrically positioned in the spindle orientation position by the angularly positioning device in the form of the spindle orientation device that is included in spindle drive device (not shown). However, the spindle orientation may be achieved also by the mechanical spindle-orientation device 350 shown in FIG. 19.

While the preferred embodiments of the present invention have been described above in detail by reference to the accompanying drawings, for illustrative purpose only, it is to be understood that the present invention may be embodied otherwise.

During a machining operation, any movement of a tool held by the first tool holding device in the axial direction may be always made by a movement device having a drive source in the form of an electric motor that that is numerically controlled. For example, in the tapping operation in the above-described embodiment, the internal thread is formed by the forward movement of the spindle unit 30 by the quill movement device 34. However, the internal thread may be formed by movement of the head unit 18 in the Z-axis direction by the head movement device 16, as long as the machining device includes means for controlling an amount of axial movement of the tap per one rotation of the tap. In this case, one of the spindle units 30 holding the tap is moved in the forward direction by the quill movement device 34, so as to be positioned in an advanced position that is located on a front side of a position of each of the other spindle units 30. Then, while the thus selected spindle unit 30 is being positioned in the advanced position, the head unit 18 is moved by the head movement device 16 in the X-axis direction and Y-axis direction, such that the tap is positioned in an initial position relative to the workpiece in the X-axis direction and Y-axis direction. Then, while the tap is being positioned in the initial position in the X-axis direction and Y-axis direction, the head unit 18 is moved in the Z-axis direction whereby the tap is moved in its axial direction. Thus, the internal thread is formed in the workpiece by moving the tap in the axial direction and rotating the tap by the spindle drive device 44. The tap is moved in the forward direction to a predetermined depth position in the Z-axis direction while being forwardly rotated, and then moved in the backward direction in the Z-axis direction while being reversely rotated. In this instance, the head movement device 16 is controlled by the control device 300, for controlling a position of the tap in the Z-axis direction.

Further, when a tool is transferred between the first and second tool holding devices, relative position of the first and second holding devices may be numerically controlled. For example, when a single tool is to be transferred between the machining machine 10 and the tool magazine 12, a corresponding one of the spindle units 30 is moved in the forward direction by the quill movement device 34, so as to be positioned in an advanced position that is located on a front side of a position of each of the other spindle units 30. Then, while the thus selected spindle unit 30 is being positioned in the advanced position, the head unit 18 is moved by the head movement device 16 in the X-axis direction and Y-axis direction, such that the spindle extension 46 of the selected spindle unit 30 is positioned to be opposed to and coaxial with the tool pocket hole 230. Then, the spindle extension 46 together with the head unit 18 is moved by the head movement device 16 in the Z-axis direction, for thereby transferring the tool from one of the spindle extension 46 and the tool pocket 192 from the other of the spindle extension 46 and the tool pocket 192. When a plurality of tools (the number of which is smaller than the number of the spindle units 30 provided in the head unit 18) are to be transferred between the first and second tool holding devices, corresponding ones of the spindle units 30 are moved in the forward direction by the respective quill movement devices 34, so as to be positioned in the respective advanced positions. Then, the spindle extensions 46 together with the head unit 18 are moved by the head movement device 16 in the Z-axis direction, for thereby transferring simultaneously the tools from one of the spindle extension 46 and the tool pocket 192 from the other of the spindle extension 46 and the tool pocket 192. When all the tools (the number of which is equal to the number of the spindle units 30 provided in the head unit 18) are to be transferred between the first and second tool holding devices, the tools may be simultaneously transferred by movement of the head unit 18, after or without movement of the spindle units 30 by the respective quill movement devices 34. It is noted that, when a plurality of tools are to be transferred, the plurality of tools do not necessarily have to be transferred simultaneously with each other, but may be transferred one after another.

In the above-described modification in which the relative axial movement of the first and second tool holding devices upon transfer of a tool therebetween is numerically controlled, the quill movement device may be considered as a quill selecting device that is configured to select the quill or spindle unit that holds the tool (which is to be transferred).

The quill movement device may include, as an example of the drive source, a servo motor in place of the hydraulic cylinder, so that the movement of the spindle unit can be numerically controlled. In this case, the quill movement device may be operated to move the spindle unit, for example, for selecting the tool (held by the spindle unit) as a tool that is be used for a machining operation, or for causing the tool (held by the spindle unit) to carry out a machining operation, or for unloading the tool (held by the spindle unit) from the machining machine to the tool storage device, or for loading a tool from the tool storage device to the machining machine.

Further, in the tool magazine, a plurality of tool pocket rows may be arranged in a vertical direction, such that each of the tool pocket rows is sectioned into a used-tool pocket row portion and an unused-tool pocket row portion, and such that the used tool pockets are arranged in the used-tool pocket row portion while the unused tool pockets are arranged in the unused-tool pocket row portion. Further, in the tool magazine, the used tool pockets and the unused tool pocket rows may be arranged in a single tool pocket row.

Further, the present claimable invention is applicable not only to a tool transfer system for a machining system including a multi-spindle machining machine but also to a tool transfer system for a machining system including a single-spindle machining machine. Further, the machining machine is not limited to any particular kind of machine, and may be any kind of machine such as a machining center, a milling machine, a drilling machine, a turning machine (lathe). Further, the machining machine does not necessary have to be a numerically controlled machine but may be a non-numerically controlled machine.

In the present embodiment, the tool is introduced into and removed out of the second receiving hole through the opening of the second tool holding device, by moving the first tool holding device in the radial direction. However, the introduction and removal of the tool into and out of the second receiving hole through the opening of the second tool holding device may be made by moving the second tool holding device in the radial direction.

Further, a plurality of openings may be formed through the circumferential wall of the second-receiving-hole defining member which surrounds the second receiving hole, such that the openings are spaced apart from each other in a circumferential direction of the circumferential wall.

Further, an opening may be formed in the second-receiving-hole defining member, which is axially movably fitted in the main body of the second tool holding device, as the tool-pocket-hole defining member 210 in the embodiment shown in FIGS. 1-18. For example, the opening may be provided in a front portion of the second-receiving-hole defining member which protrudes forwardly from the main body of the second tool holding device such that the opening opens in a front end surface of the second-receiving-hole defining member. In this modified arrangement, the main body of the second tool holding device also may be provided with an opening, such that the opening of the main body of the second tool holding device is located in a position corresponding to a position of the opening of the second-receiving-hole defining member. Further, also in an arrangement in which the second-receiving-hole defining member is not provided with the opening, the second-receiving-hole defining member may be provided with guide rods, as the tool-pocket-hole defining member 520 in the embodiment shown in FIGS. 27-34, such that the guide rods are axially movably fitted in guide holes that are provided in the main body of the second tool holding device, whereby movement of the second-receiving-hole defining member relative to the main body of the second tool holding device is guided by cooperation of the guide rods and the guide holes.

Where the above-descried spindle-position detecting device is used for detecting whether the spindle unit is being positioned in a plurality of positions in the axial direction, the spindle-position detecting device may be constituted by a plurality of detecting portions (e.g., micro switches, proximity switches) and a single detected portion (e.g., dog), or alternatively, may be constituted by a single detecting portion (e.g., micro switch, proximity switch) and a plurality of detected portions (e.g., dogs). The detecting portion or portions are provided in one of the spindle unit and a spindle-unit holding member (by which the spindle unit is axially movably held), while the detected portion or portions are provided in the other of the spindle unit and the spindle-unit holding member.

Further, where the second-receiving-hole defining member has the axially extending passage or opening which extends axially from one of axially opposite ends of the circumferential wall to the other of the axially opposite ends of the circumferential wall, and which extends also from the outer circumferential surface of the circumferential wall to the second receiving hole, the introduction and removal of a tool into and out of the second receiving hole through the axially extending opening may be made by relative pivotal movement of the first and second tool holding devices in place of the relative radial movement of the first and second tool holding devices. In this case, the relative movement device includes a pivoting device configured to cause the first and second tool holding devices to be pivoted relative to each other.

In the embodiment shown in FIGS. 1-18, the engaging-member forcing device in the form of the compression coil spring 274 is provided between the arm portion 264 of each of the movable engaging levers 260 and a corresponding one of the actuating members 290, so as to maintain constant contact between the cam surfaces 270, 292. However, the provision of the engaging-member forcing device is not essential, where connection of each of the movable engaging levers 260 and a corresponding one of the actuating members 290 is constantly maintained by suitable means such as a positive cam.

What is claimed is:

1. A tool transfer system comprising (a) a first tool holding device and (b) a second tool holding device, and configured to transfer a tool between said first and second tool holding devices by causing said first and second tool holding devices to be moved relative to each other;

wherein said first tool holding device includes:

(a-1) a first-receiving-hole defining member defining a first receiving hole that is to receive therein a first-tool-holding-device-side portion of the tool; and (a-2) a clamping device including (a-2-i) an axially movable member movable relative to said first-receiving-hole defining member in first opposite directions that are parallel to an axis of said first receiving hole, so as to be positioned in a clamping position as a result of movement of said axially movable member in a forward direction as one of said first opposite directions that corresponds to a direction toward a front side of said first tool holding device, and so as to be positioned in an unclamping position as a result of movement of said axially movable member in a backward direction as the other of said first opposite directions, and (a-2-ii) a movable-member forcing device forcing said axially movable member in said forward direction, such that said clamping device is configured to establish a clamping state for clamping the tool that is received in said first receiving hole while said axially movable member is being positioned in said clamping position, and to establish an unclamping state for unclamping the tool that is received in said first receiving hole while said axially movable member is being positioned in said unclamping position, wherein said second tool holding device includes:

(b-1) a main body;

(b-2) a second-receiving-hole defining member defining a second receiving hole which is to receive therein a second-tool-holding-device-side portion of the tool, said second-receiving-hole defining member being movable relative to said main body in second opposite directions that are parallel to an axis of said second receiving hole, said second opposite directions being parallel to said first opposite directions at least in a coaxial state in which said second tool holding device is positioned on said front side of said first tool holding device with said axis of said second receiving hole being coaxial with said axis of said first receiving hole; and (b-3) a hole-defining-member forcing device forcing said second-receiving-hole defining member in a forcing direction as one of said second opposite directions, said forcing direction corresponding to said backward direction as said other of said first opposite directions at least in said coaxial state, said tool transfer system further comprising:

(c) a clamping-device controlling device which is configured to cause said axially movable member to be moved against force of said movable-member forcing device and in said backward direction so as to be positioned in said unclamping position, during relative movement of said first and second tool holding devices toward each other in said coaxial state, in absence of opposite movement of said second-receiving-hole defining member against force of said hole-defining-member forcing device in an opposite direction opposite to said forcing direction relative to said main body, and which is configured to allow said axially movable member to be moved in the forward direction owing to the force of said movable-member forcing device in said forward direction so as to be positioned in said clamping position, in presence of said opposite movement of said second-receiving-hole defining member.

2. The tool transfer system according to claim 1, wherein said clamping-device controlling device is, during said relative movement of said first and second tool holding devices toward each other in said coaxial state, configured to cause said axially movable member of said clamping device to be positioned in one of said clamping position and said unclamping position which is selected depending on an axial distance between said main body of said second tool holding device and said first-receiving-hole defining member of said first tool holding device, wherein said clamping-device controlling device is, when said axial distance is reduced to a first amount as a result of said relative movement in a process for transferring the tool from said first tool holding device to said second tool holding device, configured to cause said axially movable member to be moved against force of said movable-member forcing device in said backward direction so as to be positioned in said unclamping position, and wherein said clamping-device controlling device is, when said axial distance is reduced to a second amount that is smaller than said first amount as a result of said relative movement in a process for transferring the tool from said second tool holding device to said first tool holding device, configured to cause said opposite movement of said second-receiving-hole defining member against the force of said hole-defining-member forcing device relative to said main body, and to allow, as a result of said opposite movement of said second-receiving-hole defining member, said axially movable member to be moved owing to the force of said movable-member forcing device in said forward direction so as to be positioned in said clamping position.

3. The tool transfer system according to claim 2, wherein said clamping-device controlling device is, during relative movement of said first and second tool holding devices away from each other in said coaxial state in said process for transferring the tool from said second tool holding device to said first tool holding device, configured to keep said axially movable member to be positioned in said clamping position, irrespective of change of said axial distance.

4. The tool transfer system according to claim 1, being configured to transfer the tool from each one of said first tool holding device and said second tool holding device to the other of said first tool holding device and said second tool holding device, by causing said first and second tool holding devices to be moved relative to each other while maintaining a predetermined angular position of one of said first and second tool holding devices relative to the other of said first and second tool holding devices.

5. The tool transfer system according to claim 1, wherein said second-receiving-hole defining member has (b-2-i) a circumferential wall surrounding said second receiving hole and (b-2-ii) an axially extending opening provided in said circumferential wall and extending from one of axially opposite ends of said circumferential wall toward the other of said axially opposite ends of said circumferential wall such that said second receiving hole is held in communication with an exterior of said second-receiving-hole defining member via said axially extending opening, said tool transfer system being configured to transfer the tool from each one of said first tool holding device and said second tool holding device to the other of said first tool holding device and said second tool holding device, by causing said first and second tool holding devices to be moved relative to each other for introducing and removing the tool into and from said second receiving hole via said axially extending opening, and causing said first and second tool holding devices to be axially moved relative to each other in said coaxial state.

6. The tool transfer system according to claim 1, wherein said clamping-device controlling device includes (c-1) a movable engaging member that is movable between a working position and a non-working position, wherein said movable engaging member is engageable with said axially movable member of said clamping device of said first tool holding device while being positioned in said working position, such that said axially movable member can be moved by said movable engaging member positioned in said working position, against force of said movable-member forcing device and in said backward direction so as to be positioned in said unclamping position, during said relative movement of said first and second tool holding devices toward each other in said coaxial state, wherein said movable engaging member is not engageable with said axially movable member while being positioned in said non-working position, and wherein said clamping-device controlling device further includes (c-2) an engaging-member controlling device that is configured to cause said movable engaging member to be positioned in said non-working position in presence of said opposite movement of said second-receiving-hole defining member against force of said hole-defining-member forcing device in said opposite direction relative to said main body, and to cause said movable engaging member to be positioned in said working position in absence of said opposite movement of said second-receiving-hole defining member.

7. The tool transfer system according to claim 6, wherein said engaging-member controlling device of said clamping-device controlling device includes: (c-2-i) an engaging-member forcing device that forces said movable engaging member to be positioned in said working position; and (c-2-ii) a movement converting device that is configured to covert said opposite movement of said second-receiving-hole defining member relative to said main body, into withdrawal movement of said movable engaging member from said working position to said non-working position against force of said engaging-member forcing device.

8. The tool transfer system according to claim 7, wherein said movement converting device of said engaging-member controlling device is configured such that said withdrawal movement of said movable engaging member, into which said opposite movement of said second-receiving-hole defining member is converted, is made in a direction containing a component parallel to a radial direction of said second receiving hole.

9. The tool transfer system according to claim 8,
wherein said movable engaging member is held by said second-receiving-hole defining member of said second tool holding device,
wherein said movement converting device of said engaging-member controlling device includes an actuating portion and an actuated portion that are held in contact with each other, such that said actuating portion is provided in said main body of said second tool holding device while said actuated portion is provided in said movable engaging member that is held by said second-receiving-hole defining member of said second tool holding device,
and wherein each of at least one of said actuating portion and said actuated portion includes an inclined surface that is not parallel to a plane perpendicular to said second opposite directions in which said second-receiving-hole defining member is movable relative to said main body.

10. The tool transfer system according to claim 9,
wherein said movable engaging member is pivotable relative to said second-receiving-hole defining member, about a pivot axis which is not parallel to said axis of said second receiving hole and which is distant from said axis of said second receiving hole,
wherein said movable engaging member includes two arm portions that extend from said pivot axis in respective directions that are different from each other,
and wherein one of said two arm portions includes an engaged portion that is to be engaged with said axially movable member of said clamping device of said first tool holding device, while the other of said two arm portions includes said actuated portion.

11. The tool transfer system according to claim 1,
wherein said clamping-device controlling device includes (c-1) a movable engaging member that is movable between a working position and a non-working position in said second opposite directions,
wherein said movable engaging member is engageable with said axially movable member of said clamping device of said first tool holding device while being positioned in said working position, such that said axially movable member can be moved by said movable engaging member positioned in said working position, against force of said movable-member forcing device and in said backward direction so as to be positioned in said unclamping position, during said relative movement of said first and second tool holding devices toward each other in said coaxial state,
wherein said movable engaging member is not engageable with said axially movable member while being positioned in said non-working position,
wherein said clamping-device controlling device further includes (c-2) an engaging-member controlling device,
wherein said engaging-member controlling device of said clamping-device controlling device includes: (c-2-i) an engaging-member forcing device that forces said movable engaging member to be positioned in said working position; and (c-2-ii) a movement converting device that is configured to covert said opposite movement of said second-receiving-hole defining member relative to said main body, into withdrawal movement of said movable engaging member from said working position to said non-working position against force of said engaging-member forcing device,
wherein said engaging-member controlling device is configured to cause said movable engaging member to be positioned in said non-working position in presence of said opposite movement of said second-receiving-hole defining member against force of said hole-defining-member forcing device in said opposite direction relative to said main body, and to cause said movable engaging member to be positioned in said working position in absence of said opposite movement of said second-receiving-hole defining member,
and wherein said movement converting device is configured to covert said opposite movement of said second-receiving-hole defining member relative to said main body, into withdrawal movement of said movable engaging member in said opposite direction relative to said second-receiving-hole defining member.

12. The tool transfer system according to claim 1,
wherein said first-receiving-hole defining member of said first tool holding device has (a-1-i) a circumferential wall surrounding said first receiving hole, a ball retaining hole extending through said circumferential wall in a radial direction of said first receiving hole, and (a-1-iii) a ball having a diameter larger than a thickness of said circumferential wall and disposed in said ball retaining hole such that said ball is movable relative to said circumferential wall in said radial direction,
wherein said axially movable member of said clamping device of said first tool holding device is a clamp sleeve which is mounted on an outer circumferential surface of said circumferential wall and which is slidably movable relative to said first-receiving-hole defining member in said first opposite directions,
wherein said clamp sleeve has an inner circumferential surface including a tapered portion such that a radial distance between said tapered portion of said inner circumferential surface and said outer circumferential surface of said circumferential wall is reduced in said backward direction,
and wherein said clamping device is configured to establish said clamping state, by causing said ball to be forced inwardly in said radial direction by said tapered portion of said inner circumferential surface of said clamp sleeve that is forced in said forward direction by said movable-member forcing device, and causing said ball to protrude inwardly in said radial direction from an inner circumferential surface of said circumferential wall.

13. The tool transfer system according to claim 12, wherein said first tool holding device further includes:
(a-3) a pushing member disposed in said first receiving hole of said first-receiving-hole defining member and movable in said first opposite directions; and
(a-4) a pushing-member forcing device forcing said pushing member in said forward direction, such that the tool received in said first receiving hole is pushed by said pushing member in said forward direction, and such that the tool is removed from said first receiving hole by said pushing member when said unclamping state is established by said clamping device,
wherein said pushing member is, in absence of the tool in said first receiving hole, positioned in a position that enables said pushing member to be in contact with said ball disposed in said ball retaining hole, for preventing said ball from protruding inwardly in said radial direction from said inner circumferential surface of said circumferential wall by a distance that is larger than a predetermined distance.

14. The tool transfer system according to claim 1, wherein said second tool holding device includes: (b-4) a removal-preventing-force applying device which is provided in said second-receiving-hole defining member and which is configured, in presence of the tool in said second receiving hole, to apply a removal preventing force to the tool such that the removal preventing force applied to the tool acts against removal of the tool from said second receiving hole.

15. The tool transfer system according to claim 14,
wherein said second-receiving-hole defining member has (b-2-i) a circumferential wall surrounding said second receiving hole,
wherein said removal-preventing-force applying device includes: (b-4-i) an engaging portion and (b-4-ii) an engaging-portion forcing device,
and wherein said engaging-portion forcing device forces said engaging portion inwardly in said radial direction of said second receiving hole.

16. The tool transfer system according to claim 1, further comprising:
(d) an angularly positioning device configured to position said first tool holding device in a predetermined angular position relative to said second tool holding device,
said tool transfer system being configured to transfer the tool from each one of said first and second tool holding devices to the other of said first and second tool holding devices, by causing said first and second tool holding devices to be moved relative to each other while maintaining said predetermined angular position of said first and second tool holding devices, after said first tool holding device has been positioned in said predetermined angular position by said angularly positioning device.

17. The tool transfer system according to claim 16,
wherein said first tool holding device is capable of establishing a freely rotatable state in which said first holding device is freely rotatable relative to said second tool holding device about said axis of said first receiving hole,
wherein said first tool holding device has an outer cylindrical surface which is coaxial with said axis of said first receiving hole and said axis of said second receiving hole and which includes at least one flat surface portion that is parallel to said axis of said first receiving hole,
wherein said angularly positioning device is a mechanically positioning device including: (d-1) a main body; (d-2) an angularly positioning member having a positioning surface that is engageable with said at least one flat surface portion of said outer cylindrical surface of said first tool holding device, said angularly positioning member being held by said main body of said angularly positioning device, and movable in perpendicular directions that are perpendicular to said positioning surface; and (d-3) a positioning-member forcing device forcing said angularly positioning member in a direction away from said main body of said angularly positioning device,
said tool transfer system further comprising:
(e) a relative movement device configured to cause said angularly positioning device and said first tool holding device, to be moved relative to each other in said perpendicular directions and also in directions which are parallel to said positioning surface of said angularly positioning member and which are perpendicular to said axis of said first receiving hole.

18. A tool transfer system comprising (a) a first tool holding device and (b) a second tool holding device, and configured to transfer a tool between said first and second tool holding devices by causing said first and second tool holding devices to be moved relative to each other;
wherein said first tool holding device includes:
(a-1) a first-receiving-hole defining member defining a first receiving hole that is to receive therein a portion of the tool; and
(a-2) a ball clamping device including a clamp sleeve which is axially movable relative to said first-receiving-hole defining member along an axis of said first receiving hole, and which is forced in a direction toward said second tool holding device so as to be positioned in a clamping position for clamping the tool that is received in said first receiving hole,
wherein said second tool holding device includes:
(b-1) a main body;
(b-2) a second-receiving-hole defining member defining a second receiving hole which is to receive therein another portion of the tool, said second-receiving-hole defining member being axially movable relative to said main body along an axis of said second receiving hole;
(b-3) a hole-defining-member forcing device forcing said second-receiving-hole defining member in a direction toward said first tool holding device;
(b-4) a movable engaging member which is movable between a working position and a non-working position, said movable engaging member being positioned in said working position in absence of opposite movement of said second receiving-hole defining member against force of said hole-defining-member forcing device relative to said main body in an opposite direction opposite to said direction toward said first tool holding device, said movable engaging member being engageable with said clamp sleeve while being positioned in said working position, such that said clamp sleeve can be moved, by engagement of said movable engaging member with said clamp sleeve, so as to position the clamp sleeve in an unclamping position, during relative axial movement, when the axes of the first and second receiving holes are coaxial, of said first tool holding device and said second tool holding device toward each other; and (b-5) a movement converting device which is, in presence of said opposite movement of said second receiving-hole defining member, configured to covert said opposite movement of said second-receiving-hole defining member relative to said main body, into withdrawal movement of said movable engaging member from said working position to said non-working position against force of an engaging-member forcing device.

19. The tool transfer system according to claim 18, wherein said second receiving hole of said second-receiving-hole defining member has an inner circumferential surface including a contactable portion that extends in a direction containing a component parallel to a radial direction of said second receiving hole, such that a radially extending portion of the tool is brought into contact with said contactable portion during the relative axial movement of said first and second tool holding devices toward each other in a process for transferring the tool from said first tool holding device to said second tool holding device, and wherein said opposite movement of said second-receiving-hole defining member relative to said main body is caused by the contact of the radially extending portion of the tool with said contactable portion of said inner circumferential surface of said second-receiving-hole defining member.

* * * * *